(12) United States Patent
Nakaishi

(10) Patent No.: US 8,155,197 B2
(45) Date of Patent: Apr. 10, 2012

(54) INTERFRAME PREDICTION PROCESSOR WITH MECHANISM FOR PROVIDING LOCATIONS OF REFERENCE MOTION VECTORS USED IN MACROBLOCK ADAPTIVE FIELD/FRAME MODE

(75) Inventor: Hidenori Nakaishi, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1394 days.

(21) Appl. No.: 11/785,132

(22) Filed: Apr. 16, 2007

(65) Prior Publication Data

US 2008/0043843 A1 Feb. 21, 2008

(30) Foreign Application Priority Data

Aug. 18, 2006 (JP) .................. 2006-223564

(51) Int. Cl.
*H04N 11/02* (2006.01)
(52) U.S. Cl. .................. 375/240.16
(58) Field of Classification Search .......... None
See application file for complete search history.

(56) References Cited

U.S. PATENT DOCUMENTS

| | | | |
|---|---|---|---|
| 6,519,287 B1 | 2/2003 | Hawkins et al. | |
| 7,822,120 B2 * | 10/2010 | Kondo et al. ........... | 375/240.16 |
| 7,894,529 B2 * | 2/2011 | Hahn et al. ............... | 375/240.16 |
| 2003/0099292 A1 * | 5/2003 | Wang et al. ............. | 375/240.12 |
| 2005/0013376 A1 * | 1/2005 | Dattani et al. .......... | 375/240.24 |
| 2005/0041742 A1 * | 2/2005 | Abe et al. ................. | 375/240.24 |
| 2005/0259734 A1 * | 11/2005 | Hellman .................. | 375/240.16 |
| 2006/0098734 A1 * | 5/2006 | Cho et al. ................. | 375/240.03 |
| 2006/0140275 A1 | 6/2006 | Lee et al. | |

FOREIGN PATENT DOCUMENTS

| | | |
|---|---|---|
| JP | 2000-50284 A | 2/2000 |
| JP | 2004-048552 A | 2/2004 |
| JP | 2004-187107 A | 7/2004 |
| JP | 2004-266731 A | 9/2004 |
| JP | 2005-510985 A | 4/2005 |
| JP | 2006-166459 A | 6/2006 |
| WO | 03/047272 A2 | 6/2003 |

\* cited by examiner

*Primary Examiner* — Minh Dinh
(74) *Attorney, Agent, or Firm* — Arent Fox LLP

(57) ABSTRACT

An interframe prediction processor designed for high-speed video coding and decoding. The interframe prediction processor has an address selector and a predictor calculator. The address selector receives information about MBAFF type and coding type. When performing motion compensation for a given MBAFF picture with reference to blocks surrounding a current block, the address selector provides memory addresses of reference motion vectors according to the coding type of the current block pair, as well as to the coding type of the reference blocks. The predictor calculator that determines a motion vector predictor for each constituent block of the current block pair based on reference motion vectors read out of the provided memory addresses.

9 Claims, 56 Drawing Sheets

FIG. 7   16X16 BASIC MACROBLOCK
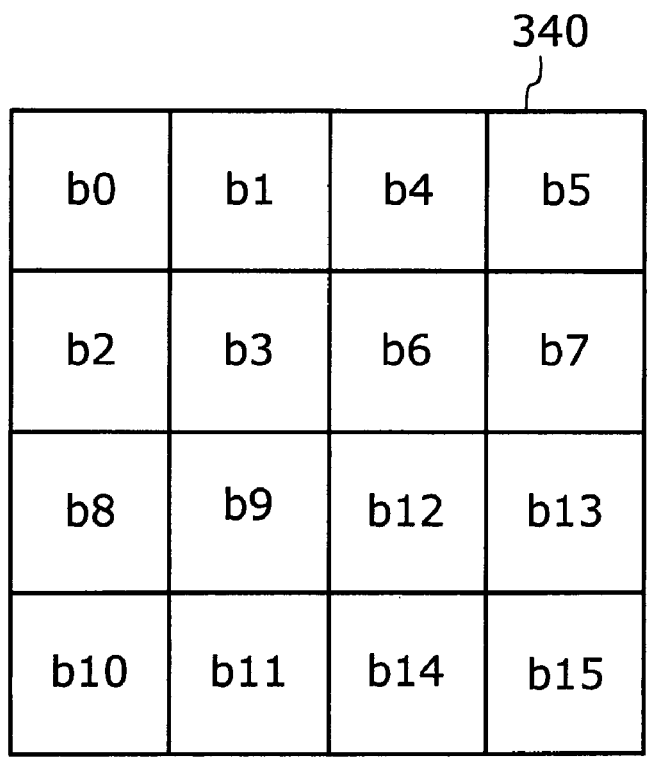

FIG. 8A   CALCULATING MOTION VECTOR OF 16x16 MACROBLOCK
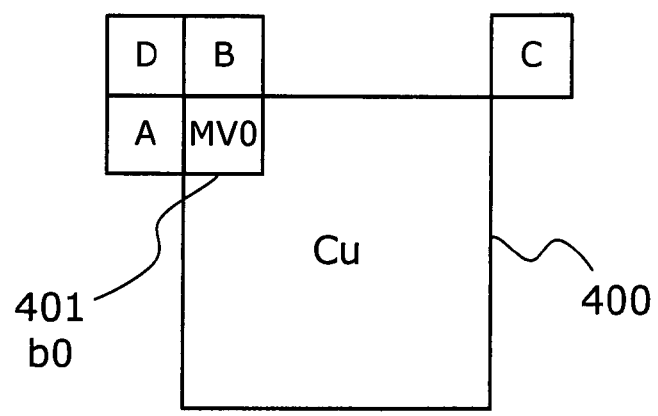
FIG. 8B   WRITING MOTION VECTOR OF 16x16 MACROBLOCK
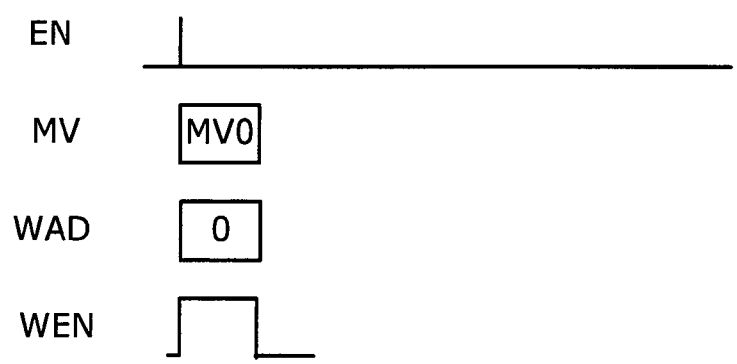

FIG. 9A  CALCULATING MOTION VECTORS OF 16x8 MACROBLOCKS
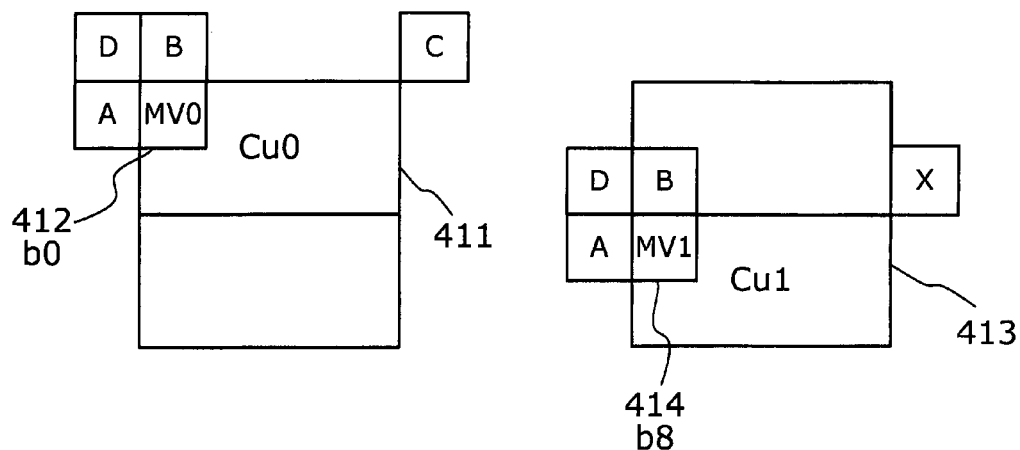
FIG. 9B  WRITING MOTION VECTORS OF 16x8 MACROBLOCKS
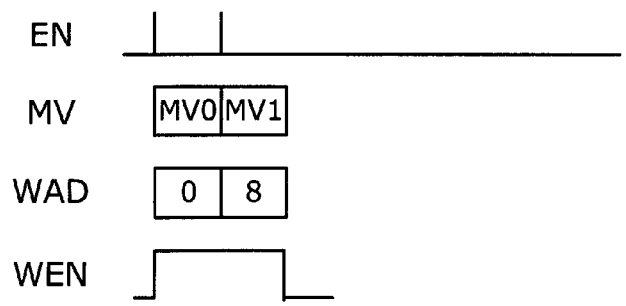

FIG. 10A  CALCULATING MOTION VECTORS OF 8x16 MACROBLOCKS
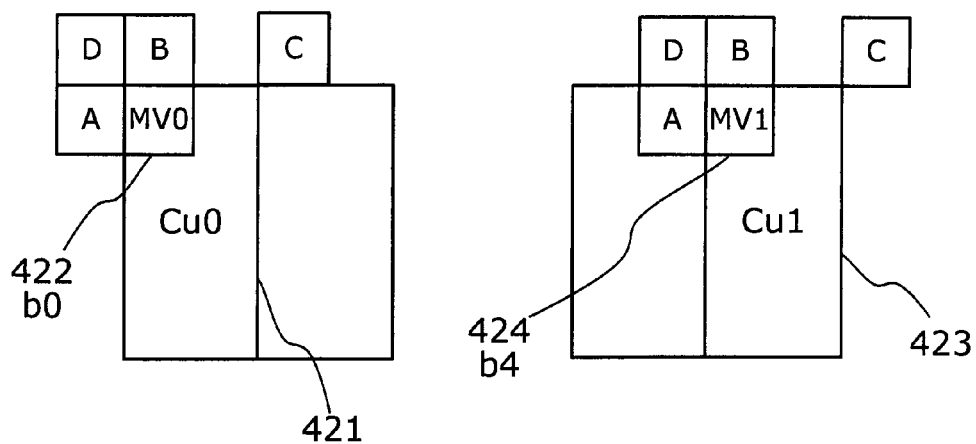
FIG. 10B  WRITING MOTION VECTORS OF 8x16 MACROBLOCKS
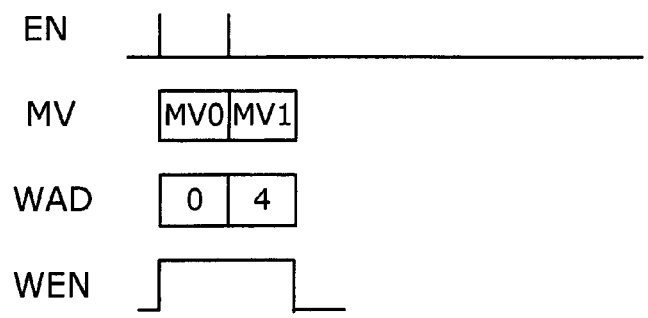

FIG. 11A  CALCULATING MOTION VECTORS OF 8x8 MACROBLOCKS
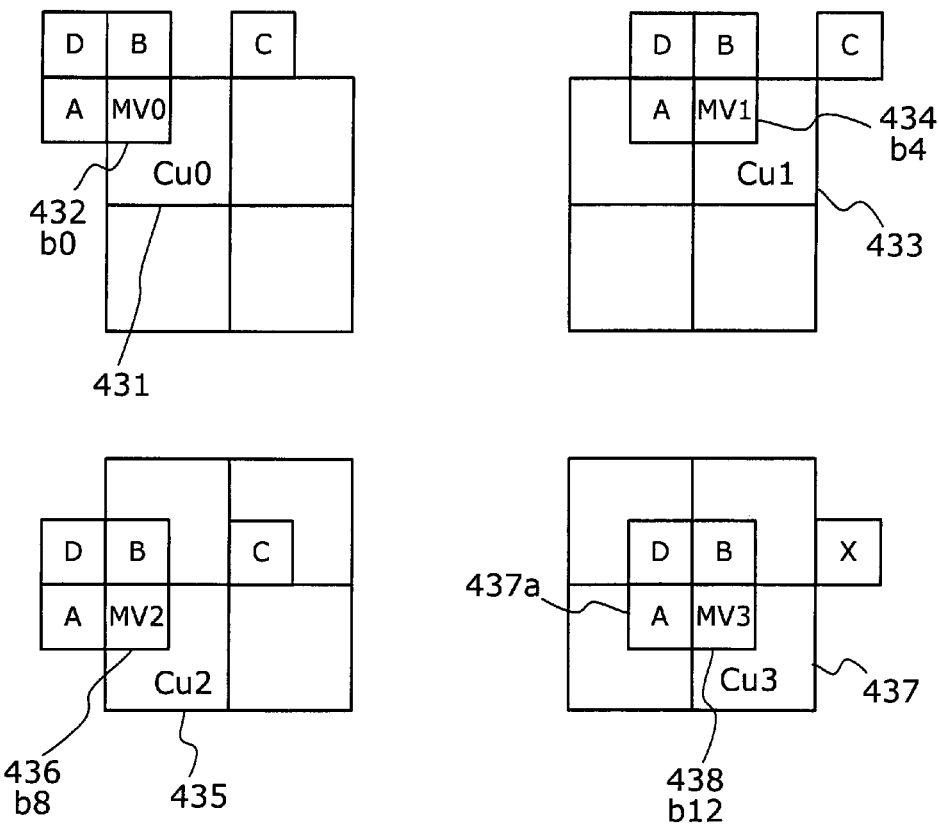
FIG. 11B  WRITING MOTION VECTORS OF 8x8 MACROBLOCKS
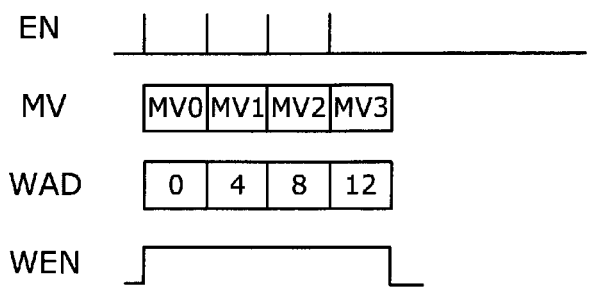

FIG. 12A   MACROBLOCK SUB-PARTITIONING
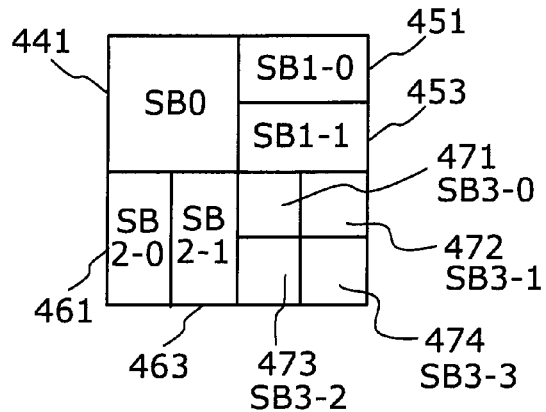
FIG. 12B   MOTION VECTORS OF SUB-MACROBLOCKS
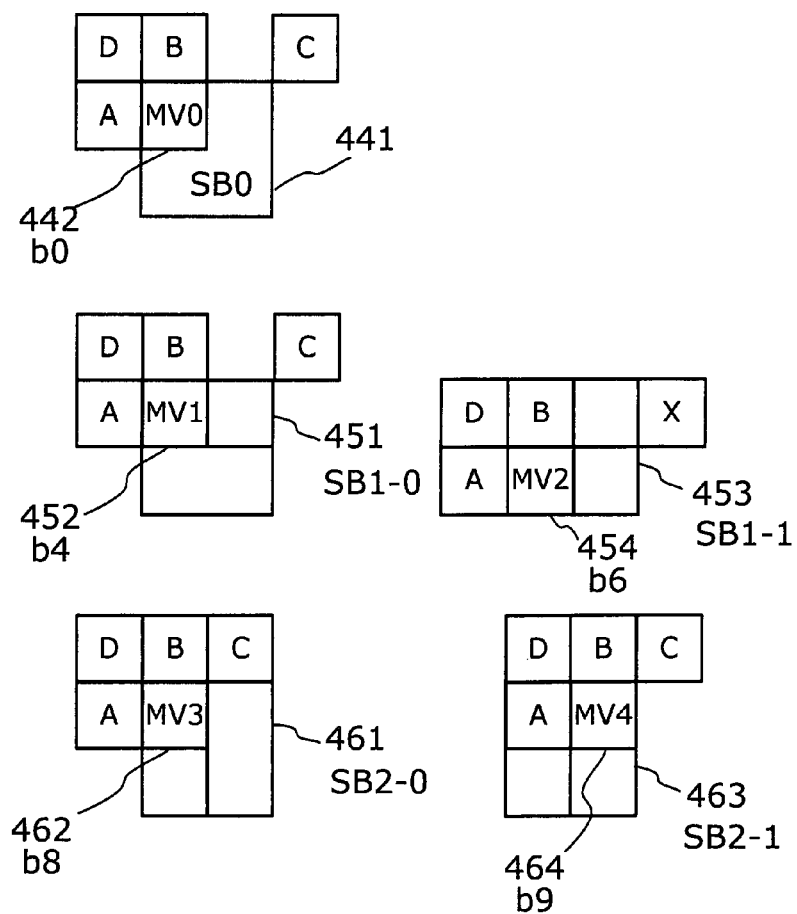

FIG. 13A  MOTION VECTORS OF SUB-MACROBLOCKS (continued)
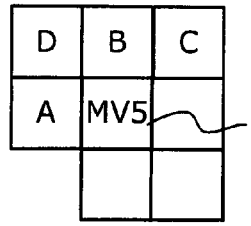
471
SB3-0
(b12)
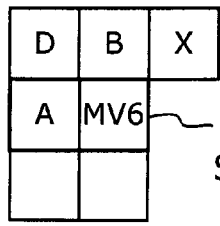
472
SB3-1
(b13)
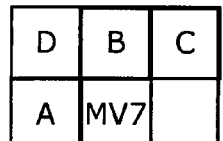
473
SB3-2
(b14)
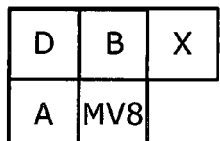
474
SB3-3
(b15)
FIG. 13B  WRITING MOTION VECTORS OF SUB-MACROBLOCKS
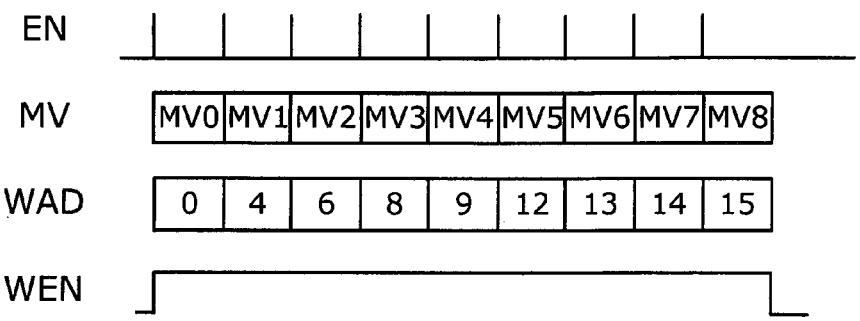

FIG. 14

| BLOCK SIZE | SPECIFIED MACROBLOCK LOCATION | TRANSLATED LOCATION |
|---|---|---|
| 8X16 MACROBLOCK 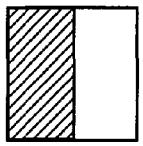 | 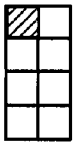 b0  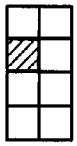 b2  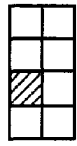 b8   b10 <br>  b1  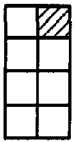 b3  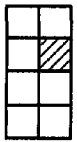 b9  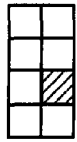 b11 | 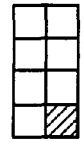 b0 |
| 8X8 MACROBLOCK 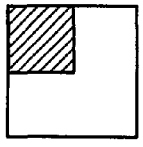 | 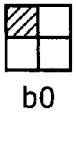 b0  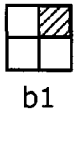 b1  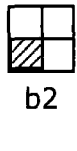 b2  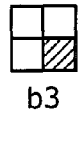 b3 | 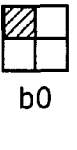 b0 |
| 8X4 SUB-MACROBLOCK 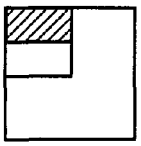 | 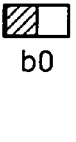 b0  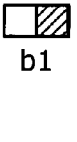 b1 | 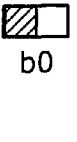 b0 |
| 4X8 SUB-MACROBLOCK 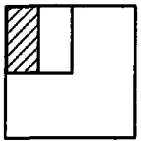 | 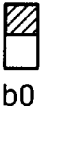 b0   b2 | 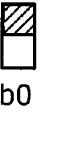 b0 |
| 4X4 SUB-MACROBLOCK  | 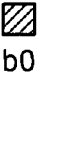 b0 | 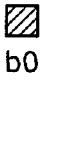 b0 |
FIG. 15

FIG. 16    MB-A VECTOR STORAGE MANAGEMENT
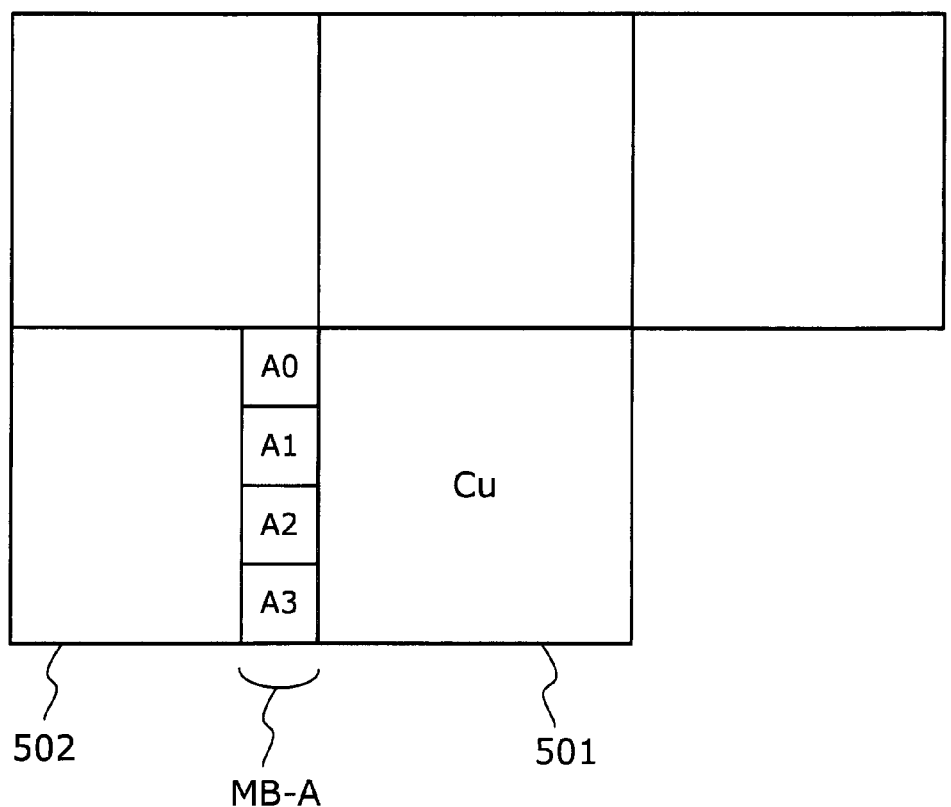

FIG. 17  MB-BCD VECTOR STORAGE MANAGEMENT
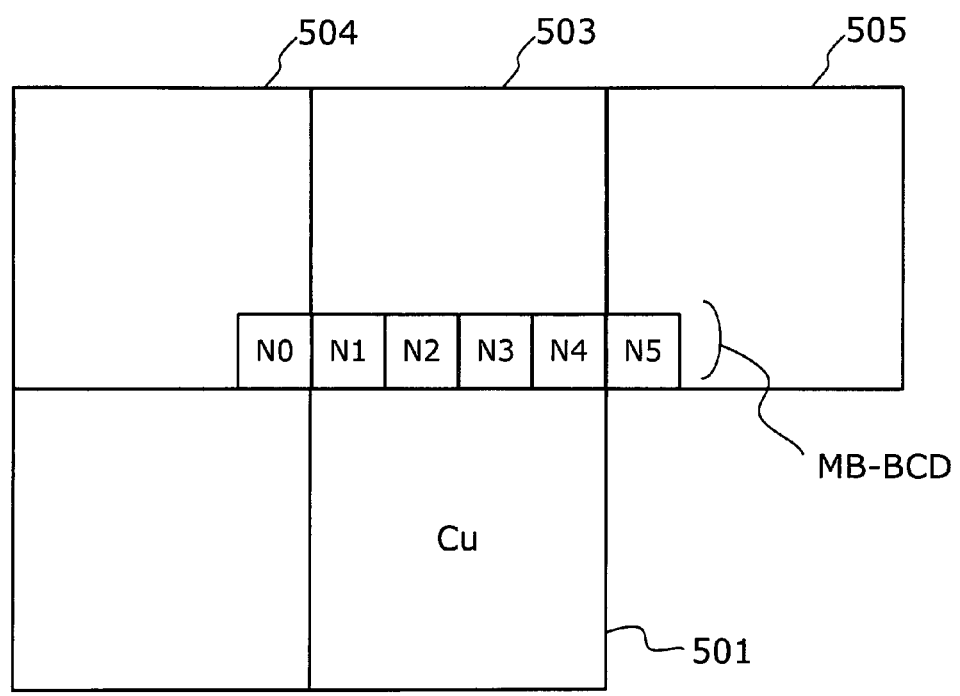

FIG. 18A  REPRESENTATIVE VECTOR STORAGE LOCATIONS FOR ADJACENT 16X16 MACROBLOCKS
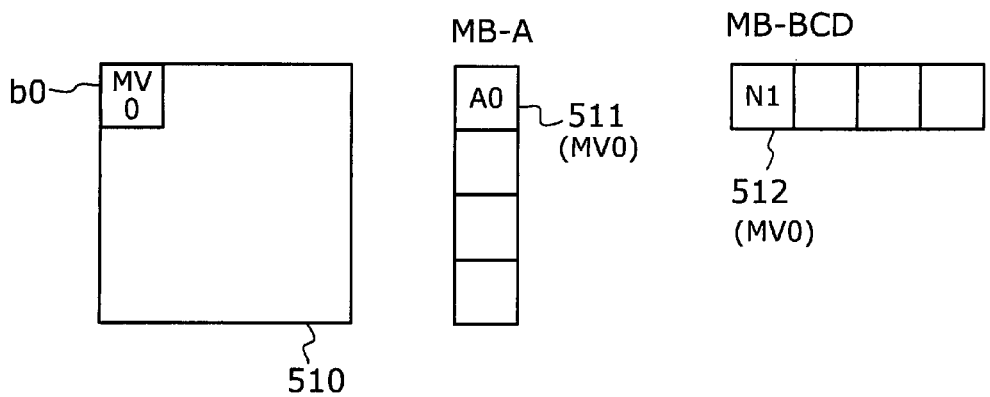
FIG. 18B  REPRESENTATIVE VECTOR STORAGE LOCATIONS FOR ADJACENT 16X8 MACROBLOCKS
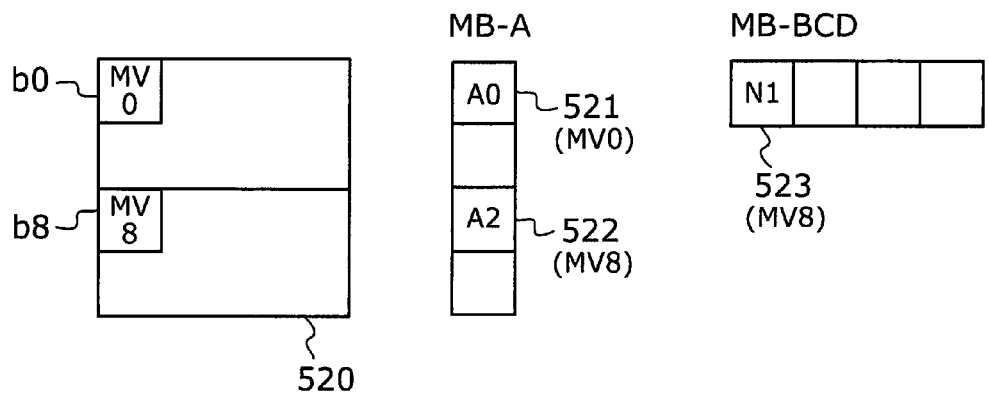

FIG. 19A  REPRESENTATIVE VECTOR STORAGE LOCATIONS FOR ADJACENT 8X16 MACROBLOCKS
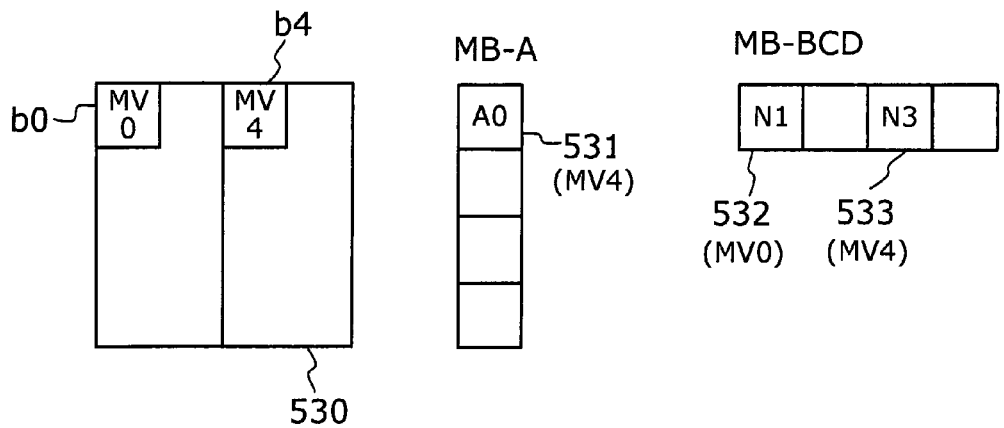
FIG. 19B  REPRESENTATIVE VECTOR STORAGE LOCATIONS FOR ADJACENT 8X8 MACROBLOCKS
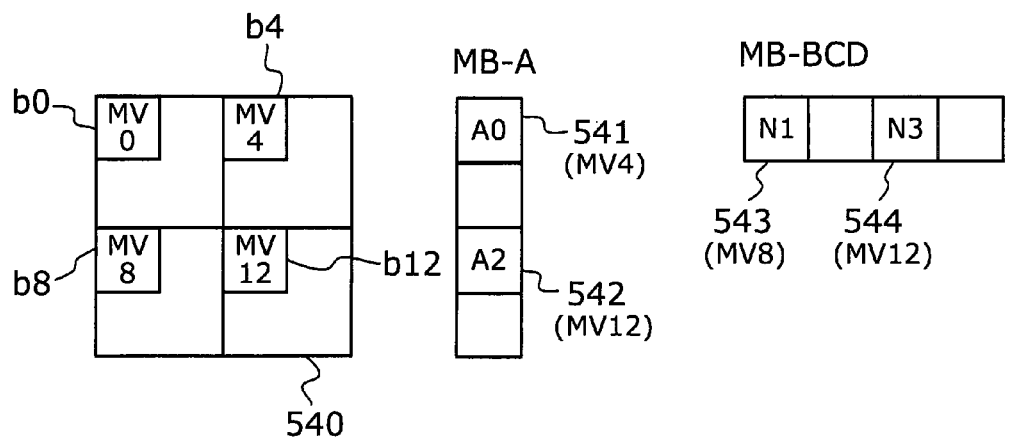

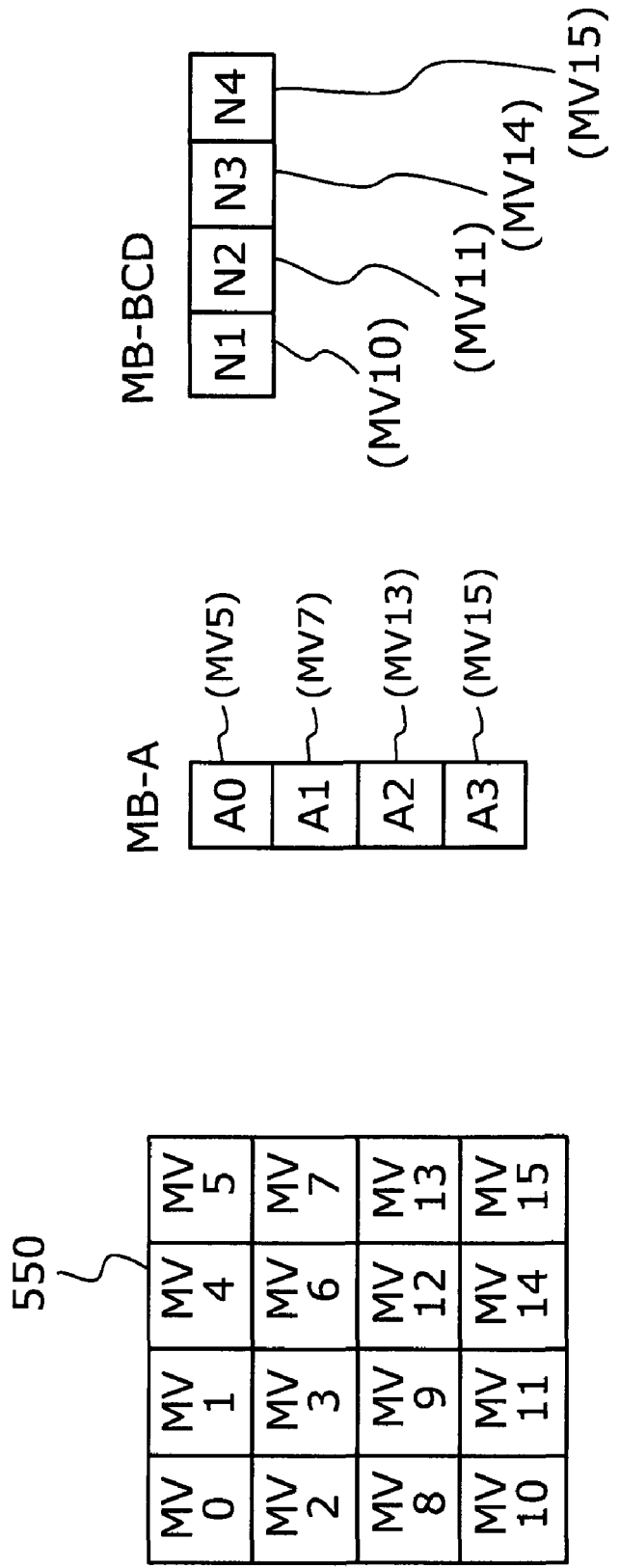
FIG. 20 REPRESENTATIVE VECTOR STORAGE LOCATIONS FOR ADJACENT 4X4 SUB-MACROBLOCKS

| BLOCK SIZE | REPRESENTATIVE VECTOR | SPECIFIED MB-A LOCATION | TRANSLATED LOCATION |
|---|---|---|---|
| 16X16 MACROBLOCK | (MV0) A0 | A0 A1 A2 A3 | (MV0) A0 |
| 16X8 MACROBLOCK | (MV0) (MV8) A0,A2 | A0 A1 | (MV0) A0 |
| | | A2 A3 | (MV8) A2 |
| 8X16 MACROBLOCK | (MV4) A0 | A0 A1 A2 A3 | (MV4) A0 |
| 8X8 MACROBLOCK | (MV4) (MV12) A0,A2 | A0 A1 | (MV4) A0 |
| | | A2 A3 | (MV12) A2 |

FIG. 21

| BLOCK SIZE | REPRESENTATIVE VECTOR | SPECIFIED MB-A LOCATION | TRANSLATED LOCATION |
|---|---|---|---|
| 8X4 MACROBLOCK | (MV4)<br>(MV6)<br>(MV12)<br>(MV14)<br>A0,A1,A2,A3 | A0 | A0 (MV4) |
| | | A1 | A1 (MV6) |
| | | A2 | A2 (MV12) |
| | | A3 | A3 (MV14) |
| 4X8 MACROBLOCK | (MV5)<br>(MV13)<br>A0,A2 | A0<br>A1 | A0 (MV5) |
| | | A2<br>A3 | A2 (MV13) |
| 4X4 MACROBLOCK | (MV5)<br>(MV7)<br>(MV13)<br>(MV15)<br>A0,A1,A2,A3 | A0 | A0 (MV5) |
| | | A1 | A1 (MV7) |
| | | A2 | A2 (MV13) |
| | | A3 | A3 (MV15) |

FIG. 22

| BLOCK SIZE | REPRESENTATIVE VECTOR | SPECIFIED MB-BCD LOCATION | TRANSLATED LOCATION |
|---|---|---|---|
| 16X16 MACROBLOCK | N1 (MV0) | N1 N2 N3 N4 | N1 (MV0) |
| 16X8 MACROBLOCK | N1 (MV8) | N1 N2 N3 N4 | N1 (MV8) |
| 8X16 MACROBLOCK | N1 N3 (MV0) (MV4) | N1 N2 | N1 (MV0) |
| | | N3 N4 | N3 (MV4) |
| 8X8 MACROBLOCK | N1 N3 (MV8) (MV12) | N1 N2 | N1 (MV8) |
| | | N3 N4 | N3 (MV12) |

FIG. 23

| BLOCK SIZE | REPRESENTA-TIVE VECTOR | SPECIFIED MB-BCD LOCATION | TRANSLATED LOCATION |
|---|---|---|---|
| 8X4 MACROBLOCK | N1 N3 (MV8) (MV12) | N1 N2 | N1 (MV8) |
| | | N3 N4 | N3 (MV12) |
| 4X8 MACROBLOCK | N1N2N3N4 (MV8) (MV13) (MV9) (MV12) | N1 | N1 (MV8) |
| | | N2 | N2 (MV9) |
| | | N3 | N3 (MV12) |
| | | N4 | N4 (MV13) |
| 4X4 MACROBLOCK | N1N2N3N4 (MV15) (MV10) (MV14) (MV11) | N1 | N1 (MV10) |
| | | N2 | N2 (MV11) |
| | | N3 | N3 (MV14) |
| | | N4 | N4 (MV15) |

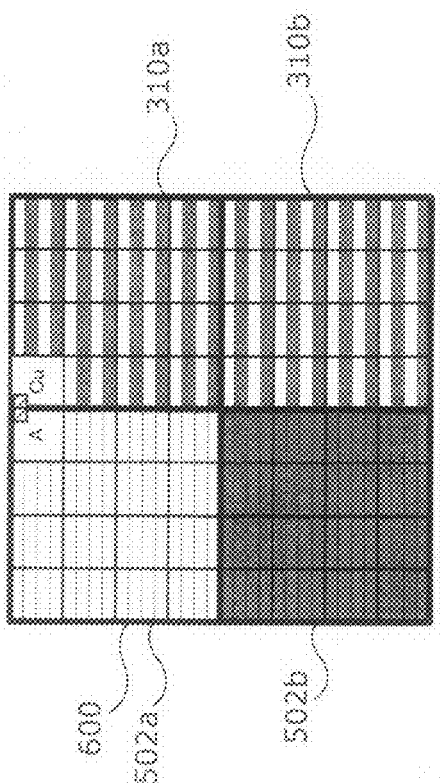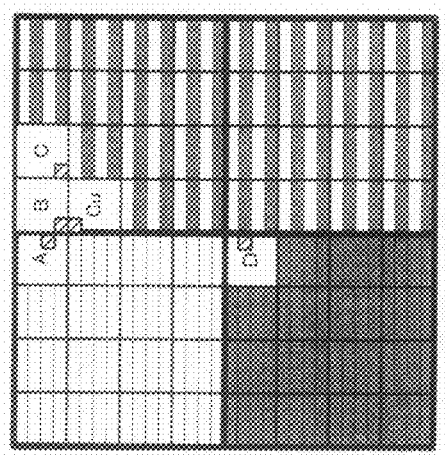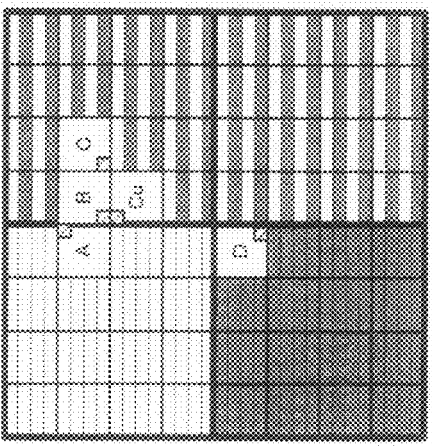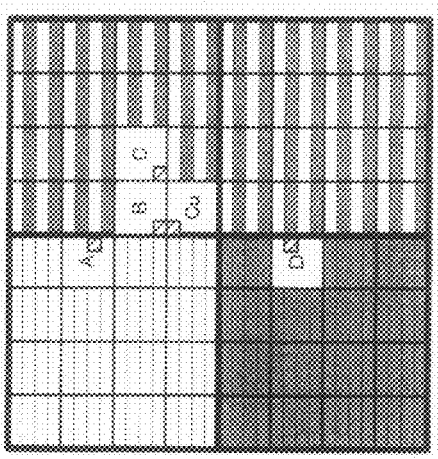

INTERFRAME PREDICTION PROCESSOR WITH MECHANISM FOR PROVIDING LOCATIONS OF REFERENCE MOTION VECTORS USED IN MACROBLOCK ADAPTIVE FIELD/FRAME MODE

CROSS-REFERENCE TO RELATED APPLICATIONS

This application is based upon and claims the benefits of priority from the prior Japanese Patent Application No. 2006-223564, filed on Aug. 18, 2006, the entire contents of which are incorporated herein by reference.

BACKGROUND OF THE INVENTION

1. Field of the Invention

The present invention relates to a device for predicting a frame from other frames, as well as to video coding and decoding devices using the same. More particularly, the present invention relates to an interframe prediction processor, a video coding device, and a video decoding device that perform interframe prediction of video frames on a block basis.

2. Description of the Related Art

Digital video compression techniques are widely used in many applications. MPEG and H.264 are among the standard specifications in this technical field, where MPEG stands for "Moving Picture Expert Group." The coding and decoding algorithms used in those standards divide each given picture into small areas and process them with motion compensation techniques. Such picture areas are called "macroblocks." A video coding process involves intraframe prediction and interframe prediction. The intraframe prediction reduces redundancy within a single frame by using orthogonal transform, quantization, and other data compression algorithms. The interframe prediction, on the other hand, reduces redundancy between successive frames by extracting and encoding motion compensation residual (i.e., the difference between a current frame and a motion-compensated reference frame). The resulting video data is then entropy-coded for transmission or storage. A video decoding process reverses the above steps to reconstruct original video from compressed video.

Some standard coding algorithms including MPEG and H.264 adaptively select a frame-based coding mode or a field-based coding mode to process interlaced video signals. These algorithms further permit switching between interframe prediction and interfield prediction for each two vertically adjacent macroblocks (or "macroblock pair") for motion vector calculation. This coding mode is called "macroblock adaptive field/frame" (MBAFF) mode. Which of those three modes to use can be specified by a "coding type" parameter on an individual picture basis. In this description, the three coding modes will be referred to as "frame," "field," and "MBAFF" modes. The first two modes may also be referred to collectively as non-MBAFF mode, where appropriate.

FIG. 56 explains the order of macroblocks to be processed for each different coding type. The topmost part of FIG. 56 shows in what order the coding process selects 16×16-pixel macroblocks constituting a picture. Specifically, the top-left part of FIG. 56 depicts the case of "frame" coding type, in which mode the macroblocks of 16×16 pixels constituting a frame are processed from left to right and top to bottom. This means that odd-numbered lines and even-numbered are selected alternately for processing.

The top-middle part of FIG. 56 shows the case of "field" coding type, in which mode the video data is processed as two separate fields, i.e., top field and bottom field. The coding process begins with a top field (or odd-numbered lines) and then proceeds to a bottom field (or even-numbered lines) in the subsequent field synchronization period, as shown in the bottom-middle part of FIG. 56.

The top-right corner of FIG. 56 shows the case of "MBAFF" coding type, in which a frame is processed on a macroblock pair basis. The processing order of field lines depends on whether the macroblock pair of interest is to be interframe coded or interfield coded. In the case of interframe-coded macroblock pairs (hereafter "frame pairs"), odd-numbered lines and even-numbered lines are processed alternately as illustrated in the bottom-right part of FIG. 56. In the case of interfield-coded macroblock pairs (hereafter "field pairs"), odd-numbered lines are processed before even-numbered lines since the first and second macroblocks of a pair correspond to top field data and bottom field data, respectively.

To improve the accuracy of motion vector prediction for macroblocks containing edges and outlines, some existing coding algorithms split up such macroblocks into smaller blocks and calculate a motion vector for each block. For example, H.264 supports macroblock partitioning that divides a basic macroblock of with a size of 16×16 pixels into various block sizes as necessary, including minimum sub-partitions of 4×4 pixels.

Most part of the video coding algorithm described above is devoted to calculation of motion vectors for interframe prediction. It is therefore desired to develop a faster and more efficient method of motion vector calculation. One such method is proposed in, for example, Japanese Unexamined Patent Application Publication No. 2004-266731. The proposed video coding method alleviates memory capacity requirements of reference pictures by selectively storing a limited number of reference macroblocks that have been determined to be used in the next motion-compensated inter-coded frame.

A video coding device calculates a motion vector (abbreviated as "MV" where appropriate) corresponding to each individual macroblock and then determines a motion vector predictor (abbreviated as "MVP" where appropriate) for a current macroblock from previously calculated motion vectors of its surrounding macroblocks. The video coding device then encodes motion vector differences (abbreviated as "MVD" where appropriate) between MVs and MVPs and outputs them, together with macroblock information, as a coded video data stream. This video stream is received by a video decoding device. The video decoding device decodes the coded MVDs and macroblock information and calculates motion vectors from MVDs and MVPs, where MVP of a macroblock can be determined from motion vectors of surrounding blocks that have already been decoded. Using those motion vectors, the video decoding device reconstructs the original video stream.

A video decoding device has a memory for vector storage locations reserved to store motion vectors of already decoded macroblocks for later reference in reconstructing motion vectors of subsequent macroblocks. More specifically, those vector storage locations accommodate motion vectors of the currently processed macroblock, as well as motion vectors that have been calculated for macroblocks adjacent to the current macroblock.

In MBAFF mode, the MVP of a macroblock is determined from the current macroblock pair and its adjacent macroblock pairs. Since those macroblock pairs may not always be of the same type, the conventional MBAFF algorithm compensates for this inconsistency when reading or writing motion vectors from/to vector storage locations. Suppose, for example, that the current macroblock pair is in frame form while macroblock pairs surrounding it are in field form. In this case, the conventional algorithm converts those adjacent macroblock pairs from field form to frame form before writing motion vectors in the memory. This conversion task imposes an additional processing burden, thus degrading the efficiency of video coders and decoders.

SUMMARY OF THE INVENTION

In view of the foregoing, it is an object of the present invention to provide a device that performs interframe prediction at a high speed for video signal coding and decoding. It is also an object of the present invention to provide video coding and video decoding devices employing the proposed interframe prediction device.

To accomplish the first object stated above, the present invention provides an interframe prediction processor that performs interframe prediction of video frames on a block basis. This interframe prediction processor has an address selector that provides memory addresses of reference motion vectors according to given coding type information about a current block pair and adjacent block pairs thereof. The address selector is activated when performing motion vector prediction with reference to blocks outside the current block pair, and when given macroblock adaptive frame/field (MBAFF) identification type information indicates that a given picture is supposed to be processed in MBAFF mode allowing selection between frame prediction and field prediction for each individual block pair. The coding type information indicates whether each block pair is organized in frame form or in field form. The interframe prediction processor further has a predictor calculator to determine a motion vector predictor for each constituent block of the current block pair based on reference motion vectors read out of the provided memory addresses.

Also, to accomplish the second object stated above, the present invention provides a video coding device that encodes video signals into compressed video data by performing motion-compensated prediction between a source picture and a reference picture on a block basis. This video coding device has an address selector that provides memory addresses of reference motion vectors according to given coding type information about a current block pair and adjacent block pairs thereof. The address selector is activated when performing motion vector prediction with reference to blocks outside the current block pair, and when given macroblock adaptive frame/field (MBAFF) identification type information indicates that a given picture is supposed to be processed in MBAFF mode allowing selection between frame prediction and field prediction for each individual block pair. The coding type information indicates whether each block pair is organized in frame form or in field form. The video coding device further has an interframe prediction processor that determines a motion vector predictor for each constituent block of the current block pair based on reference motion vectors read out of the provided memory addresses, and calculates a difference between the calculated motion vector of the current block and the determined motion vector predictor, so that the calculated difference will be encoded.

Furthermore, to accomplish the second object stated above, the present invention provides a video decoding device that reconstructs original video pictures from a compressed video signal that has been produced by performing motion-compensated interframe prediction on a block basis. This video decoding device has an address selector that provides memory addresses of reference motion vectors according to given coding type information about a current block pair and adjacent block pairs thereof. The address selector is activated when performing motion vector prediction with reference to blocks outside the current block pair, and when given macroblock adaptive frame/field (MBAFF) identification type information indicates that a given picture is supposed to be processed in MBAFF mode allowing selection between frame prediction and field prediction for each individual block pair. The coding type information indicates whether each block pair is organized in frame form or in field form. The video coding device further has an interframe prediction processor that determines a motion vector predictor for each constituent block of the current block pair based on reference motion vectors read out of the provided memory addresses, and reproduces a motion vector of the current block from the determined motion vector predictor and a decoded motion vector difference.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 shows block numbers assigned to sub-macroblocks constituting a 16×16 macroblock.

FIGS. 8A and 8B show how the first embodiment calculates and writes motion vectors in the case of 16×16 macroblocks.

FIGS. 9A and 9B show how the first embodiment calculates and writes motion vectors in the case of 16×8 macroblocks.

FIGS. 10A and 10B show how the first embodiment calculates and writes motion vectors in the case of 8×16 macroblocks.

FIGS. 11A and 11B show how the first embodiment calculates and writes motion vectors in the case of 8×8 macroblocks.

FIGS. 12A, 12B, 13A, and 13B show how the first embodiment partitions a macroblock into sub-macroblocks and how it produces and writes a representative motion vector for them.

FIGS. 14 and 15 show how an address translation table functions in the first embodiment.

FIG. 16 shows how the first embodiment saves motion vectors of adjacent macroblocks in MB-A vector storage locations.

FIG. 17 shows how the first embodiment saves motion vectors of adjacent macroblocks in MB-BCD vector storage locations.

FIGS. 18A and 18B show representative vector storage locations for adjacent 16×16 macroblocks and 16×8 macroblocks according to the first embodiment.

FIGS. 19A and 19B show representative vector storage locations for adjacent 8×16 macroblocks and 8×8 macroblocks according to the first embodiment.

FIG. 20 shows representative vector storage locations for adjacent 4×4 sub-macroblocks according to the first embodiment.

FIGS. 21 and 22 show how an address translation table is used to make reference to MB-A vector storage locations.

FIGS. 23 and 24 show how an address translation table is used to make reference to MB-BCD vector storage locations according to the first embodiment.

FIGS. 27A and 27B show the location of adjacent macroblocks MB-A and MB-BCD in MBAFF mode.

FIGS. 36A to 55 show various patterns of adjacent macroblock locations.

DESCRIPTION OF THE PREFERRED EMBODIMENTS

Figure 1:
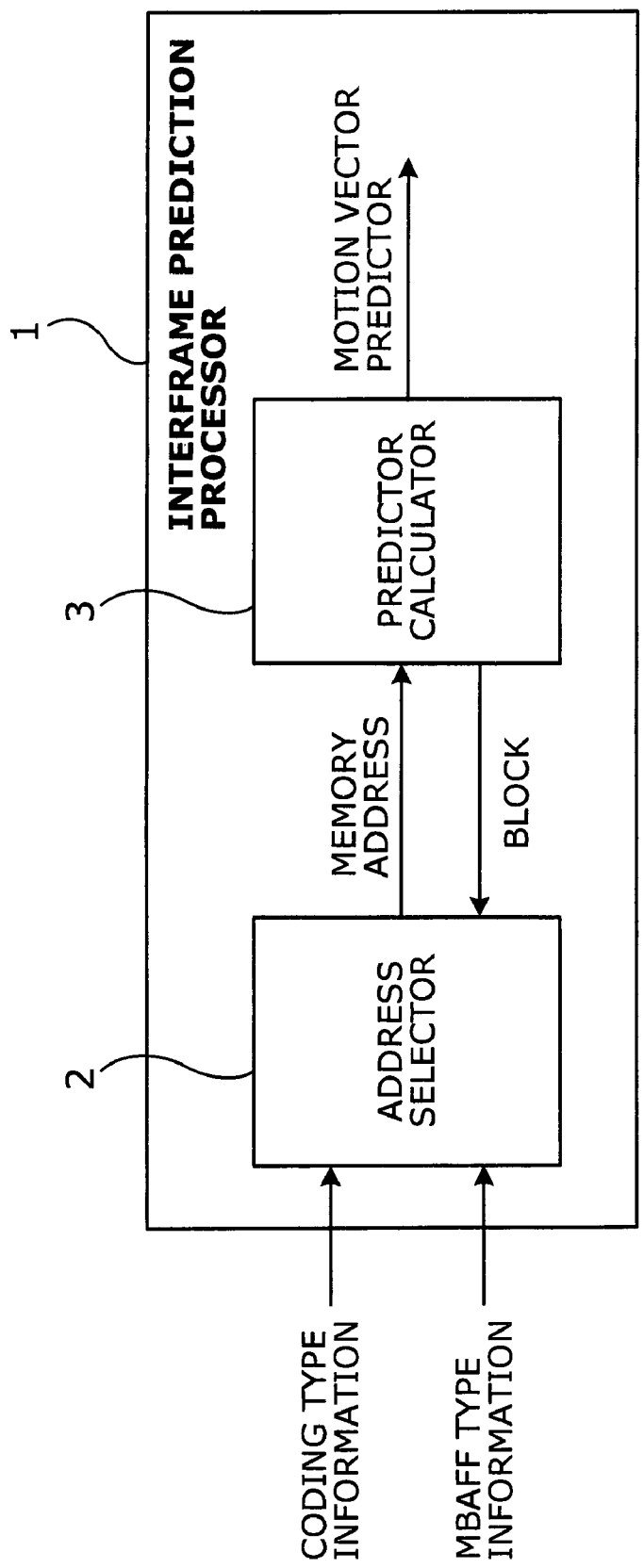
FIG. 1 gives an overview of the present invention.

Preferred embodiments of the present invention will be described below with reference to the accompanying drawings, wherein like reference numerals refer to like elements throughout. The description begins with an overview of the present invention and then proceeds to more specific embodiments of the invention. In the rest of this document, the size and shape of a macroblock (and its partitions) are indicated by a prefix representing its width and height. For example, the term "16×8 macroblock" denotes that the macroblock is 16 pixels wide by 8 pixels high. This size prefix can also be applied to those sub-macroblocks. The macroblocks with a size of 16×16 pixels are referred to as "basic macroblock."

FIG. 1 gives an overview of the present invention. The illustrated interframe prediction processor 1 is intended for use in a video coding device and a video decoding device which process a video data stream by dividing each given picture into small areas (called "macroblocks" or simply "blocks") with appropriate sizes for the purpose of motion estimation. The block size, i.e., the area size of a macroblock, is selected from among several prescribed sizes, depending on the magnitude of image motion or the required resolution of objects. The present description does not discuss the details of how to determine block sizes since some existing technical documents offer them.

According to the present invention, the interframe prediction processor 1 has, among others, an address selector 2 and a predictor calculator 3 to provide the following functions. The address selector 2 is responsive to an input from the predictor calculator 3 that designates a specific block within a given picture. According to the present invention, the address selector 2 provides memory addresses of reference motion vectors based on given MBAFF type information and coding type information. MBAFF type information indicates whether the given picture is supposed to be coded in MBAFF mode or in non-MBAFF mode. MBAFF mode allows selection between frame prediction and field prediction for each block pair. Non-MBAFF mode includes frame mode and field mode. Coding type information indicates whether each pair of blocks, including the current block pair and its adjacent block pairs, is organized in frame form (i.e., in the form of interlaced top and bottom field lines) or in field form (i.e., in the form of separate top and bottom fields).

When performing motion compensation with reference to blocks outside the current block pair, and when the MBAFF type information indicates that the given picture is supposed to be coded in MBAFF mode, the address selector 2 provides memory addresses of reference motion vectors according to the coding type information about the current block pair and its adjacent block pairs. The address selector 2 may be designed to have a table to provide memory addresses of reference motion vectors, as will be described in detail later.

The predictor calculator 3 determines a motion vector predictor for each constituent block of the current block pair, based on reference motion vectors read out of the provided memory addresses.

The above-outlined interframe prediction processor 1 operates as follows. The address selector 2 receives information about MBAFF type and coding type. When performing motion compensation for a given MBAFF picture with reference to blocks surrounding a current block, the address selector 2 provides memory addresses of reference motion vectors according to the coding type of the current block pair, as well as to the coding type of the reference blocks. The predictor calculator 3 reads motion vectors out of the provided memory addresses and determines a motion vector predictor from those reference motion vectors for each block constituting the current block pair.

The next and some subsequent sections will discuss H.264 video coding and decoding devices as a more specific embodiment of the present invention. The H.264 standard offers the following options for macroblock size: 16×16, 16×8, 8×16, and 8×8. If the 8×8 mode is chosen, each of the four 8×8 macroblock partitions may be split into smaller blocks with the following sizes: 8×8, 8×4, 4×8, and 4×4 (known as macroblock sub-partitions). The baseline coding algorithm encodes each given source frame on a macroblock basis, switching between intraframe coding utilizing spatial redundancy within a frame and interframe coding utilizing temporal redundancy between successive frames. A video decoding process reverses the above steps to reconstruct original video from compressed video. While H.264 allows bidirectional motion prediction, the following description assumes forward prediction for simplicity purposes. The present invention, however, should not be limited to the forward prediction. One skilled in the art would appreciate that the present invention can also be applied to bidirectional prediction by adding some memory areas to store motion vectors for both past and future reference frames. For explanatory purposes, the next section will describe a first embodiment of the present invention, assuming non-MBAFF coding. The first embodiment will then be followed by a second embodiment of the invention, the description of which assumes MBAFF coding.

Video Coding Device

First Embodiment

Figure 2:
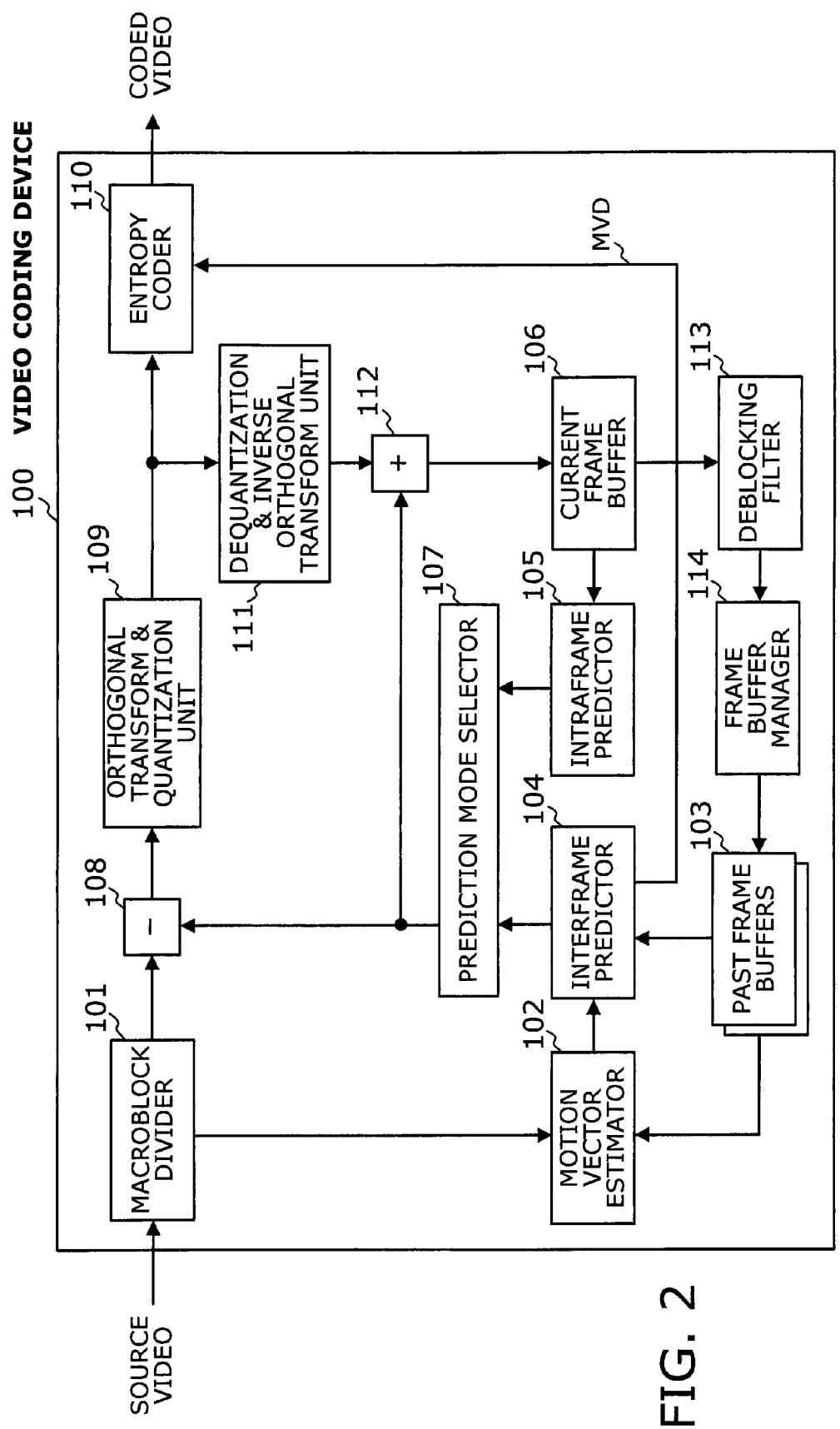
FIG. 2 is a block diagram of a video coding device according to a first embodiment of the present invention.

FIG. 2 is a block diagram of a video coding device according to a first embodiment of the present invention. The illustrated video coding device 100 includes the following elements: a macroblock divider 101, a motion vector estimator 102, past frame buffers 103, an interframe predictor 104, an intraframe predictor 105, a current frame buffer 106, a prediction mode selector 107, a subtractor 108, an orthogonal transform & quantization unit 109, an entropy coder 110, a dequantization & inverse orthogonal transform unit 111, an adder 112, a deblocking filter 113, and a frame buffer manager 114.

The macroblock divider 101 divides a given source picture into macroblocks of a predetermined size. The motion vector estimator 102 compares video signal components of a source macroblock with those of reference macroblocks stored in the past frame buffers 103, thereby calculating a motion vector for that source macroblock. Since motion vectors for neighboring blocks are often highly correlated, the motion vector of a specific block can be predicted from vectors of its surrounding blocks. The interframe predictor 104 thus calculates a motion vector predictor MVP from such surrounding motion vectors and then calculates a motion vector difference MVD by subtracting MVP from the true motion vector. The intraframe predictor 105, on the other hand, performs intraframe coding of a frame stored in the current frame buffer 106. The prediction mode selector 107 selects a coding mode that maximizes the efficiency of coding of the current macroblock by, for example, comparing prediction error of the interframe predictor 104 with that of the intraframe predictor 105. The prediction mode selector 107 creates coding mode parameters to indicate the selection result. The coding mode parameters are passed to the entropy coder 110 as part of data to be entropy-coded. The coding mode parameters include the size of macroblock partitions and the size of sub-macroblock partitions.

When the intraframe mode is selected, the divided source macroblocks are supplied as is from the macroblock divider 101 to the orthogonal transform & quantization unit 109. Those macroblocks are orthogonal-transformed and quantized, and the resulting transform coefficients are passed to the entropy coder 110 for entropy-coding and transmission. The transform coefficients are also decoded by the dequantization & inverse orthogonal transform unit 111 and sent into the current frame buffer 106.

When the interframe mode is selected, the interframe predictor 104 supplies the entropy coder 110 with MVD for entropy coding. In addition, a picture predicted with MVP is given to the subtractor 108 through the prediction mode selector 107. The subtractor 108 subtracts the predicted picture from the source picture on a macroblock basis and sends the result to the orthogonal transform & quantization unit 109. The quantized output data is decoded locally by the dequantization & inverse orthogonal transform unit 111 and directed to the adder 112, where the prediction picture supplied through the prediction mode selector 107 is added. The resulting picture is written into the current frame buffer 106. The entropy coder 110 encodes given data using the entropy coding algorithm, thus outputting a coded video signal carrying video data in compressed form. The reference picture stored in the current frame buffer 106 is subjected to the deblocking filter 113, where the boundary region between macroblocks are smoothed out. The resulting picture is entered to a past frame buffer 103 through the frame buffer manager 114.

Video Decoding Device

First Embodiment

Figure 3:
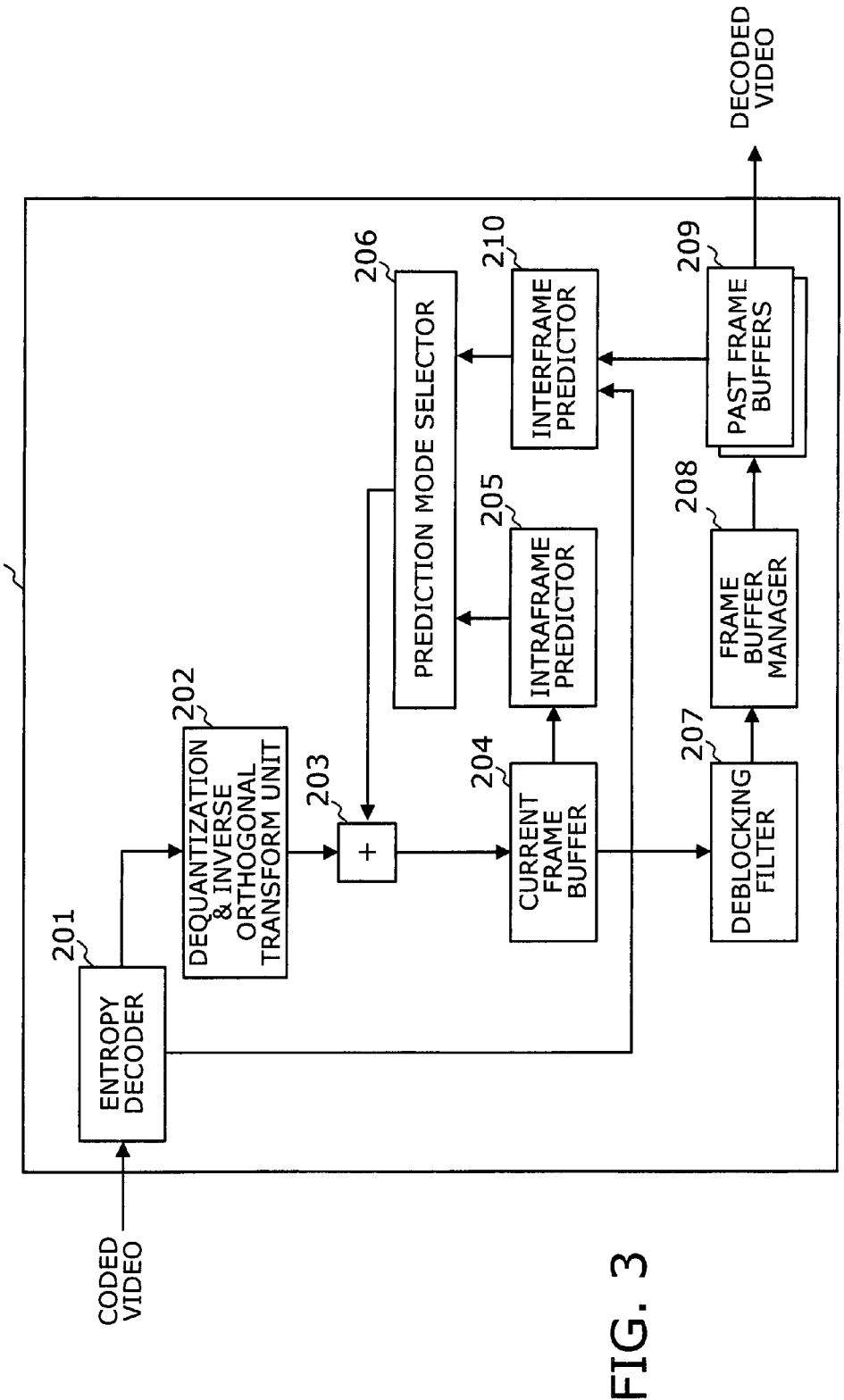
FIG. 3 is a block diagram of a video decoding device according to the first embodiment of the present invention.

FIG. 3 is a block diagram of a video decoding device according to the first embodiment of the present invention. The illustrated video decoding device 200 is formed from the following elements: an entropy decoder 201, a dequantization & inverse orthogonal transform unit 202, an adder 203, a current frame buffer 204, an intraframe predictor 205, a prediction mode selector 206, a deblocking filter 207, a frame buffer manager 208, past frame buffers 209, and an interframe predictor 210. With those elements, the video decoding device 200 decodes a coded video signal produced by the video coding device 100 of FIG. 2.

A given coded video signal is entropy-decoded by the entropy decoder 201 and then dequantized and back-transformed by the dequantization & inverse orthogonal transform unit 202. The outcomes of this decoding process include, among others, coding mode parameters and, in the case of interframe coding, motion vector data in the form of MVD. Based on the decoded coding mode parameters, the prediction mode selector 206 selects either the intraframe predictor 205 or the interframe predictor 210.

When the intraframe predictor 205 is selected, the picture frame reconstructed by the dequantization & inverse orthogonal transform unit 202 is routed to the current frame buffer 204. When the interframe predictor 210 is selected, the motion vector differences MVDs are decoded back to the original motion vectors that the video coding device 100 (FIG. 2) produced for individual macroblocks. With the resulting motion vectors, the interframe predictor 210 reproduces and supplies a prediction picture to the adder 203 through the prediction mode selector 206. The prediction error decoded at the dequantization & inverse orthogonal transform unit 202 is then added to this prediction picture. The resulting decoded picture is entered to the current frame buffer 204. This picture data in the current frame buffer 204 is transferred to one of the past frame buffers 209 through a deblocking filter 207 and frame buffer manager 208.

Figure 4:
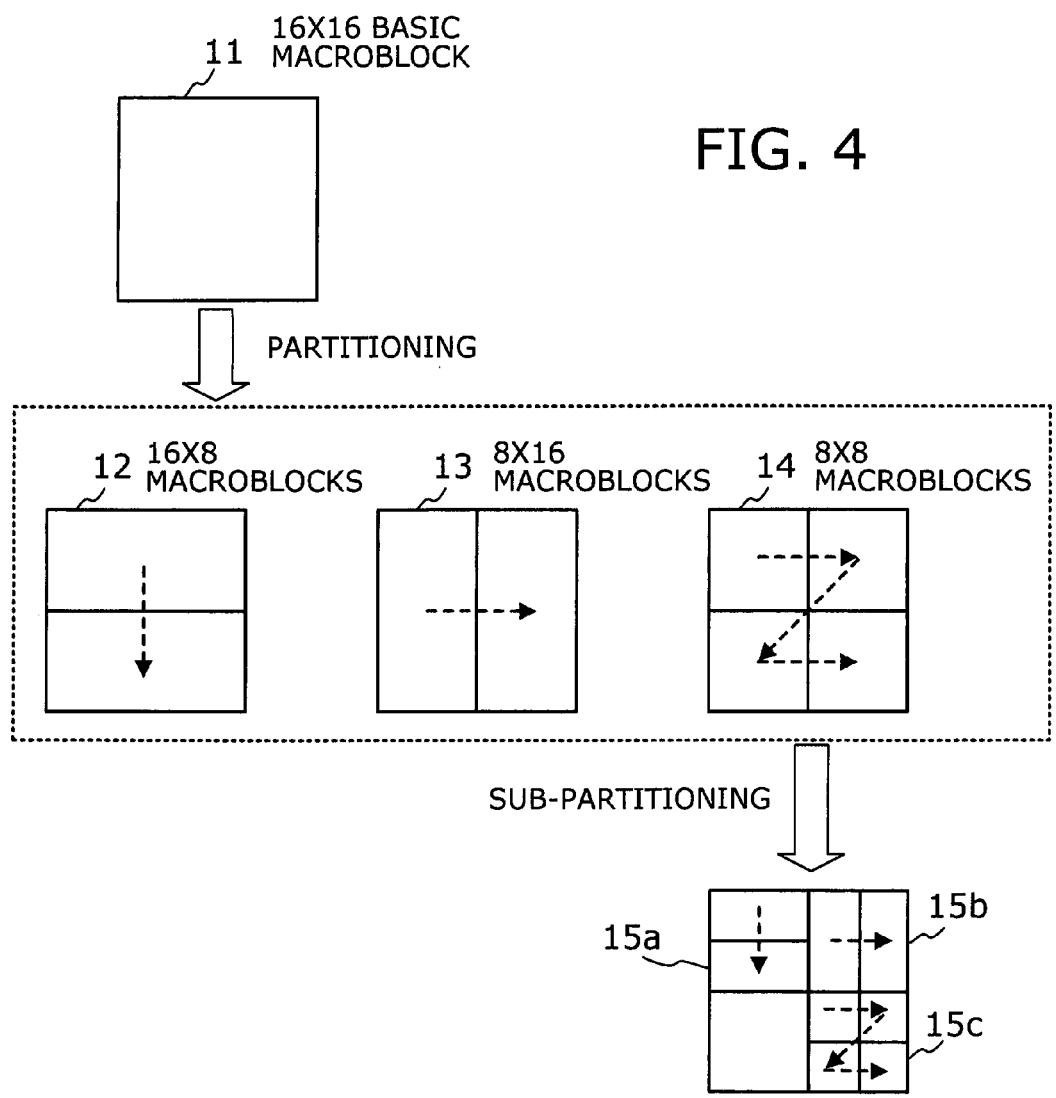
FIG. 4 shows various sizes of macroblocks and sub-macroblocks defined in H.264.

The interframe predictor 210 in the above-described video decoding device 200 decodes motion vectors as follows. FIG. 4 shows various sizes of macroblocks and sub-macroblocks defined in H.264, where the broken arrows indicate the order of processing.

Shown in the topmost part of FIG. 4 is a basic macroblock 11 with a size of 16×16 pixels. Where appropriate in this specification, the size of a block is designated as a prefix representing width by height (as in "16×16 macroblock 11"). The 16×16 basic macroblock 11 may be vertically partitioned into two 16×8 macroblocks 12, or horizontally partitioned into two 8×16 macroblocks 13, or partitioned in both ways into four 8×8 macroblocks 14. As the dotted arrows indicate, the 16×8 macroblocks 12 are processed from top to bottom. The 8×16 macroblocks 13 are processed from left to right. The 8×8 macroblocks 14 are processed from top-left to top-right, then bottom-left to bottom-right.

H.264 further allows an 8×8 macroblock 14 to be divided into smaller partitions called "sub-macroblocks." The above-noted size prefix can also be applied to those sub-macroblocks. In the example shown in FIG. 4, the top-left 8×8 macroblock 14 is divided into two 8×4 sub-macroblocks 15*a*, the top-right 8×8 macroblock 14 is divided into two 4×8 sub-macroblocks 15b, and the bottom-right 8×8 macroblock 14 is divided into four 4×4 sub-macroblocks 15c. Sub-macroblocks are supposed to be processed in the same order as in the macroblock partitions described above.

Figure 5:
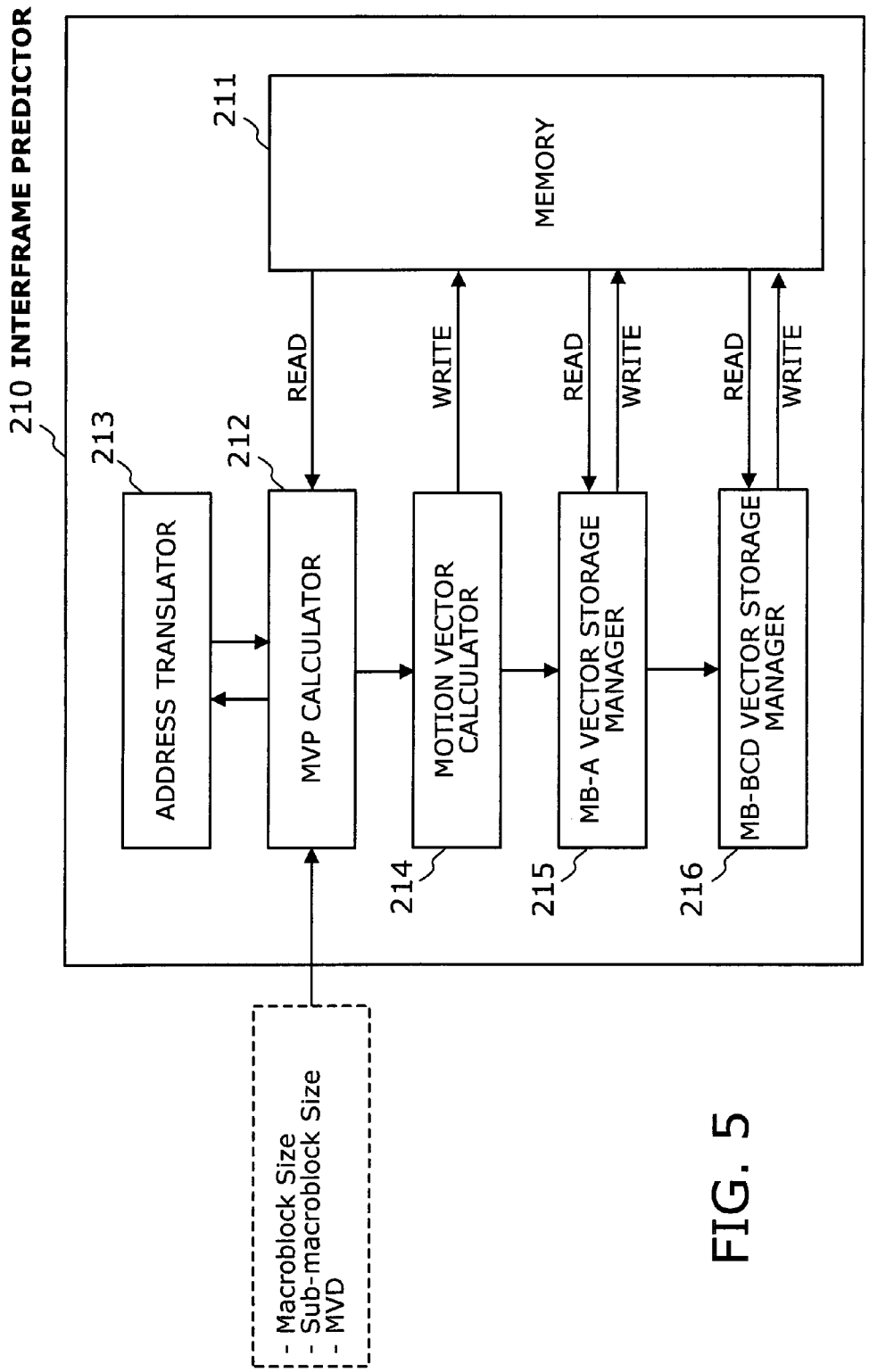
FIG. 5 is a functional block diagram showing how the proposed video decoding device calculates motion vectors for interframe prediction according to the first embodiment of the invention.

FIG. 5 is a functional block diagram showing how the proposed video decoding device 200 calculates motion vectors for interframe prediction according to the first embodiment of the invention. Specifically, the interframe predictor 210 includes the following elements: a memory 211, an MVP calculator 212, an address translator 213, a motion vector calculator 214, an MB-A vector storage manager 215, and an MB-BCD vector storage manager 216. Let the symbol "Cu" represent a currently processed macroblock. Macroblocks surrounding this current block Cu are referred to as "MB-A" (immediately left), "MB-B" (immediately above), "MB-C" (diagonally above the top-right corner), and "MB-D" (diagonally above the top-left corner). Also, three adjacent macroblocks MB-B, MB-C, and MB-D are collectively referred to by the symbol "MB-BCD."

The memory 211 stores motion vectors that have been calculated earlier for preceding macroblocks. Some of those motion vectors are used to calculate MVP of the current macroblock. The memory 211 also offers a storage space for a motion vector for the current block, as will be described in detail later. Actually, calculated motion vectors are stored in some selected vector storage locations. Such locations will be referred to hereinafter as the "representative vector storage locations," and the motion vectors stored in those locations will be referred to as "representative vectors."

The MVP calculator 212 specifies each relevant adjacent macroblock surrounding the current macroblock Cu to the address translator 213, thus obtaining the address of each corresponding representative vector storage location in the memory 211. With the representative vectors read out of the obtained addresses, the MVP calculator 212 calculates MVP. While there are various ways to determine MVP, the present embodiment calculates the median of motion vectors of adjacent macroblocks as a motion vector predictor MVP:

$$MVP=\text{Median}(MV\text{-}A, MV\text{-}B, MV\text{-}C) \qquad (1)$$

where MV-A, MV-B, and MV-C refer to motion vectors of adjacent macroblocks MB-A, MB-B, and MB-C, respectively. Motion vector MV-C in formula (1) may be replaced with another motion vector MV-D of macroblock MB-D in the case the current macroblock is located on the right edge of the frame, where MV-C is not available. The median of three variables x, y, and z is expressed as follows:

$$\text{Median}(x,y,z)=x+y+z-\text{Min}(x,\text{Min}(y,z))-\text{Max}(x,\text{Max}(y,z)) \qquad (2)$$

where Min(x, y) denotes the smaller of x and y, and Max(x, y) the greater of x and y.

The address translator 213 translates a given adjacent macroblock size (or sub-macroblock size) into a representative vector storage location address. The motion vector calculator 214 reconstructs a motion vector from the MVP calculated by the MVP calculator 212 and the decoded MVD as follows:

$$MV=MVP+MVD \qquad (3)$$

The resulting motion vector MV is saved in the memory 211, more particularly, in a representative vector storage location corresponding to the current macroblock Cu.

The memory 211 maintains motion vectors calculated previously for each macroblock. The MB-A vector storage manager 215 reads out one of those stored motion vectors that corresponds to a macroblock to be referenced as an adjacent macroblock MB-A in the subsequent vector prediction process and enters it to an MB-A vector storage location in the memory 211. Likewise, the MB-BCD vector storage manager 216 reads out stored motion vectors corresponding to macroblocks to be referenced as adjacent macroblocks MB-B, MB-C, and MB-D in the subsequent vector prediction process and enters them to MB-BCD vector storage locations reserved in the same memory 211.

The above-described interframe predictor 210 operates according to an interframe prediction method proposed in the present embodiment. Details of this interframe prediction will be described in the following sections, assuming that the current picture is coded in frame mode.

Memory Arrangement for Motion Vectors

Figure 6:
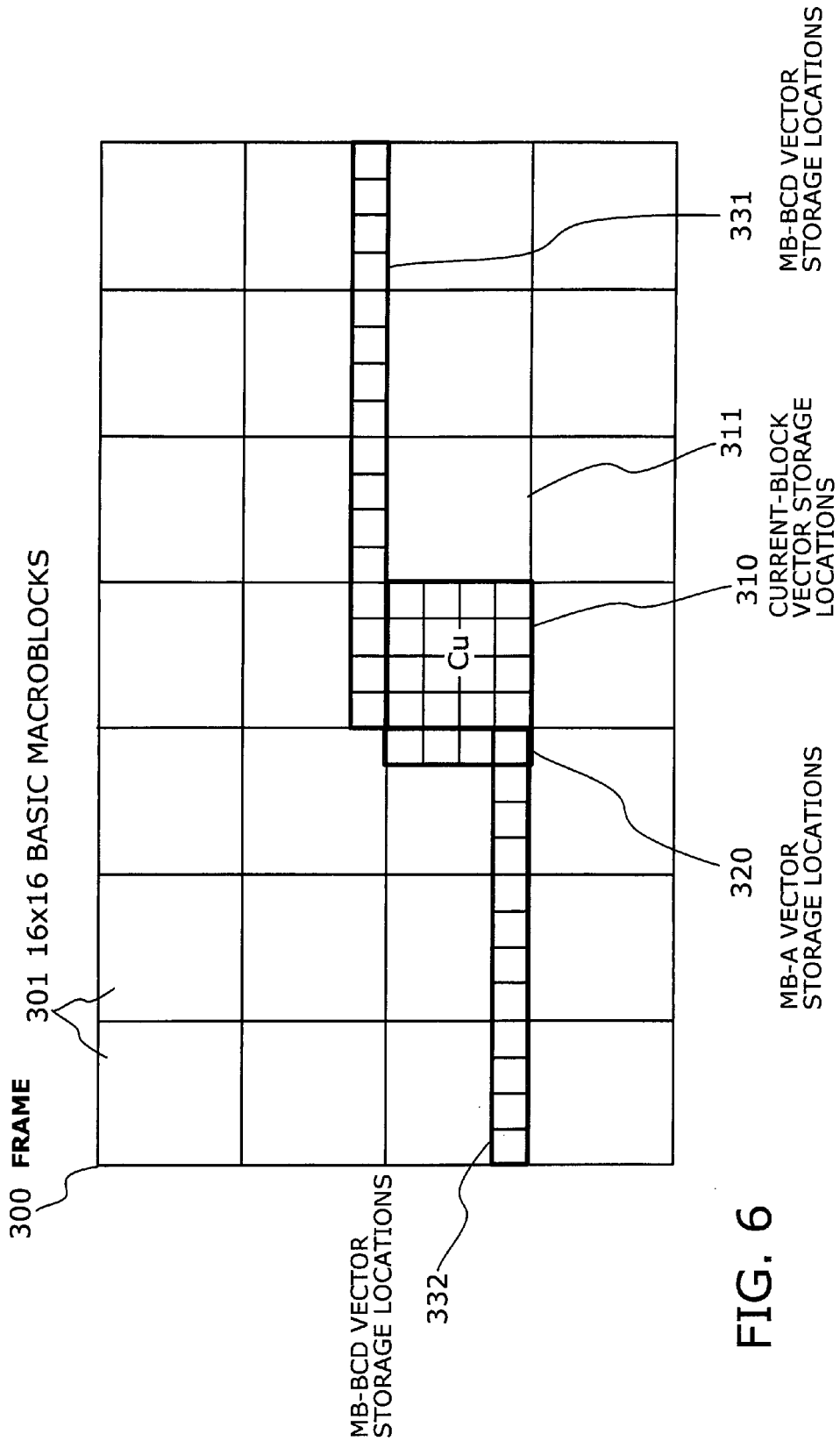
FIG. 6 shows the relationship between a frame structure and vector storage locations according to the first embodiment.

The memory 211 provides vector storage locations reserved for calculated motion vectors. FIG. 6 shows the relationship between a frame structure and vector storage locations according to the first embodiment. For interframe prediction, a given frame 300 is divided into a plurality of 16×16 basic macroblocks 301, where the size of macroblocks may be varied as necessary.

The memory 211 provides current-block vector storage locations 310 to accommodate motion vectors calculated for the current macroblock Cu. Also provided are adjacent-block vector storage locations 320, 331, and 332 to store motion vectors of adjacent macroblocks MB-A and MB-BCD. The current-block vector storage locations 310 can accommodate up to sixteen vectors, assuming that the current 16×16 basic macroblock Cu is partitioned into sixteen 4×4 sub-macroblocks, the minimum-size partitions.

The adjacent-block vector storage locations are divided into two classes. One class is MB-A vector storage locations 320 used to store motion vectors of macroblocks to be referenced as adjacent macroblocks MB-A. The MB-A vector storage locations 320 are mapped onto the four vertically-aligned 4×4 sub-macroblocks on the left of the current macroblock Cu. When motion vectors for the current macroblock Cu become available in the current-block vector storage locations 310, the MB-A vector storage manager 215 copies them to those MB-A vector storage locations 320.

Another class is MB-BCD vector storage locations 331 and 332 reserved to store motion vectors of macroblocks to be referenced as adjacent macroblocks MB-B, MB-C, and MB-D. The MB-BCD vector storage locations 331 are mapped onto the bottommost row of 4×4 sub-macroblocks immediately above the current macroblock Cu. This row includes adjacent macroblocks MB-B, MB-C, and MB-D. The MB-BCD vector storage locations 332 are mapped onto the bottommost row of 4×4 sub-macroblocks on the frame line to which the current macroblock Cu belongs. When motion vectors of the current macroblock Cu become available in the current-block vector storage locations 310, the MB-BCD vector storage manager 216 copies the vectors corresponding to the bottom-most sub-macroblocks to the MB-BCD vector storage locations 332. Those motion vectors MB-BCD vector storage locations 332 will be referenced later when the focus reaches the next line of the frame.

Motion vectors stored in the above-described vector storage locations in the memory 211 are updated as the processing focus moves. Suppose, for example, that the focus is moved from the current macroblock to the next macroblock 311. The vector storage locations that have been used to store motion vectors of the preceding macroblock then begins to serve the new current macroblock 311. The MB-A vector storage locations 320 are thus used to store the motion vectors at the rightmost blocks of the previous macroblock. The MB-BCD vector storage locations 331 and 332 are also rewritten in a similar way.

Sub-Macroblock Numbering

For convenience of explanation, the 4×4 sub-macroblock partitions of a basic macroblock are numbered as follows. FIG. 7 shows block numbers assigned to sub-macroblocks constituting a 16×16 macroblock. Specifically, the illustrated 16×16 basic macroblock 340 is first partitioned into four 8×8 macroblocks, and a numbering process takes place in the top-left, top-right, bottom-left, and bottom-right partitions in that order. Further, each 8×8 macroblock is partitioned into four 4×4 sub-macroblocks, and the resulting top-left, top-right, bottom-left, and bottom-right blocks are numbered in that order. As a result, the top-left, top-right, bottom-left, and bottom-right sub-macroblocks constituting the top-left 8×8 macroblock are numbered b0, b1, b2, and b3, respectively. Then the top-left, top-right, bottom-left, and bottom-right sub-macroblocks constituting the top-right 8×8 macroblock are numbered b4, b5, b6, and b7, respectively. Likewise, the four 4×4 sub-macroblocks constituting the bottom-left 8×8 macroblock are numbered b8 to b11, and those constituting the bottom-right 8×8 macroblock are numbered b12 to b15.

In the following sections, the block numbers b0 to b15 defined above will be used to refer to vector storage locations corresponding to macroblock partitions.

Motion Vector Calculation and Storage Management

Referring back to FIG. 5, the MVP calculator 212 consults the address translator 213 to obtain a memory address in which the motion vector of each referenced adjacent macroblock is stored. The MVP calculator 212 reads out the required motion vector from the obtained memory address and calculates MVP according to formula (1). Then using formula (3), the motion vector calculator 214 produces a motion vector from the calculated MVP and decoded MVD, thus writing the result in a representative vector storage location in the memory 211. It is assumed now that the representative vector storage location corresponds to the 4×4 sub-macroblock at the top-left corner of the current macroblock.

FIGS. 8A and 8B show how the first embodiment calculates and writes motion vectors in the case of 16×16 macroblocks. Specifically, FIG. 8A shows a representative motion vector produced for a macroblock, while FIG. 10B shows a memory write sequence for that vector.

Referring to FIG. 8A, the MVP calculator 212 reads motion vectors of b5 of MB-A, b10 of MB-B, b10 of MB-C, and b15 of MB-D adjacent to a 16×16 current macroblock Cu 400, so as to determine MVP according to formula (1). Then using formula (3), the motion vector calculator 214 produces a motion vector MV0 from the calculated MVP and decoded MVD. The calculated motion vector MV0 is stored in a vector storage location b0 401 corresponding to the top-left corner of the current macroblock Cu 400.

Referring to the sequence diagram of FIG. 8B, the EN signal initiates a write cycle of MV0 into a storage location b0 with address WAD=0. When a later MVP calculation process makes reference to this vector MV0, the address translator 213 provides its storage address automatically, thus eliminating the need for duplicating the same vector over predetermined vector storage locations in the memory 211. That is, the proposed method writes only one address, whereas the conventional method writes sixteen addresses. The present embodiment greatly reduces the processing time.

FIGS. 9A and 9B show how the first embodiment calculates and writes motion vectors in the case of 16×8 macroblocks. Specifically, FIG. 9A shows representative motion vectors produced for vertically partitioned macroblocks, while FIG. 9B shows a memory write sequence for those vectors.

Suppose that the current focus is on the upper 16×8 macroblock Cu0 411. The MVP calculator 212 reads motion vectors from b5 of MB-A, b10 of MB-B, b10 of MB-C, and b15 of MB-D, adjacent to the 16×8 current macroblock Cu0 411. The MVP calculator 212 determines MVP from those reference motion vectors, thus permitting the motion vector calculator 214 to calculate a motion vector MV0 for the current macroblock Cu0 411. The calculated motion vector MV0 is stored in a vector storage location corresponding to block b0 412 at the top-left corner of the current macroblock Cu0 411.

Suppose now that the focus moves to the lower 16×8 macroblock Cu1 413. The MVP calculator 212 reads motion vectors from b13 of MB-A, b2 of Cu0 411 (as MB-B), and b7 of MB-D, adjacent to the 16×8 current macroblock Cu1 413. The MVP calculator 212 determines MVP from those motion vectors, thus permitting the motion vector calculator 214 to calculate a motion vector MV1 for the current macroblock Cu1 413. (Note that there is no calculated motion vector for macroblock X.) The calculated MV1 is then stored in a vector storage location corresponding to block b8 414 at the top-left corner of the current macroblock Cu1 413.

Referring to the sequence diagram of FIG. 9B, the EN signal is asserted twice to initiate two write cycles. The first write cycle stores MV0 into a storage location b0 with address WAD=0. The second write cycle stores MV1 into another storage location b8 with address WAD=8.

FIGS. 10A and 10B show how the first embodiment calculates and writes motion vectors in the case of 8×16 macroblocks. Specifically, FIG. 10A shows representative motion vectors produced for horizontally partitioned macroblocks, while FIG. 10B shows a memory write sequence for those vectors.

Suppose that the current focus is on the left 8×16 macroblock Cu0 421. The MVP calculator 212 reads motion vectors from b5 of MB-A, b10 of MB-B, b14 of MB-C, and b15 of MB-D adjacent to the 8×16 current macroblock Cu0 421. The MVP calculator 212 determines MVP from those motion vectors, thus permitting the motion vector calculator 214 to calculate a motion vector MV0 for the current macroblock Cu0 421. The calculated motion vector MV0 is stored in b0 422 corresponding to the top-left corner of the current macroblock Cu0 421.

Suppose now that the focus moves to the right 8×16 macroblock Cu1 423. The MVP calculator 212 reads motion vectors from b1 of MB-A (=previous 8×16 macroblock Cu0), b14 of MB-B, b10 of MB-C, b11 of MB-D adjacent to the 8×16 current macroblock Cu1 423. The MVP calculator 212 determines MVP from those motion vectors, thus permitting the motion vector calculator 214 to calculate a motion vector MV1 for the current macroblock Cu1 423. The calculated motion vector MV1 is stored in b4 424 at the top-left corner of the current macroblock Cu1 423.

Referring to the sequence diagram of FIG. 10B, the EN signal is asserted twice to initiate two write cycles. The first write cycle stores MV0 into a storage location b0 with address WAD=0. The second write cycle stores MV1 into another storage location b4 with address WAD=4.

FIGS. 11A and 11B show how the first embodiment calculates and writes motion vectors in the case of 8×8 macroblocks. Specifically, FIG. 11A shows four representative motion vectors produced for macroblock partitions, while FIG. 10B shows a memory write sequence for those vectors.

Suppose that the current focus is on the top-left 8×8 macroblock Cu0 431. The MVP calculator 212 reads motion vectors from b5 of MB-A, b10 of MB-B, b14 of MB-C, and b15 of MB-D adjacent to the current macroblock Cu0 431. The MVP calculator 212 determines MVP from those motion vectors, thus permitting the motion vector calculator 214 to calculate a motion vector MV0 for the current macroblock Cu0 431. The calculated motion vector MV0 is stored in b0 432 at the top-left corner of the current macroblock Cu0 431.

Suppose that the focus moves to the top-right 8×8 macroblock Cu1 433. Then the MVP calculator 212 reads motion vectors from b1 of MB-A (=previous 8×8 macroblock Cu0 431), b14 of MB-B, b10 of MB-C, and b11 of MB-D surrounding the current macroblock Cu1 433. The MVP calculator 212 determines MVP from those motion vectors, thus permitting the motion vector calculator 214 to calculate a motion vector MV1 for the current macroblock Cu1 433. The calculated motion vector MV1 is stored in b4 434 at the top-left corner of the current macroblock Cu1 433.

Suppose that the focus moves to the bottom-left 8×8 macroblock Cu2 435. Then the MVP calculator 212 reads motion vectors from b13 of MB-A, b2 of MB-B (=top-left 8×8 macroblock Cu0 431), b6 of MB-C (=top-right 8×8 macroblock Cu1 433), and b7 of MB-D surrounding the current macroblock Cu2 435. The MVP calculator 212 determines MVP from those motion vectors, thus permitting the motion vector calculator 214 to calculate a motion vector MV2 for the current macroblock Cu2 435. The calculated motion vector MV2 is stored in b8 436 at the top-left corner of the current macroblock Cu2 435.

Suppose that the focus moves to the bottom-right 8×8 macroblock Cu3 437. Then the MVP calculator 212 reads motion vectors from b9 of MB-A (=preceding 8×8 macroblock Cu2 435), b6 of MB-B (=top-right macroblock Cu1 433), and b3 (=top-left macroblock Cu0 431) surrounding the current macroblock Cu3 437. The MVP calculator 212 determines MVP from those motion vectors, thus permitting the motion vector calculator 214 to calculate a motion vector MV3 for the current macroblock Cu3 437. The resulting vector MV3 is stored in b12 438 at the top-left corner of the current macroblock Cu3 437.

Referring to the sequence diagram of FIG. 10B, the EN signal is asserted four times to initiate four write cycles. The first write cycle stores MV0 into a storage location b0 with address WAD=0. The second write cycle stores MV1 into another storage location b4 with address WAD=4. The third write cycle stores MV2 into a storage location b8 with address WAD=8. The fourth write cycle stores MV3 into another storage location b12 with address WAD=12.

FIGS. 12A, 12B, 13A, and 13B show how the first embodiment partitions a macroblock into sub-macroblocks and how it produces and writes a representative motion vector for them. Specifically, FIG. 12A shows an example of macroblock sub-partitioning, and FIG. 12B shows representative motion vectors produced for sub-macroblocks SB0 to SB2. FIG. 12A shows representative motion vectors produced for yet another sub-macroblock SB3. FIG. 12B is a sequence diagram showing how the resulting motion vectors are saved in the memory 211.

Referring to FIG. 12A, an example of macroblock sub-partitioning is shown. Each 8×8 macroblock may be partitioned into smaller blocks. Specifically, the top-left 8×8 macroblock is not really partitioned, but remains as a single 8×8 block SB0 441. The top-right 8×8 macroblock is divided into two 8×4 blocks, SB1-0 451 and SB1-1 453. The bottom-left 8×8 macroblock is divided into two 4×8 blocks, SB2-0 461 and SB2-1 463. The bottom-right 8×8 macroblock is divided into four 4×4 blocks, SB3-0 471, SB3-1 472, SB3-2 473, and SB3-3 474.

Referring to FIG. 12B, motion vectors for those sub-macroblocks are determined as follows. For the top-left sub-macroblock SB0 441, a motion vector MV0 is determined from motion vectors of surrounding blocks and saved in b0 442 at the top-left corner of SB0 441. For the upper 8×4 sub-macroblock SB1-0 451, a motion vector MV1 is determined from motion vectors of surrounding blocks and saved in b4 452 corresponding to the left half of SB1-0 451. Likewise, a motion vector MV2 is produced for the lower 8×4 sub-macroblock SB1-1 453 and saved in b6 454 corresponding to the left half of SB1-1 453. A motion vector MV3 is produced for the left 4×8 sub-macroblock SB2-0 461 and saved in b8 462, and a motion vector MV4 is produced for the right 4×8 sub-macroblock SB2-1 463 and saved in b9 464 in a similar way.

Referring to FIG. 13A, four motion vectors MV5, MV6, MV7, and MV8 are determined for the minimum-sized sub-macroblocks SB3-0 471, SB3-1 472, SB3-2 473, and SB3-3 474, respectively. Those motion vectors are saved in their corresponding storage locations b12, b13, b14, and b15.

Referring to the sequence diagram of FIG. 13B, the EN signal initiates nine write cycles. The first write cycle stores MV0 in b0 with address WAD=0, and the second write cycle stores MV1 in b4 with address WAD=4. The third write cycle stores MV2 in b6 with address WAD=6, and the fourth write cycle stores MV3 in b8 with address WAD=8. The fifth write cycle stores MV4 in b9 with address WAD=9, and the sixth write cycle stores MV5 in b12 with address WAD=12. The seventh write cycle stores MV6 in b13 with address WAD=13, and the eighth write cycle stores MV7 in b14 with address WAD=14. Lastly, the ninth write cycle stores MV8 in b15 with address WAD=15.

The first embodiment of the invention saves a produced motion vector only in a specific vector storage location (e.g., the one corresponding to the top-left block) that represents the macroblock domain for which that vector is produced. As can be seen from FIG. 8A to 11B, the prediction process for a partitioned basic macroblock involves four write cycles at most if the partition size is 8×8 or more. It is only when every partition is a 4×4 block that all the sixteen storage locations for a basic macroblock are filled. In most cases, the prediction process is completed with a smaller number of write cycles, unlike the conventional process. The first embodiment thus reduces the time required to predict motion vectors.

The above-described process permits motion vectors to be stored in vector storage locations 310, 320, 331, and 332 reserved for the current macroblock Cu and its surrounding macroblocks MB-A and MB-BCD as discussed in FIG. 6.

Address Translation

The address translator 213 serves the MVP calculator 212 by translating given information specifying an adjacent macroblock into a specific address of a representative vector storage location corresponding to that macroblock. That is, the address translator 213 receives from the MVP calculator 212 a piece of information specifying a 4×4 adjacent macroblock to be referenced. More specifically, the MVP calculator 212 sends the identifier of a desired 16×16 basic macroblock, along with a specific block number (e.g., b0 to b15 shown in FIG. 7). The address translator 213 has an address translation table associating macroblock sizes and sub-macroblock sizes with representative vector storage locations to provide an address corresponding to a specified adjacent macroblock.

As discussed earlier in FIG. 6, the first embodiment reads out a reference motion vector from vector storage locations 320, 331, and 332 corresponding to adjacent macroblocks MB-A and MB-BCD when that reference motion vector lies outside the currently processed macroblock Cu. Whether a particular reference motion vector is an external vector or internal vector depends not only on the shape of the current macroblock, but also on the location of the current macroblock. This section will first explain the case of internal motion vectors and then proceeds to the case of external motion vectors.

For explanatory purposes, let us assume that external vectors can be handled in the same way as internal vectors. That is, it is assumed that motion vectors in every macroblock is stored in the same way as the current macroblock Cu of FIG. 6.

Figure 14:
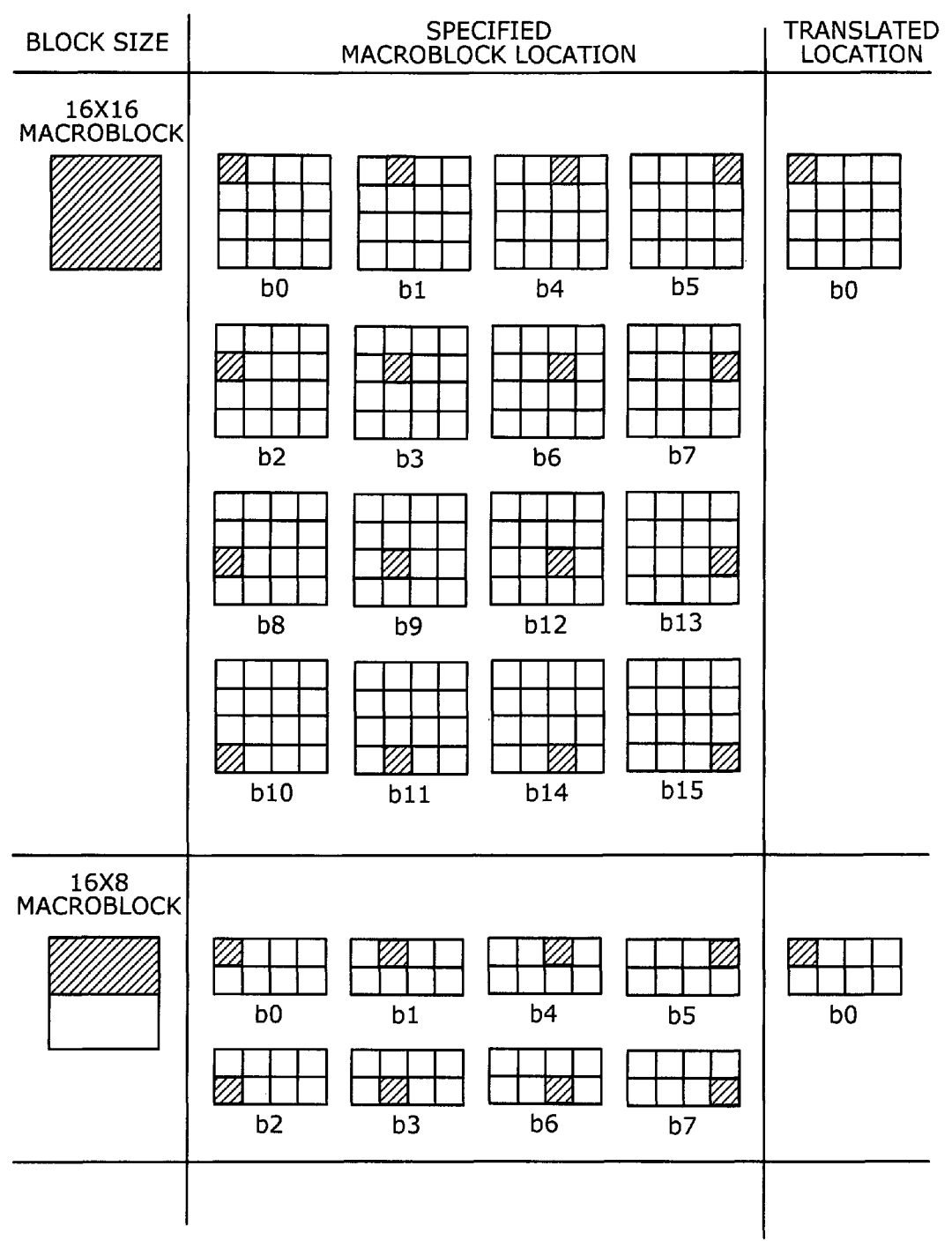

FIGS. 14 and 15 show how the address translation table function in the present embodiment. Specifically, FIG. 14 shows how the address translation table is used to make reference to 16×16 macroblocks and 16×8 macroblocks. FIG. 15 shows how the address translation table is used to make reference to 8×16 macroblocks, 8×8 macroblocks, 8×4 sub-macroblocks, 4×8 sub-macroblocks, and 4×4 sub-macroblocks.

When the adjacent macroblock of interest is a 16×16 macroblock, the MVP calculator 212 may specify one of the sixteen blocks b0 to b15 in its address request. The representative vector is, however, stored only in one vector storage location corresponding to block b0 in this case, as discussed in FIG. 8. In response to a request from the MVP calculator 212, the address translator 213 thus returns the vector storage location address of block b0, regardless of which block is specified in the request. The macroblocks referenced as adjacent macroblocks have undergone motion vector calculation, meaning that their sizes are known. The embodiment may therefore be configured to retain the size information of such adjacent macroblocks somewhere in memory for later reference.

When the adjacent macroblock of interest is an upper 16×8 macroblock, the MVP calculator 212 may specify one of the first eight blocks b0 to b7 in its address request. The representative vector in this case is stored in a vector storage location corresponding to block b0 as discussed in FIG. 9. In response to a request from the MVP calculator 212, the address translator 213 thus returns the vector storage location address of block b0, regardless of which block is specified in the request.

When the adjacent macroblock is a lower 16×8 macroblock (not shown), the MVP calculator 212 may specify one of the second eight blocks b8 to b15 in its address request. The representative vector in this case is stored in a vector storage location corresponding to block b8 as discussed in FIG. 9. The address translator 213 thus returns the vector storage location address of block b8 to the MVP calculator 212, regardless of which block is specified in the request.

Referring to FIG. 15, when the adjacent macroblock of interest is a left 8×16 macroblock, the MVP calculator 212 may specify one of the following blocks in its address request: b0, b1, b2, b3, b8, b9, b10, and b11. The representative vector in this case is stored in a vector storage location corresponding to block b0 as discussed in FIG. 10. The address translator 213 thus returns the address for that block b0 to the MVP calculator 212. When the adjacent macroblock is a right 8×16 macroblock (not shown in FIG. 15), the MVP calculator 212 may specify one of the following blocks in its address request: b4, b5, b6, b7, b12, b13, b14, and b15. The representative vector in this case is stored in a vector storage location corresponding to block b4 as discussed in FIG. 10. The address translator 213 thus returns the address for that block b4 to the MVP calculator 212.

When the adjacent macroblock of interest is a top-left 8×8 macroblock, the MVP calculator 212 may specify a block b0, b1, b2, or b3. The representative vector in this case is stored in a vector storage location corresponding to block b0 as discussed in FIG. 11. The address translator 213 thus returns the address for that block b0 to the MVP calculator 212. Likewise, when the MVP calculator 212 specifies a top-right 8×16 macroblock (not shown in FIG. 15) as an adjacent macroblock and a block position b4, b5, b6, or b7, the address translator 213 returns the address of a representative vector storage location for block b4. When the MVP calculator 212 specifies a bottom-left 8×16 macroblock (not shown in FIG. 15) and a block position b8, b9, b10, or b11, the address translator 213 returns a representative vector storage location address for block b8. When the MVP calculator 212 specifies a bottom-right 8×16 macroblock (not shown in FIG. 15) and a block position b12, b13, b14, or b15, the address translator 213 returns a representative vector storage location address for block b12.

The motion vector calculator 214 may request an address for a sub-macroblock. The following part of the description explains how the address translator 213 handles such requests, assuming, for simplicity, that the specified sub-macroblock belongs to a top-left 8×8 macroblock. The address translator 213 handles other types of sub-macroblocks in a similar way to determine a representative vector storage location uniquely from specified block size and position.

In the case of an upper 8×4 sub-macroblock of a top-left 8×8 macroblock, the motion vector calculator 214 may specify either block b0 or block b1 as an adjacent macroblock. The representative vector storage location in this case is the one corresponding to block b0. The address translator 213 thus returns the address of that vector storage location to the motion vector calculator 214.

In the case of a left 8×4 sub-macroblock of a top-left 8×8 macroblock, the motion vector calculator 214 may specify either block b0 or block b2 as an adjacent macroblock. The representative vector storage location in this case is the one corresponding to block b0. The address translator 213 thus returns the address of that vector storage location to the motion vector calculator 214.

In the case of a top-left 4×4 sub-macroblock of a top-left 8×8 macroblock, the motion vector calculator 214 specifies block b0 as an adjacent macroblock. The representative vector storage location in this case is the one corresponding to block b0. The address translator 213 thus returns the address of that vector storage location to the motion vector calculator 214.

As can be seen from the above, a relevant representative vector storage location can be determined by looking up a translation table with the macroblock size and sub-macroblock size of a specified adjacent macroblock, as well as with a specified block position (b0 to b15). This feature permits the MVP calculator 212 to reach a motion vector stored in a representative vector storage location by the motion vector calculator 214.

Although what is shown in FIGS. 14 and 15 is not a translation table per se, the essential function of the proposed address translation table is to derive a storage address from a specified combination of adjacent macroblock size and block position. The translation table may therefore be in any form that can associate possible combinations of a macroblock size and sub-macroblock size of an adjacent macroblock and a particular block position (b0 to b15) with specific representative vector storage locations.

Representative Vector Storage Locations

In the case where the desired reference motion vector is located outside the current macroblock Cu, the present embodiment operates as follows. Suppose, for example, that the current focus is on a 16×16 basic macroblock. Every reference motion vector in this case has to be found somewhere in vector storage locations 320, 331, and 332 (FIG. 6) reserved for adjacent macroblocks MB-A and MB-BCD.

FIG. 16 shows how the first embodiment saves motion vectors of adjacent macroblocks in MB-A vector storage locations. Suppose that the current focus is on a macroblock 501. A vector prediction process for this current macroblock 501 makes reference to its adjacent blocks MB-A (A0, A1, A2, A3). The macroblock 502 immediately preceding the current macroblock 501 has already been processed, and its motion vectors are stored in vector storage locations as representative motion vectors. The MB-A vector storage manager 215 reads out relevant representative motion vectors and stores them in storage locations corresponding to MB-A (A0, A1, A2, A3). In the case where a plurality of representative motion vectors exist on the same row, the MB-A vector storage manager 215 chooses and enters the rightmost vector to a corresponding MB-A vector storage location. When, for example, the macroblock 502 is horizontally partitioned into 8×16 macroblocks, representative motion vectors are calculated for two blocks b0 and b4 on the row of A0. In this case, the MB-A vector storage manager 215 chooses and stores the vector of block b4 in A0 since b4 is located to the right of b0.

FIG. 17 shows how the first embodiment saves motion vectors of adjacent macroblocks in MB-BCD vector storage locations. A vector prediction process for the current macroblock 501 makes access to the MB-BCD vector storage locations N0, N1, N2, N3, N4, and N5 as necessary. Macroblocks 503, 504, and 505 have already been processed, and the resulting motion vectors are stored in vector storage locations as representative motion vectors. The MB-BCD vector storage manager 216 reads out relevant representative motion vectors of, for example, a macroblock 503 and stores them in MB-BCD vector storage locations N1, N2, N3, and N4. Similarly, MB-BCD vector storage locations N0 and N5 receive representative motion vectors produced for macroblocks 504 and 505, respectively. In the case where a plurality of representative motion vectors exist on the same column, the MB-BCD vector storage manager 216 chooses and enters the bottommost vector to a corresponding MB-BCD vector storage location. For example, when the macroblock 503 is vertically partitioned into 16×8 macroblocks, representative motion vectors are calculated for two blocks b0 and b8 on the column of N1. In this case, the MB-BCD vector storage manager 216 chooses and stores the vector of block b8 in N1 since b8 is closer to the bottom than is b0.

The storage address for a representative motion vector depends on the block size. The following will describe a process of storing motion vectors for each block size.

FIGS. 18A to 20B show representative vector storage locations for adjacent macroblocks according to the present embodiment. More specifically, FIG. 18A shows those for a 16×16 macroblock. The motion vector calculator 214 produces one representative motion vector MV0 for a 16×16 macroblock 510 and stores it in block b0. The MB-A vector storage manager 215 reads out MV0 from block b0 and stores it in an MB-A vector storage location A0 511 located to the right of b0. Also, the MB-BCD vector storage manager 216 reads MV0 out of block b0 and stores it in an MB-BCD vector storage location N1 512 located below b0.

FIG. 18B shows representative vector storage locations for adjacent 16×8 macroblocks. In the case where a 16×16 basic macroblock is partitioned into two 16×8 macroblocks 520, the motion vector calculator 214 produces two representative motion vectors MV0 and MV8. The motion vector calculator 214 stores MV0 in block b0 and MV8 in block b8. The MB-A vector storage manager 215 reads out MV0 and MV8 from blocks b0 and b8 and stores them in MB-A vector storage locations A0 521 and A2 522 located to the right of b0 and b8, respectively. The MB-BCD vector storage manager 216, on the other hand, chooses MV8 since b8 is closer to the bottom edge than is b0. The MB-BCD vector storage manager 216 then stores this MV8 in an MB-BCD vector storage location N1 523 located below b0 and b8.

FIG. 19A shows representative vector storage locations for adjacent 8×16 macroblocks. In the case where a 16×16 basic macroblock is partitioned into two 8×16 macroblocks 530, the motion vector calculator 214 produces two representative motion vectors MV0 and MV4 and stores them in blocks b0 and b4, respectively. The MB-A vector storage manager 215, in this case, selectively reads out MV4 from block b4 since b4 is nearer the right edge than is b0. The MB-A vector storage manager 215 then stores it in an MB-A vector storage location A0 531 located to the right of b4. The MB-BCD vector storage manager 216, on the other hand, reads out MV0 and MV4 from blocks b0 and b4 and stores them in MB-BCD vector storage locations N1 532 and N3 533 below b0 and b4, respectively.

FIG. 19B shows representative vector storage locations for adjacent 8×8 macroblocks. In the case where a 16×16 basic macroblock is partitioned into 8×8 macroblocks 540, the motion vector calculator 214 produces four representative motion vectors MV0, MV4, MV8, and MV12 and stores them in blocks b0, b4, b8, and b12, respectively. The MB-A vector storage manager 215, in this case, reads out MV4 and MV12 from block b4 and b12 since they are nearer to the right edge than are b0 and b8, respectively. The MB-A vector storage manager 215 then stores MV4 and MV12 in MB-A vector storage locations A0 541 and A2 542. The MB-BCD vector storage manager 216, on the other hand, reads out MV8 and MV12 since b8 and b12 are closer to the bottom edge than are b0 and b4. The MB-BCD vector storage manager 216 then stores MV8 and MV12 in MB-BCD vector storage locations N1 543 and N3 544, respectively.

FIG. 20 shows representative vector storage locations for adjacent 4×4 sub-macroblocks. In the case where a 16×16 basic macroblock is partitioned into two 4×4 sub-macroblocks 550, the motion vector calculator 214 produces sixteen representative motion vectors MV0 to MV15 and stores them in blocks b0 to b15, respectively. The MB-A vector storage manager 215, in this case, chooses the rightmost motion vectors MV5, MV7, MV13, and MV15 and stores them in MB-A vector storage locations A0, A1, A2, and A3, respectively. Likewise, the MB-BCD vector storage manager 216 chooses the bottommost motion vectors MV10, MV11, MV14, and MV15 and stores them in MB-BCD vector storage locations N1, N2, N3, and N4, respectively. While not shown in FIG. 20, the MB-A vector storage manager 215 and MB-BCD vector storage manager 216 will work in a similar way in the case of 8×4 and 4×8 sub-macroblocks.

This section describes how address is translated when the MVP calculator 212 refers to outside motion vectors in MB-A or MB-BCD vector storage locations. The MVP calculator 212 gives the address translator 213 a piece of information specifying a specific adjacent 4×4 block. Upon receipt of this information, the address translator 213 determines whether there is an MB-A or MB-BCD vector storage location directly corresponding to the specified block. If not, the translation table discussed earlier in FIGS. 14 and 15 is used to provide the address of a relevant vector storage location. If there is, the address translator 213 produces an address by consulting another translation table as will be described with reference to FIGS. 21 to 24.

FIGS. 21 and 22 show how an address translation table is used to make reference to MB-A vector storage locations. Specifically, FIG. 21 shows the case where the source macroblock of a motion vector stored in an MB-A vector storage location is a 16×16, 16×8, 8×16, or 8×8 macroblock, and FIG. 22 shows the case of 8×4, 4×8, and 4×4 sub-macroblocks.

In the case where the source macroblock size of MB-A is 16×16, only a single motion vector MV0 is stored in A0 out of the four vector storage locations reserved for MB-A. While the MVP calculator 212 may specify A0, A1, A2, or A3, the translation table translates all these locations into the address of A0, thus permitting the MVP calculator 212 to read out MV0 from the same location A0 in this case, no matter which block it specifies.

In the case of 16×8 source macroblocks, two motion vectors MV0 and MV8 are stored in vector storage locations A0 and A2, respectively. When the MVP calculator 212 specifies A0 or A1, the translation table translates it to the address of A0. When the MVP calculator 212 specifies A2 or A3, the translation table translates it to the address of A2. The MVP calculator 212 can therefore obtain MV0 for A0 and A1, and MV2 for A2 and A3.

In the case of 8×16 source macroblocks, one motion vector MV4 is stored in the topmost vector storage location A0. When the MVP calculator 212 specifies A0, A1, A2, or A3, the translation table translates all these locations into the address of A0. The MVP calculator 212 therefore reads out MV0 in this case, no matter which block it specifies.

In the case of 8×8 source macroblocks, two motion vectors MV4 and MV12 are stored in vector storage locations A0 and A2, respectively. When the MVP calculator 212 specifies A0 or A1, the translation table translates it to the address of A0. When the MVP calculator 212 specifies A2 or A3, the translation table translates it to the address of A2. The MVP calculator 212 can therefore obtain MV4 for A0 and A1, and MV12 for A2 and A3.

FIG. 22 shows how the address is translated in the case of sub-partitioned MB-A blocks. FIG. 22 omits illustration of the left half of each basic macroblock since MB-A vector storage locations store the same set of representative motion vectors, no matter what block structure the left half may take.

In the case where the source macroblock is partitioned into 8×4 sub-macroblocks, motion vectors MV4, MV6, MV12, and MV14 are stored in vector storage locations A0, A1, A2, and A3, respectively. When the MVP calculator 212 specifies A0, A1, A2, or A3, the translation table translates those locations to their respective addresses.

In the case of 4×8 sub-macroblocks, motion vectors MV5 and MV13 are stored in vector storage locations A0 and A2, respectively. When the MVP calculator 212 specifies A0 or A1, the translation table translates it to the address of A0. When the MVP calculator 212 specifies A2 or A3, the translation table translates it to the address of A2.

In the case of 4×4 sub-macroblocks, motion vectors MV5, MV7, MV13, and MV15 are stored in vector storage locations A0, A1, A2, and A3, respectively. When the MVP calculator 212 specifies A0, A1, A2, or A3, the translation table translates those locations to their respective addresses.

As can be seen from FIGS. 21 and 22, the address translator 213 translates specified MB-A block locations to prescribed memory addresses by consulting its local address translation table. The obtained address is passed to the MVP calculator 212 for use in reading out a desired representative motion vector.

A similar address translation process takes place for MB-BCD vector storage locations. Specifically, FIGS. 23 and 24 show how the address translator 213 uses an address translation table to make reference to MB-BCD vector storage locations. More specifically, FIG. 23 shows address translation in the case where the source macroblock of a motion vector stored in an MB-BCD vector storage location is a 16×16, 16×8, 8×16, or 8×8 macroblock, while FIG. 24 shows the case of 8×4, 4×8, and 4×4 sub-macroblock.

In the case where the source macroblock size is 16×16, a single motion vector MV0 is stored in N1 out of the four available vector storage locations of MB-BCD. When the MVP calculator 212 specifies N1, N2, N3 or N4, the translation table translates it to the address of N1, thus permitting the MVP calculator 212 to read out MV0 from the same location A0 in this case, no matter which block it specifies.

In the case of 16×8 macroblocks, a single motion vector MV8 is stored in a vector storage location N1. When the MVP calculator 212 specifies N1, N2, N3 or N4, the translation table translates it into the address of N1, thus permitting the MVP calculator 212 to read out MV8, no matter which block it specifies.

In the case of 8×16 macroblocks, motion vectors MV0 and MV4 are stored in vector storage locations N1 and N3, respectively. When the MVP calculator 212 specifies N1 or N2, the translation table translates it into the address of N1. When the MVP calculator 212 specifies N3 or N4, the translation table translates it into the address of N3. The MVP calculator 212 can therefore obtain MV0 for N1 and N2, and MV4 for N3 and N4.

In the case of 8×8 macroblocks, motion vectors MV8 and MV12 are stored in vector storage locations N1 and N3, respectively. When the MVP calculator 212 specifies N1 or N2, the translation table translates it into the address of N1. When the MVP calculator 212 specifies N3 or N4, the translation table translates it into the address of N3. The MVP calculator 212 can therefore obtain MV8 for N1 and N2, and MV12 for N3 and N4.

FIG. 24 shows how the address is translated in the case of sub-partitioned MB-BCD blocks. FIG. 24 omits illustration of the upper half of each basic macroblock since MB-BCD vector storage locations store the same set of representative motion vectors, no matter what block structure the upper half may take.

In the case of 8×4 sub-macroblocks, motion vectors MV8 and MV12 are stored in vector storage locations N1 and N3. When the MVP calculator 212 specifies N1 or N2, the translation table translates it into the address of N1. When the MVP calculator 212 specifies N3 or N4, the translation table translates it into the address of N3.

In the case of 4×8 sub-macroblocks, motion vectors MV8, MV9, MV12, and MV13 are stored in vector storage locations N1, N2, N3, and N4, respectively. When the MVP calculator 212 specifies N1, N2, N3, or N4, the translation table translates those locations to their respective addresses.

In the case of 4×4 sub-macroblocks, motion vectors MV10, MV11, MV14, and MV15 are stored in vector storage locations N1, N2, N3, and N4, respectively. When the MVP calculator 212 specifies N1, N2, N3, or N4, the translation table translates those locations to their respective addresses.

As can be seen from FIGS. 23 and 24, the address translator 213 translates specified MB-BCD block locations to prescribed memory addresses by consulting its local address translation table. The obtained address is passed to the MVP calculator 212 for use in reading out a desired representative motion vector.

Reduced Vector Write Cycles

The above sections have described how the address translator 213 provides memory address for the MVP calculator 212 to read reference motion vectors for vector prediction. This arrangement of the present embodiment eliminates the need for the motion vector calculator 214 to expand each calculated motion vector in multiple memory locations for the purpose of later reference. By removing unnecessary vector write cycles, the present embodiment reduces the time required to calculate motion vectors. In the case of, for example, a 16×16 macroblock, the conventional vector calculation process takes sixteen write cycles to save a calculated motion vector, four write cycles to fill the MB-A vector storage locations, and another four write cycles to fill the MB-BCD vector storage locations. This means that the process includes 24 memory write cycles. In contrast to this, the present embodiment takes one write cycle to save a calculated motion vector, another write cycle to fill an MB-A vector storage location, and yet another write cycle to fill an MB-BCD vector storage location. That is, the present embodiment only requires three write cycles to process a 16×16 macroblock. This means that the number of write cycles can be reduced by maximum 21 cycles.

Think of 8×8 macroblocks, for another instance. While the conventional process takes 24 write cycles as in the case of 16×16 macroblocks, the present embodiment consumes eight cycles to save calculated motion vectors, two cycles to fill MB-A vector storage locations, and another two cycles to fill MB-BCD vector storage locations. The present embodiment only requires 12 memory write cycles, achieving a reduction of maximum 12 cycles. The effect of this write cycle reduction will be more prominent when the vector calculation process deals with a larger size of macroblocks, or when it processes wider and finer pictures.

The above sections have discussed motion vector prediction using an address translation mechanism, assuming pictures coded in frame mode. The proposed method, however, can also be applied to field mode. Specifically, the proposed method is used to process each set of top-field lines and bottom-field lines that constitute a video picture, which achieves the same effect as in the case of frame mode.

Video Decoding Device

Second Embodiment

This and subsequent sections describe a video decoding device according to a second embodiment of the present invention and, more particularly, how its interframe predictor decodes motion vectors. The second embodiment is different from the first embodiment in its capability of MBAFF processing. The following description will focus on this difference, using the same reference numerals as in the first embodiment to refer to like elements in the second embodiment.

In MBAFF mode, the term "current macroblock pair" is used to refer to a pair of 16×16 macroblocks that are currently processed, while two macroblocks adjacent to the current macroblock pair are called an "adjacent macroblock pair." In the following description of the second embodiment, the suffixes "a" and "b" are attached to reference numerals of the top macroblock and bottom macroblock belonging to a specific macroblock pair. According to the second embodiment, the MVP calculator 212 stores motion vectors of a current macroblock pair, regardless of whether it is coded in frame mode or field mode.

Figure 25B:
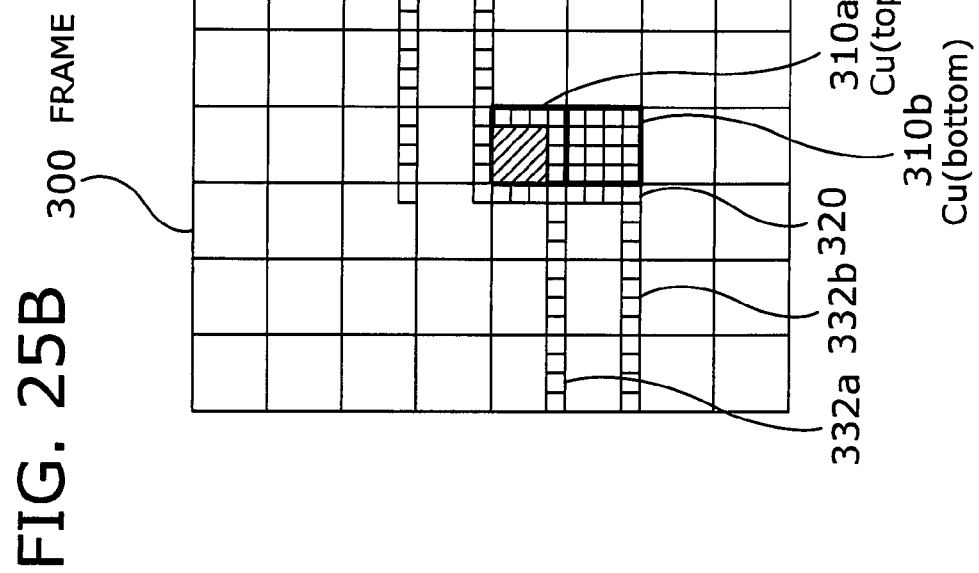
FIGS. 25A and 25B show the relationships between a frame structure and vector storage locations according to a second embodiment of the present invention.
Figure 25A:
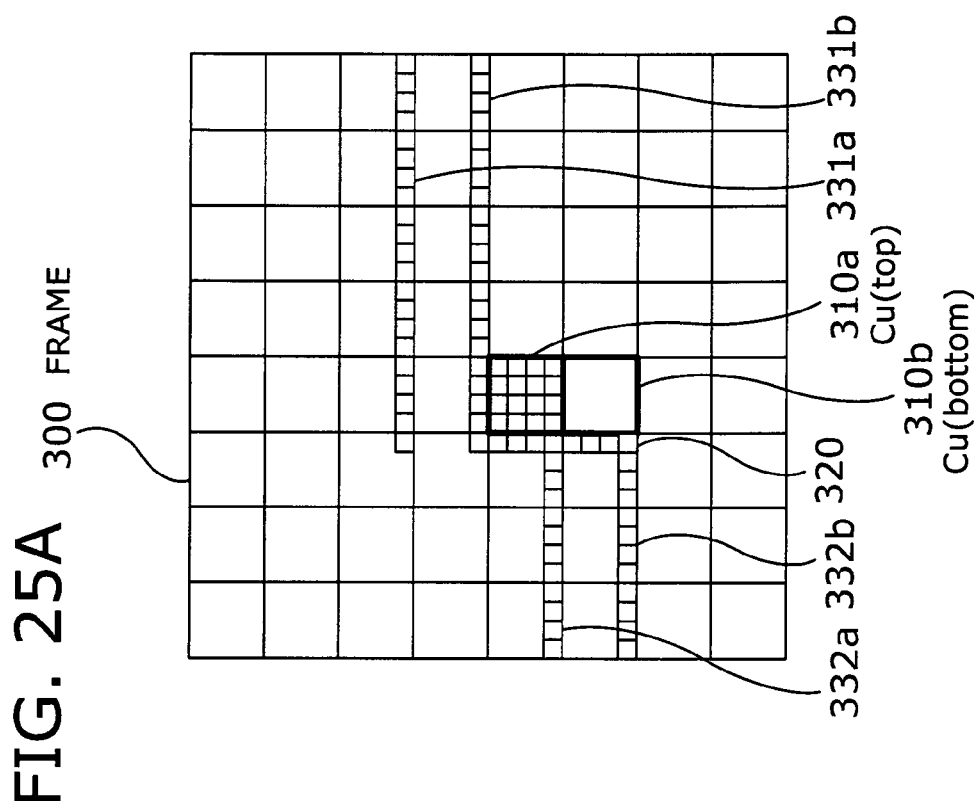

FIGS. 25A and 25B show the relationships between a frame structure and vector storage locations of a macroblock pair. Specifically, FIG. 25A shows that of a top macroblock, and FIG. 25B shows that of a bottom macroblock. According to the second embodiment of the invention, the MB-A vector storage manager 215, and MB-BCD vector storage manager 216 manage vector storage locations for both the top and bottom macroblocks.

The memory 211 provides current-block vector storage locations 310a and 310b to store motion vectors calculated for current macroblocks Cu(top) and Cu(bottom). Also provided are MB-A vector storage locations 320 and MB-BCD vector storage locations 331a, 331b, 332a, and 332b to store motion vectors of adjacent macroblocks MB-A and MB-BCD.

Eight MB-A vector storage locations 320 are reserved to store motion vectors of macroblocks to be referenced as adjacent macroblocks MB-A. They are mapped onto vertically-aligned 4×4 sub-macroblocks immediately to the left of the current macroblocks Cu(top) and Cu(bottom). When motion vectors for the current macroblock Cu(top) and Cu(bottom) become available in their respective vector storage locations 310a and 310b, the MB-A vector storage manager 215 copies motion vectors at the right-most column of 4×4 sub-macroblocks to those MB-A vector storage locations 320. Details of this processing will be discussed in a later section.

MB-BCD vector storage locations 331a, 331b, 332a, and 332b, on the other hand, are reserved for motion vectors of macroblocks to be referenced as adjacent macroblocks including at least MB-B, MB-C, and MB-D. Specifically, an adjacent pair of macroblocks immediately above the current macroblocks Cu(top) and Cu(bottom) are referenced when predicting motion vectors in MBAFF mode. MB-BCD vector storage locations 331a and 331b correspond to the bottom-most row of 4×4 sub-macroblocks of the top and bottom halves of that adjacent macroblock pair. Another set of MB-BCD vector storage locations 332a and 332b is mapped onto the bottommost row of 4×4 sub-macroblocks on the two frame lines to which the current macroblocks Cu(top) and Cu(bottom) belong. When motion vectors of the current macroblocks Cu(top) and Cu(bottom) become available in the current-block vector storage locations 310a and 310b, the MB-BCD vector storage manager 216 copies the vectors corresponding to the bottom-most 4×4 sub-macroblocks to the MB-BCD vector storage locations 332a and 332b.

When the MVP calculator 212 makes reference to existing motion vectors, the address translator 213 helps it by providing the address of those reference vectors. With this feature, the second embodiment eliminates the need for nine storage locations b0, b1, b2, b3, b4, b6, b8, b9, and b12 indicated by the hatching in FIG. 25B.

Figure 26:
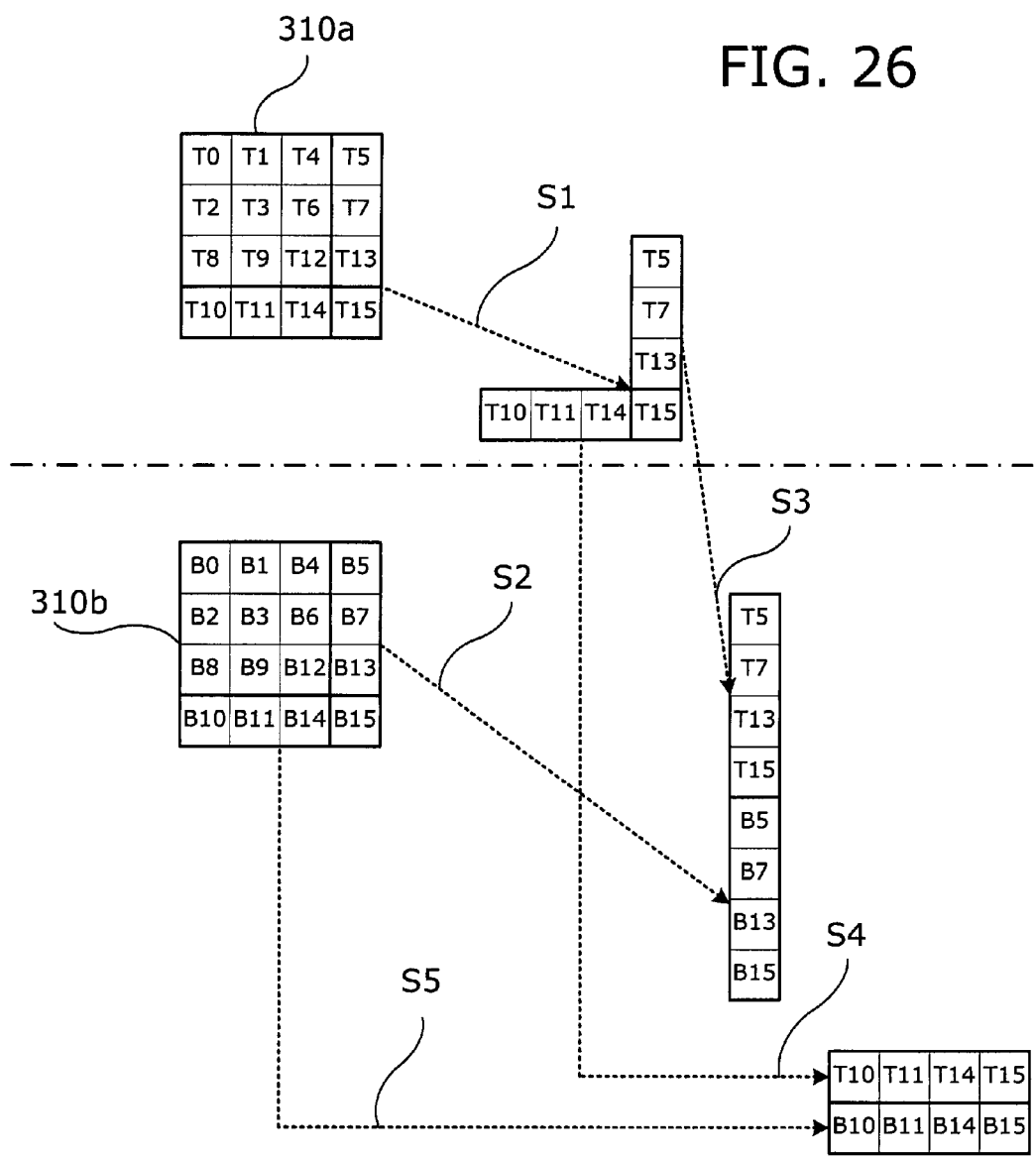
FIG. 26 shows how the second embodiment saves representative motion vectors for a current macroblock pair.

FIG. 26 shows how the second embodiment saves representative motion vectors for a current macroblock pair. First, a column of 4×4 sub-macroblocks T5, T7, T13, and T15 and a row of 4×4 sub-macroblocks T10, T11, T14, and T15 are selectively secured in their respective current-block vector storage locations 310a (step S1). Likewise, a column of 4×4 sub-macroblocks B5, B7, B13, and B15 and a row of 4×4 sub-macroblocks B10, B11, B14, and B15 are selectively secured in their respective current-block vector storage locations 310b (step S2). Then out of the set obtained at steps S1 and S2, the motion vectors of T5, T7, T13, T15, B5, B7, B13, and B15 are stored in MB-A vector storage locations 320 in that order (step S3). Likewise, out of the same set, a row of motion vectors of T10, T11, T14, and T15 are stored in MB-BCD vector storage locations 331 and 331a or 332a, as are another row of motion vectors of B10, B11, B14, B15 stored in MB-BCD vector storage locations 331b or 332b (steps S4, S5).

Adjacent Macroblock Locations in MBAFF Mode

Figures 27A, 27B:
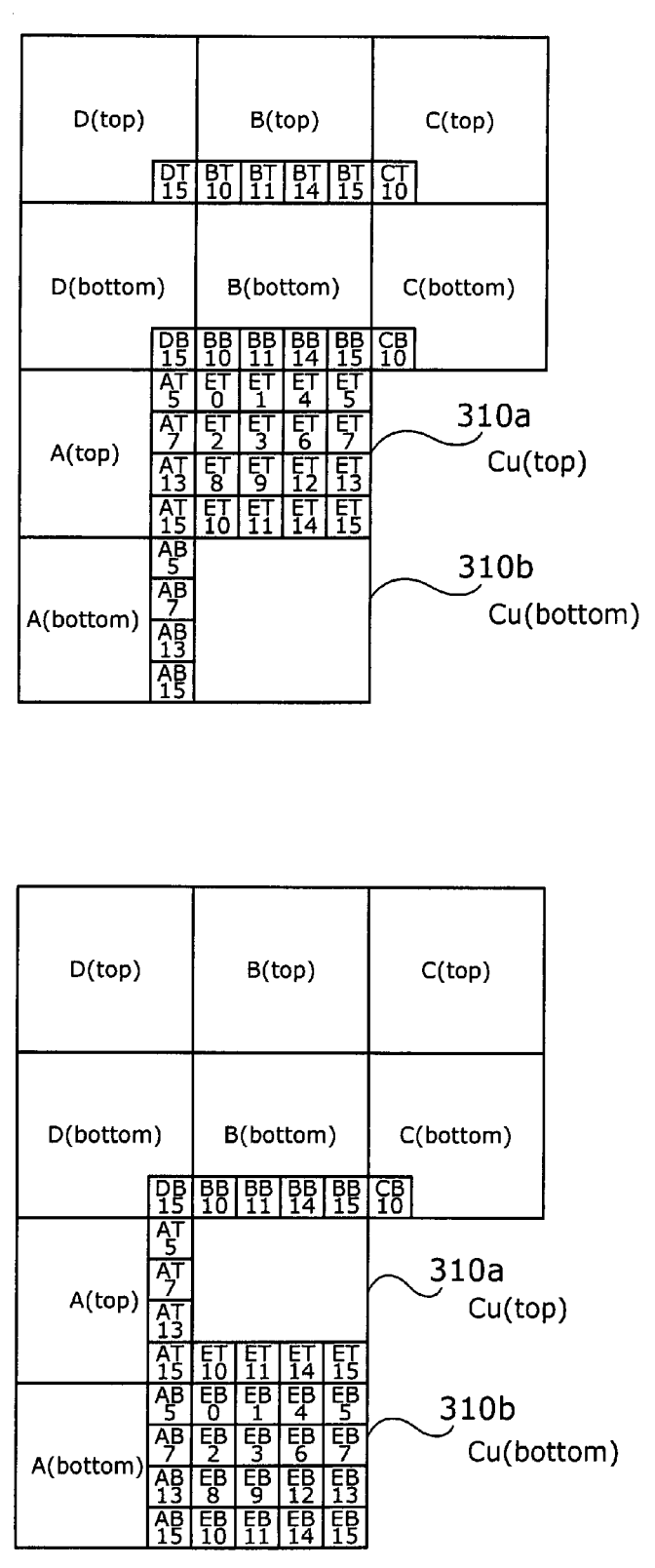

FIGS. 27A and 27B show the location of adjacent macroblocks MB-A and MB-BCD in MBAFF mode. The symbols "A(top)" and "A(bottom)" denote the top and bottom macroblocks of an adjacent macroblock pair MB-A, respectively. Specifically, FIG. 27A shows vector storage locations to be referenced as adjacent macroblocks MB-A when predicting a motion vector for a top current macroblock Cu(top) in MBAFF mode. Those storage locations include four vector storage locations (AT5, AT7, AT13, AT15) reserved for 4×4 sub-macroblocks immediately to the left of the current-block vector storage locations 310a. Also included are another four vector storage locations (AB5, AB7, AB13, AB15) corresponding to 4×4 sub-macroblocks immediately to the left of the bottom current macroblock Cu(bottom).

FIG. 27B, on the other hand, shows vector storage locations to be referenced as adjacent macroblocks MB-A when predicting a motion vector for a bottom current macroblock Cu(bottom) in MBAFF mode. Those storage locations include four vector storage locations (AT5, AT7, AT13, AT15) reserved for 4×4 sub-macroblocks immediately to the left of the current top macroblock Cu(top). Also included are another four vector storage locations (AB5, AB7, AB13, AB15) corresponding to 4×4 sub-macroblocks immediately to the left of the bottom current macroblock Cu(bottom).

FIG. 27A also shows vector storage locations to be referenced as adjacent macroblocks MB-BCD of the current top macroblock Cu(top). Those storage locations include four vector storage locations (BT10, BT11, BT14, BT15) reserved for the bottommost 4×4 sub-macroblocks of the top macroblock of an adjacent macroblock pair immediately above the current top macroblock Cu(top), as well as another four vector storage locations (BB10, BB11, BB14, BB15) corresponding to 4×4 sub-macroblocks immediately above the current top macroblock Cu(top). Also included are storage locations corresponding to the following 4×4 sub-macroblocks: DT15 immediately to the left of BT10, CT10 immediately to the right of BT15, DB15 immediately to the left of BB10, and CB10 immediately to the right of BB15.

Likewise, FIG. 27B shows vector storage locations to be referenced as adjacent macroblocks MB-BCD of the bottom current macroblock Cu(bottom). Those storage locations include four vector storage locations (ET10, ET11, ET14, ET15) reserved for the bottommost 4×4 sub-macroblocks of the current top macroblock Cu(top), as well as another four vector storage locations (BB10, BB11, BB14, BB15) corresponding to 4×4 sub-macroblocks immediately above the current top macroblock Cu(top). Also included are storage locations corresponding to the following 4×4 sub-macroblocks: AT15 immediately to the left of ET10, DB15 immediately to the left of BB10, and CB10 immediately to the right of BB15.

Figure 28A:
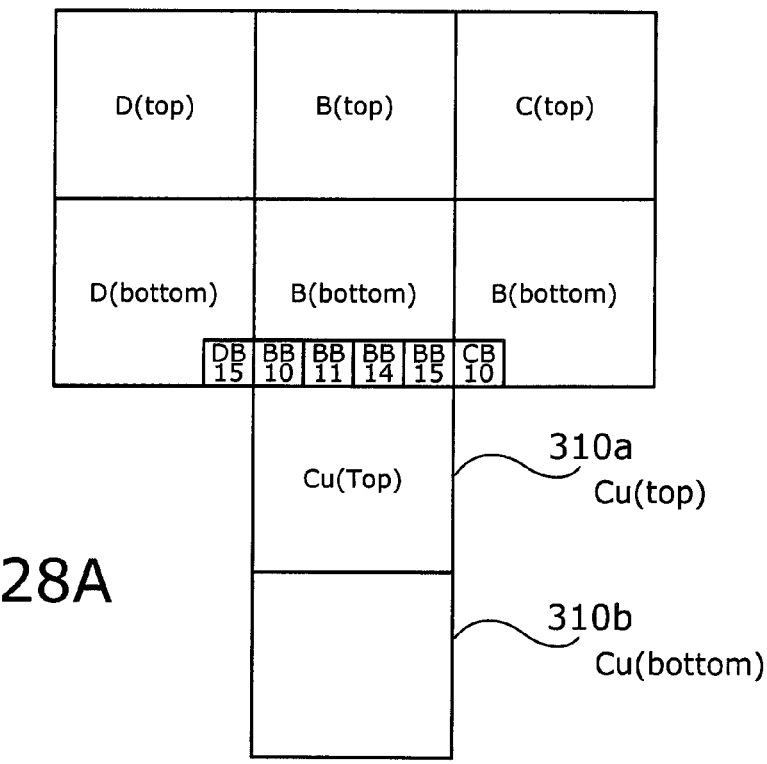
FIGS. 28A to 31B depict the detailed cases of MB-BCD adjacent macroblock locations.
Figure 28B:
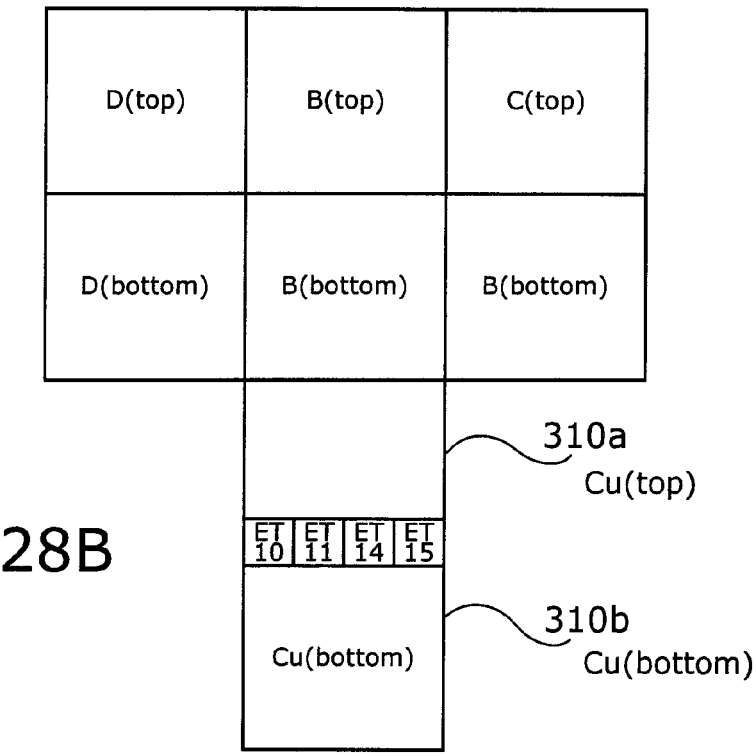

FIGS. 28A to 31B provide the detailed cases of MB-BCD adjacent macroblock locations. First, FIGS. 28A and 28B show the case where both the current macroblock pair and its adjacent macroblock pairs are frame pairs. Specifically, FIG. 28A depicts the location of adjacent macroblocks MB-BCD referenced by the current top macroblock. The current top macroblock Cu(top) makes reference to the following 4×4 sub-macroblocks: BB10, BB11, BB14, and BB15 at the bottommost row of an adjacent bottom macroblock immediately above the current top macroblock Cu(top), DB15 immediately to the left of BB10, and CB10 immediately to the right of BB15. FIG. 28B, on the other hand, shows the location of adjacent macroblocks MB-BCD referenced by the current bottom macroblock. The current bottom macroblock Cu(bottom) makes reference to the bottommost 4×4 sub-macroblocks ET10, ET11, ET14, and ET15 of the current top macroblock Cu(top).

Figure 29A:
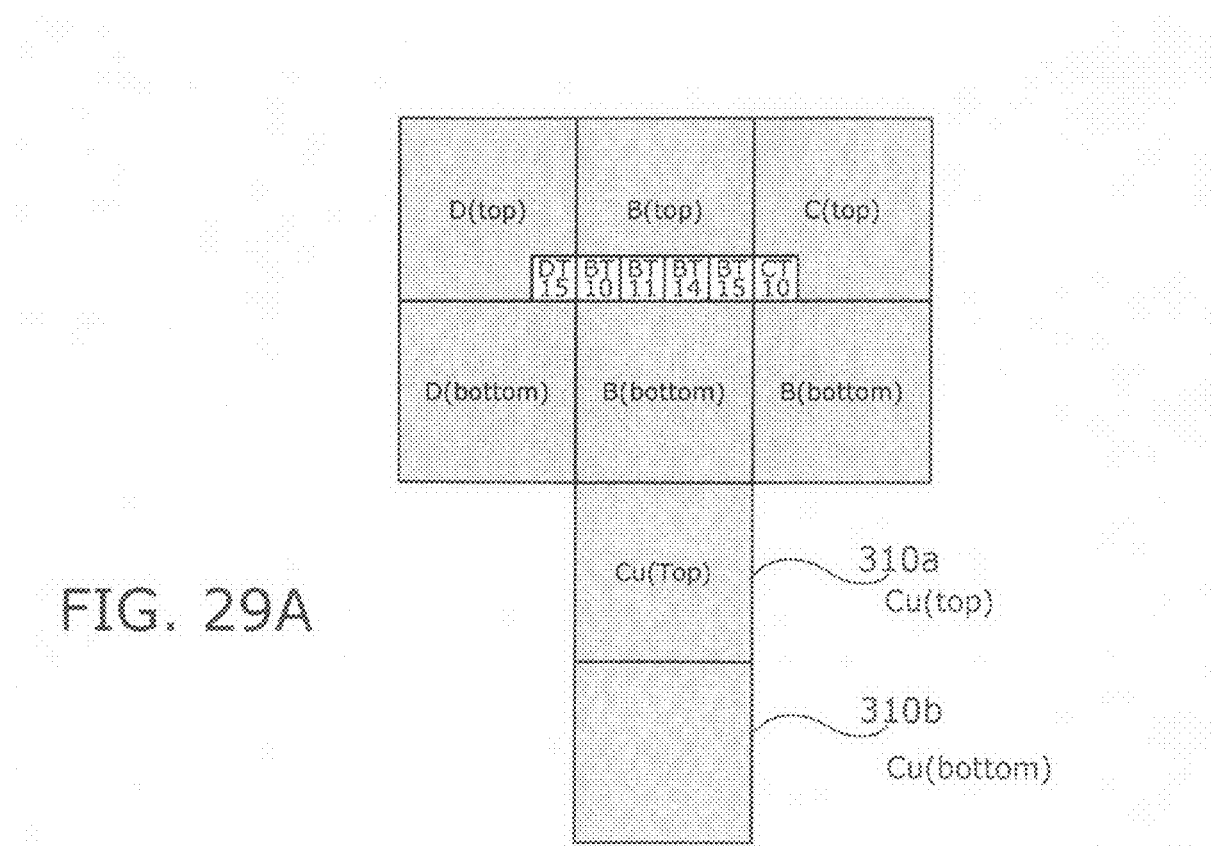
Figure 29B:
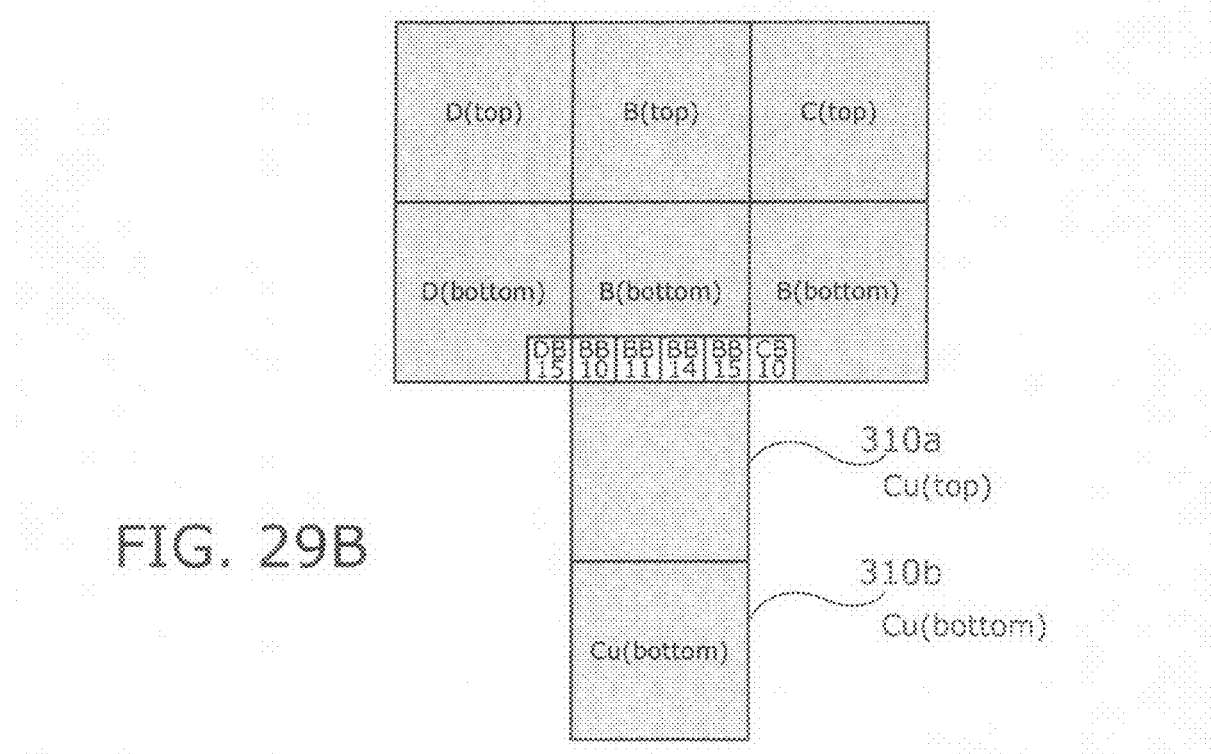

FIGS. 29A and 29B show the case where both the current macroblock pair and its adjacent macroblock pairs are field pairs. Specifically, FIG. 29A depicts the location of adjacent macroblocks MB-BCD referenced by the current top macroblock. The current top macroblock Cu(top) makes reference to the following 4×4 sub-macroblocks: BT10, BT11, BT14, and BT15 at the bottommost row of the top macroblock of an adjacent macroblock pair immediately above the current top macroblock Cu(top), DT15 immediately to the left of BT10, and CT10 immediately to the right of BT15. FIG. 29B, on the other hand, shows the location of adjacent macroblocks MB-BCD to be referenced by the current bottom macroblock Cu(bottom). Specifically, the current bottom macroblock Cu(bottom) makes reference to 4×4 sub-macroblocks BB10, BB11, BB14, and BB15 at the bottommost row of the bottom macroblock of an adjacent macroblock pair immediately above the current top macroblock Cu(top).

Figure 30A:
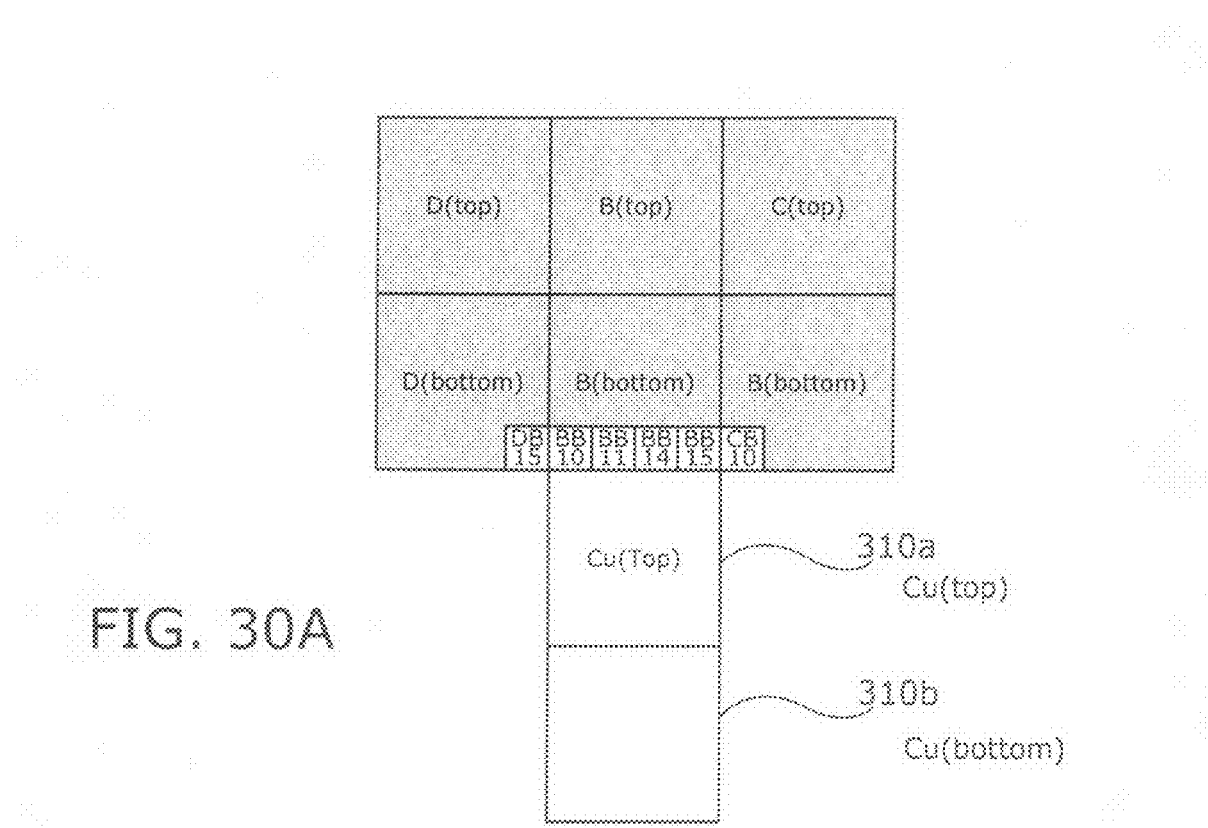
Figure 30B:
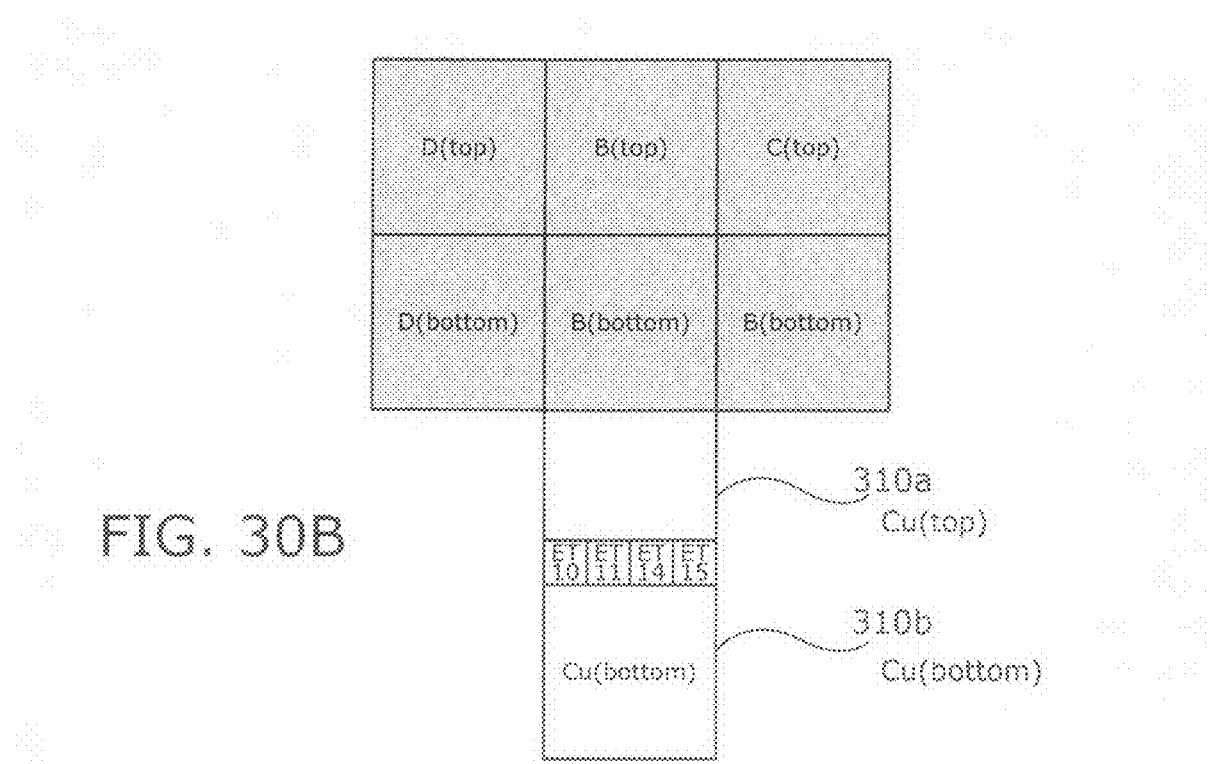

FIGS. 30A and 30B show the case where the current macroblock pair is a frame pair while its adjacent macroblock pairs are field pairs. Specifically, FIG. 30A depicts the location of adjacent macroblocks MB-BCD referenced by the current top macroblock Cu(top), and FIG. 30B shows that of the bottom current macroblock Cu(bottom). Notice that the same sub-macroblocks are referenced as in the case of FIG. 28. See the description of FIG. 28 for details.

Figure 31A:
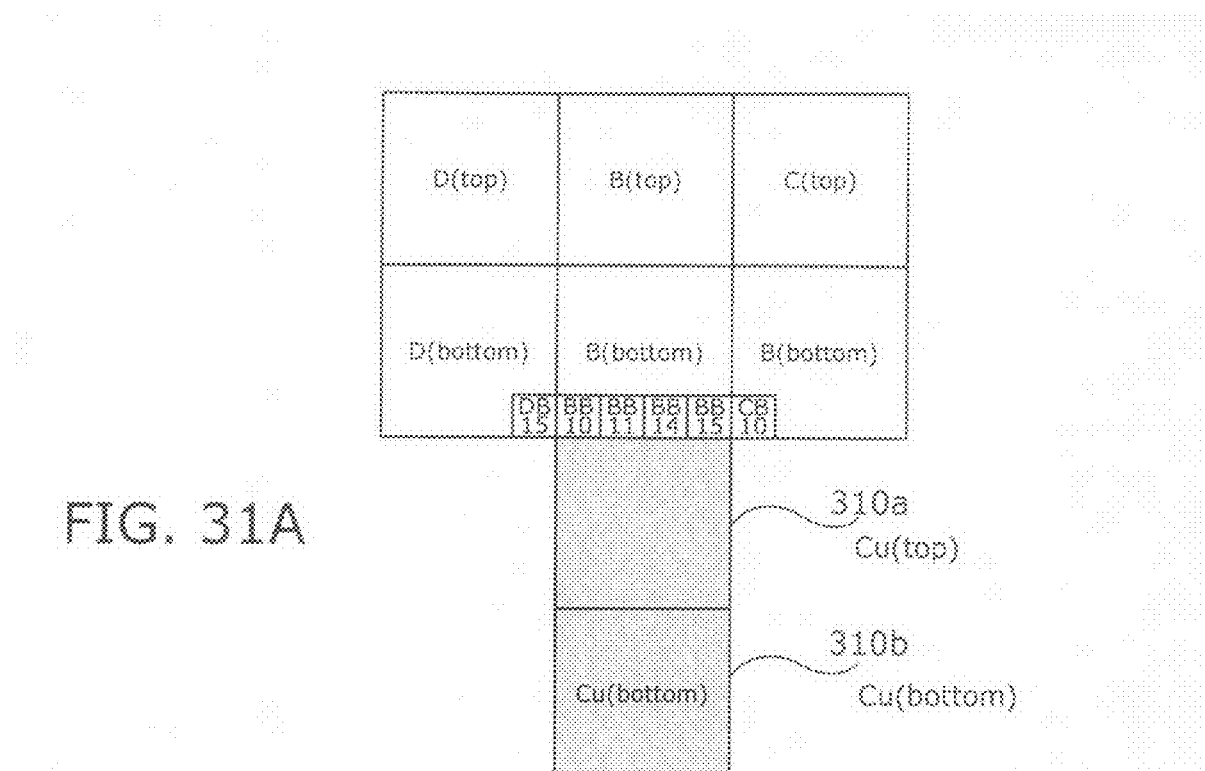
Figure 31B:
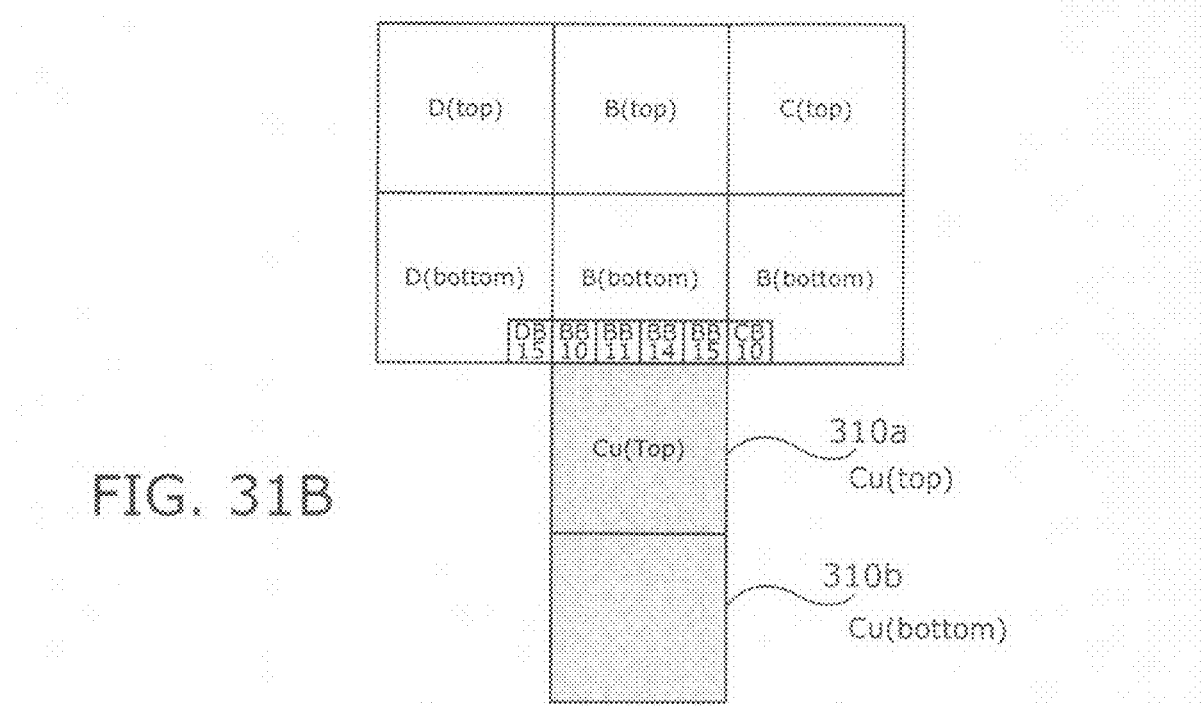

FIGS. 31A and 31B show the case where the current macroblock pair is a field pair while its adjacent macroblock pairs are frame pairs. Specifically, FIG. 31A depicts the location of adjacent macroblocks MB-BCD referenced by the current top macroblock Cu(top). Specifically, the current top macroblock Cu(top) makes reference to the following 4×4 sub-macroblocks: BB10, BB11, BB14, and BB15 immediately above Cu(top), DB15 immediately to the left of BB10, and CB10 immediately to the right of BB15. FIG. 31B, on the other hand, shows the location of adjacent macroblocks MB-BCD referenced by the current bottom macroblock Cu(bottom). As can be seen, the same sub-macroblocks BB10, BB11, BB14, BB15, DB15, and CB10 as in the case of the current top macroblock Cu(top) are referenced as MB-BCD adjacent macroblocks.

Figure 32A:
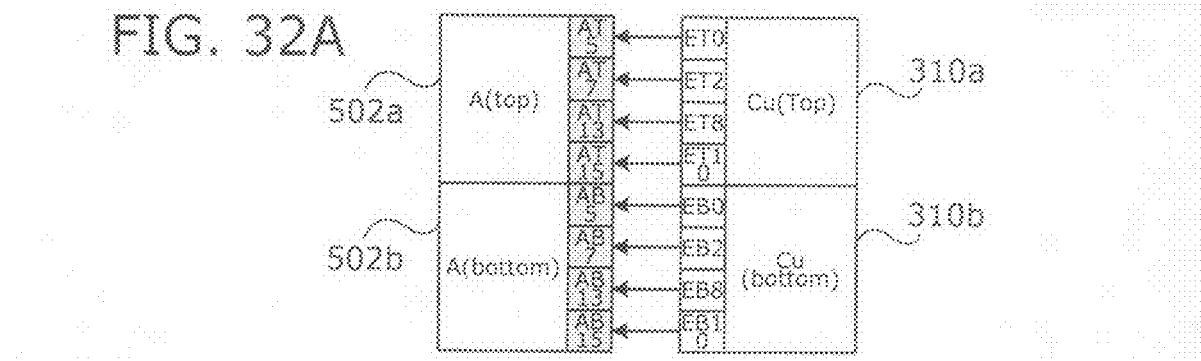
FIGS. 32A to 32D depict the detailed cases of MB-A adjacent macroblock locations in relation with the vector storage locations shown in FIGS. 27A and 27B.
Figure 32B:
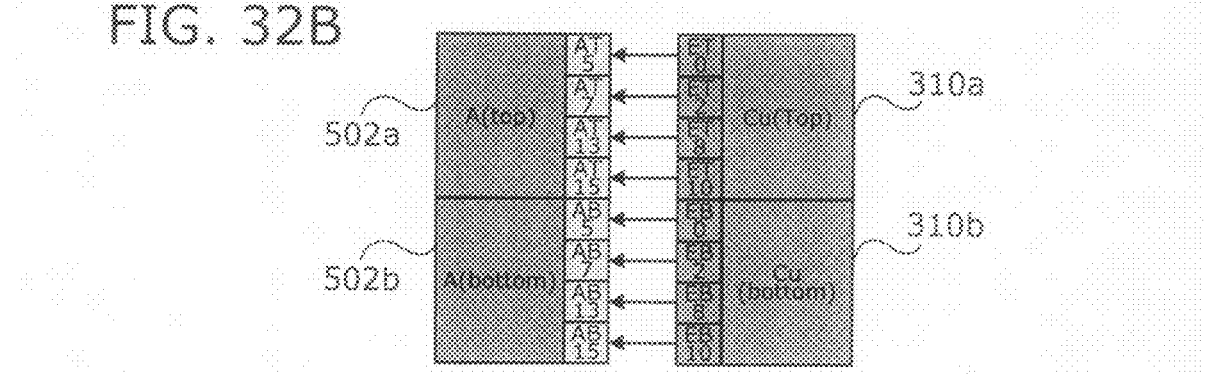

FIGS. 32A to 32D show the detailed cases of MB-A adjacent macroblock locations in relation with the vector storage locations shown in FIGS. 27A and 27B. Specifically, FIGS. 32A and 32B show the case where both the current macroblock pair and its adjacent macroblock pairs are frame pairs or field pairs. The association between vector storage locations and MB-A adjacent macroblock locations in this case is the same as in the first embodiment.

Figure 32C:
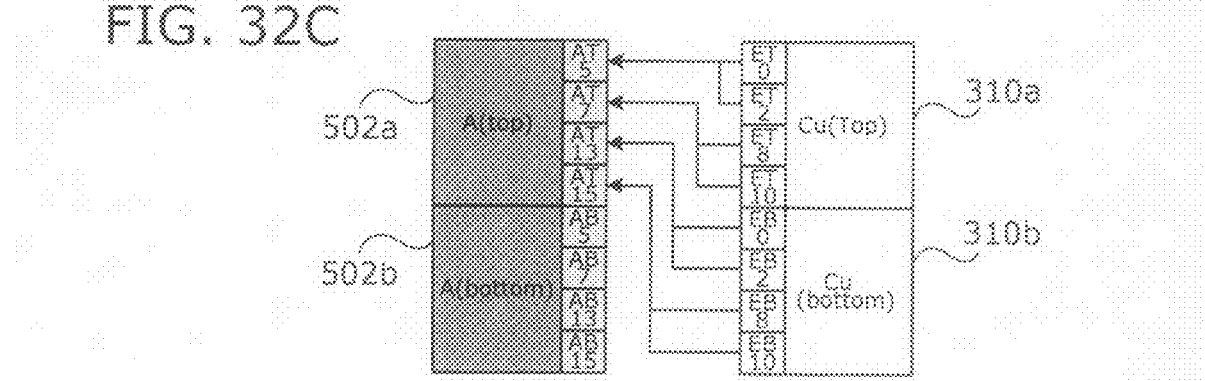

FIG. 32C, on the other hand, shows the case where the current macroblock pair is a frame pair while its MB-A adjacent macroblock pair is a field pair. In this case, the reference from current sub-macroblocks to adjacent sub-macroblocks is not straightforward, unlike the cases shown in FIGS. 32A and 32B. Specifically, ET0 and ET2 of the current top macroblock Cu(top) make reference to AT5 of an adjacent top macroblock MB-A 502a, and ET8 and ET10 make reference to AT7. Further, EB0 and EB2 of the current bottom macroblock Cu(bottom) make reference to AT13 of the adjacent top macroblock MB-A 502a, and EB8 and EB10 make reference to AT15.

Figure 32D:
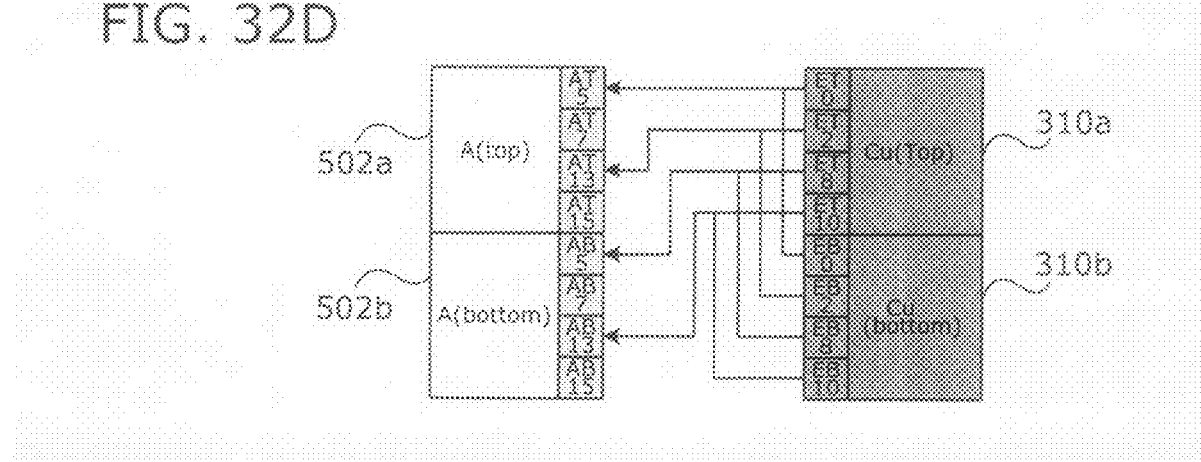

FIG. 32D shows the case where the current macroblock pair is a field pair while its MB-A adjacent macroblock pair is a frame pair. In this case, ET0 of the current top macroblock Cu(top) and EB0 of the current bottom macroblock Cu(bottom) make reference to AT5 of an adjacent top macroblock MB-A 502a. Likewise, ET2 of Cu(top) and EB2 of Cu(bottom) make reference to AT13 of the adjacent top macroblock MB-A 502a. ET8 of Cu(top) and EB8 of Cu(bottom) make reference to AB5 of an adjacent bottom macroblock MB-A 502b. ET10 of Cu(top) and EB10 of Cu(bottom) make reference to AB13 of the adjacent bottom macroblock MB-A 502b.

Figure 33A:
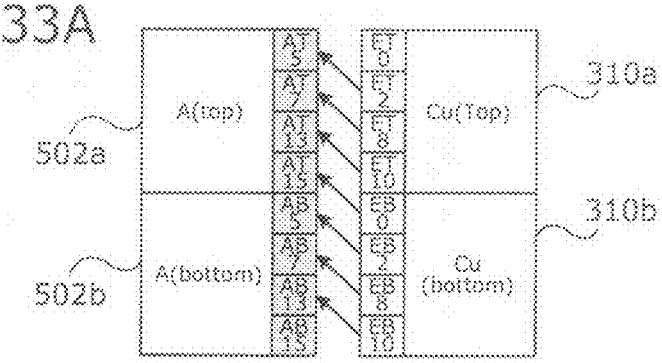
FIGS. 33A to 33D show adjacent macroblocks MB-D to be referenced in various cases.
Figure 33B:
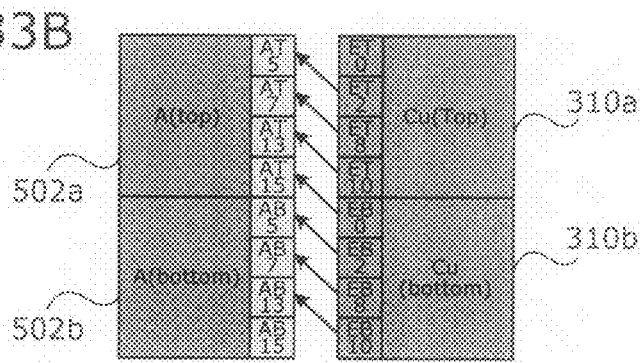

FIGS. 33A to 33D show adjacent macroblocks MB-D to be referenced in various cases. Specifically, FIGS. 33A and 33B show the cases where both the current macroblock pair and its adjacent macroblock pairs are frame pairs or field pairs. In these cases, the association between vector storage locations and MB-D adjacent macroblock locations is the same as in the first embodiment.

Figure 33C:
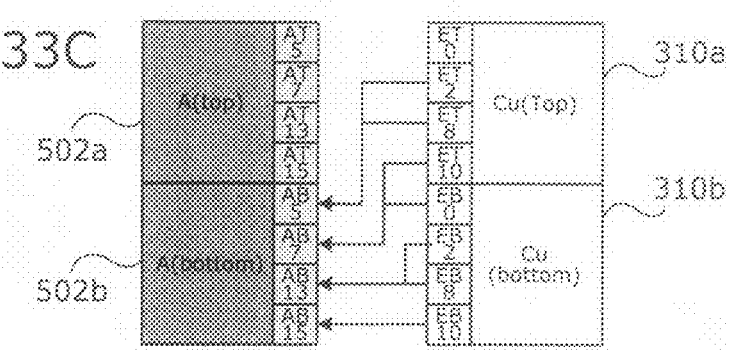

FIG. 33C, on the other hand, shows the case where the current macroblock pair is a frame pair while its adjacent macroblock pair is a field pair. In this case, ET2 and ET8 of the current top macroblock Cu(top) make reference to AB5 of an adjacent bottom macroblock MB-A 502a. ET10 of the current top macroblock Cu(top) and EB0 of the current bottom macroblock Cu(bottom) make reference to AB7 of the adjacent bottom macroblock MB-A 502b. EB2 and EB8 of Cu(bottom) make reference to AB13 of the adjacent bottom macroblock MB-A 502b. EB10 of Cu(bottom) makes reference to AB15 of the adjacent bottom macroblock MB-A 502b.

Figure 33D:
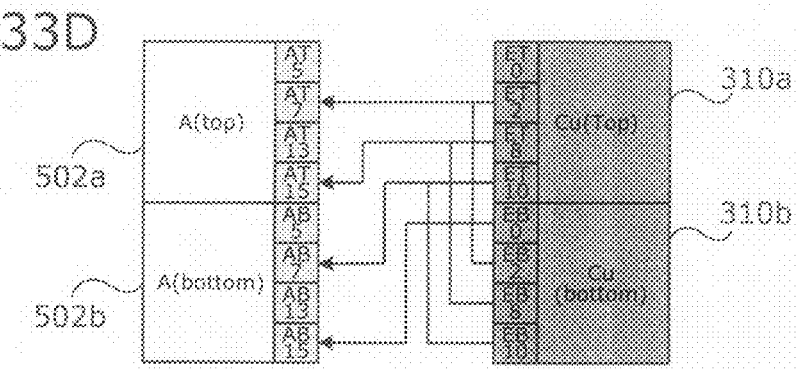

FIG. 33D shows the case where the current macroblock pair is a field pair while its MB-A adjacent macroblock pair is a frame pair. In this case, ET2 of the current top macroblock Cu(top) and EB2 of the current bottom macroblock Cu(bottom) make reference to AT7 of the adjacent top macroblock MB-A 502a. Likewise, ET8 of Cu(top) and EB8 of Cu(bottom) make reference to AT15 of the adjacent bottom macroblock MB-A 502b. ET10 of Cu(top) and EB10 of Cu(bottom) make reference to AB7 of the adjacent bottom macroblock MB-A 502b. Lastly, EB0 of Cu(bottom) makes reference to AB15 of the adjacent macroblock MB-A 502b.

Address Translation in MBAFF Mode

This section will describe how an address translator provides address of vector storage locations in MBAFF mode, with a focus on reference motion vectors outside the current macroblock. See the first embodiment for reference motion vectors inside the current macroblock.

Figure 34:
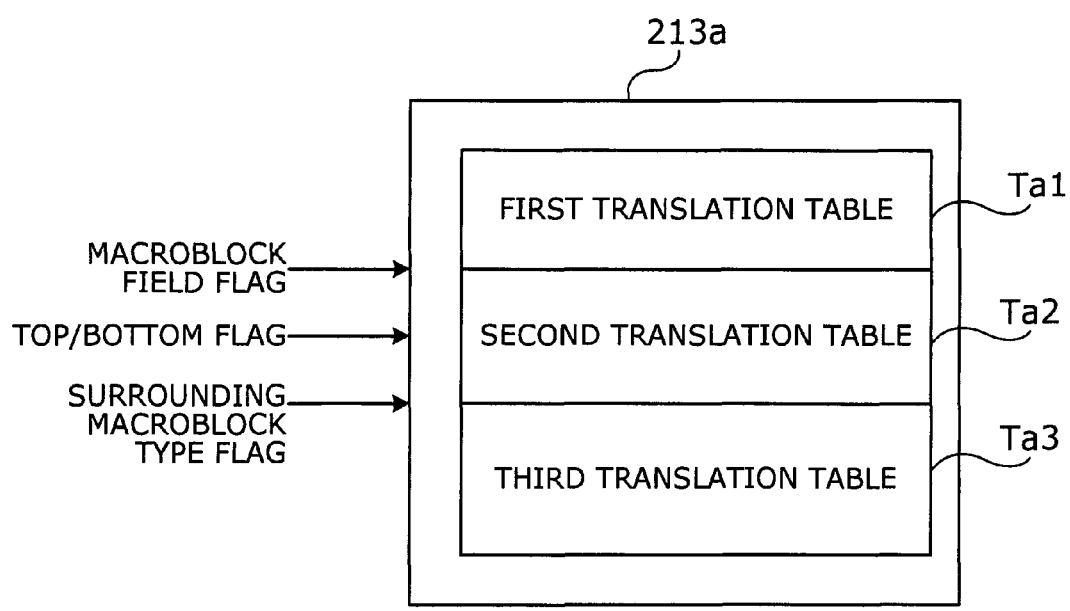
FIG. 34 shows an address translator according to the second embodiment.

FIG. 34 shows an address translator 213a according to the second embodiment. The illustrated address translator 213a includes a first translation table Ta1 used to make reference to motion vectors inside the current macroblock, a second translation table Ta2 used in non-MBAFF mode to make reference to motion vectors outside the current macroblock, and a third translation table Ta3 used in MBAFF mode to make reference to motion vectors outside the current macroblock.

While not specifically shown in FIG. 5, the address translator 213 of the first embodiment employs the first and second translation tables Ta1 and Ta2. That is, the address translator 213a of the second embodiment is different from its counterpart in the first embodiment in that a third translation table Ta3 is added to translate given block size information (macroblock size and sub-macroblock size) into the address of a relevant representative vector storage location.

The address translator 213a first determines whether each given picture is coded in MBAFF mode or non-MBAFF mode. If it is non-MBAFF coded, the address translator 213a uses the first and second translation tables Ta1 and Ta2 to process the given picture. If it is MBAFF coded, the address translator 213a uses the first and third translation tables Ta1 and Ta3 to do the same.

When using the third translation table Ta3, the address translator 213a considers the state of MBFIELD flag, surrounding macroblock type flag, and top/bottom flag. MBFIELD flag indicates the coding type of the current block, i.e., whether the current macroblock is organized in field form or in frame form. Surrounding macroblock type flag indicates the coding type of macroblocks to which adjacent macroblocks MB-A and MB-BCD belong. Top/bottom flag indicates whether the current macroblock is a top field or a bottom field, in the case of field coding.

Figure 35A:
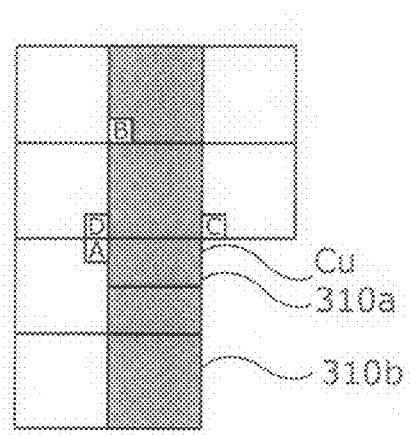
FIG. 35A to 35C show how the address translator operates in MBAFF mode.
Figure 35B:
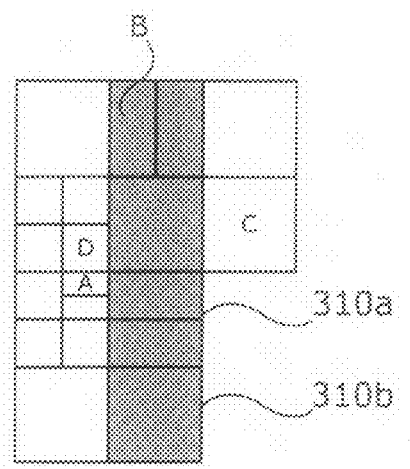
Figure 35C:
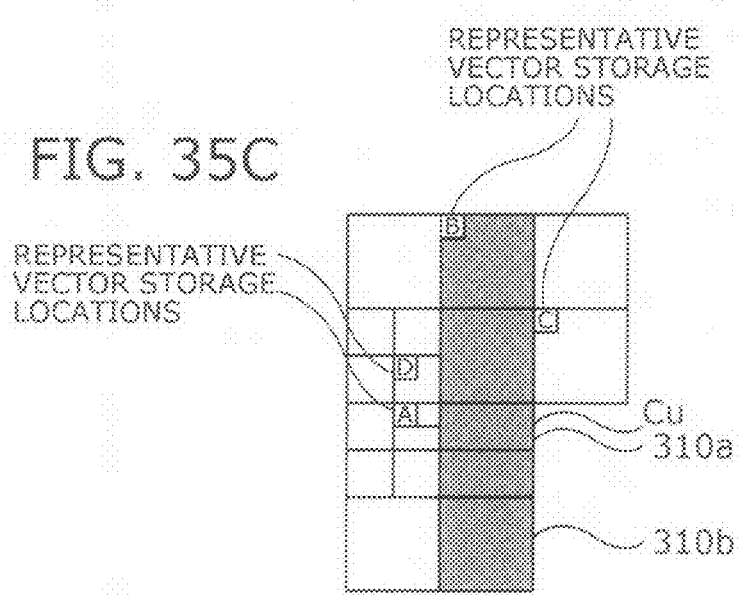

FIG. 35A to 35C show how the address translator 213a operates in MBAFF mode, assuming that the current macroblock is a 16×8 block. In MBAFF mode, however, the address translator 213a operates mostly in the same way as in non-MBAFF mode. Specifically, the address translator 213a first makes reference to 4×4 sub-macroblocks as adjacent macroblocks MB-A, MB-B, MB-C, and MB-D as shown in FIG. 35A. The address translator 213a then examines the partitions surrounding the current macroblock as shown in FIG. 35B and further takes into consideration the managed addresses as shown in FIG. 35C, thus providing the MVP calculator 212 with address of vector storage locations in which representative motion vectors are stored. In MBAFF, however, the way of selecting surrounding locations may be different from that in non-MBAFF mode, depending on the combination of a macroblock pair immediately above the current macroblock pair and another macroblock pair located to the left of the current macroblock pair. Details of this issue will be discussed in the next section.

Patterns of Adjacent Macroblock Locations

As mentioned in the previous section, the MBAFF coding allows frame coding and field coding to be combined variously for a current macroblock pair and its left (or upper) adjacent macroblock pair. This section describes various patterns of adjacent macroblock locations in MBAFF, which are derived from multiple combinations of frame coding and field coding. For simplicity, the frame/field patterns will be discussed on an individual macroblock basis, rather than on a macroblock pair basis.

FIGS. 36A to 36D and FIGS. 37A to 37D show adjacent macroblock locations to be referenced in the case where the current macroblock and its left adjacent macroblock are both frame coded. Notice that, in FIGS. 36A to 36D (as well as in the subsequent figures), only the first figure FIG. 36A contains reference numerals to indicate components of a picture 600. It should be appreciated, however, that the same reference numerals also apply to every other figure on the same sheet. A picture frame is formed from odd-numbered lines and even-numbered lines (indicated by hatching). The small hatched box in some 4×4 sub-macroblocks shown in FIG. 36A and other figures indicate particular line positions.

Figure 36B:
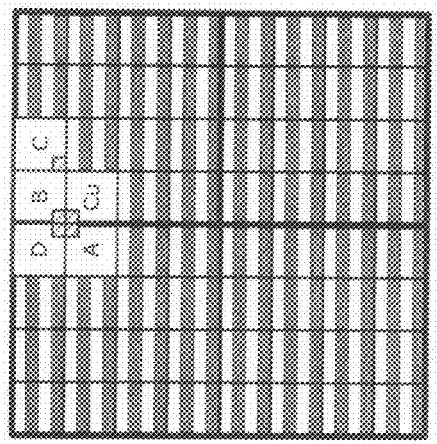
Figure 36D:
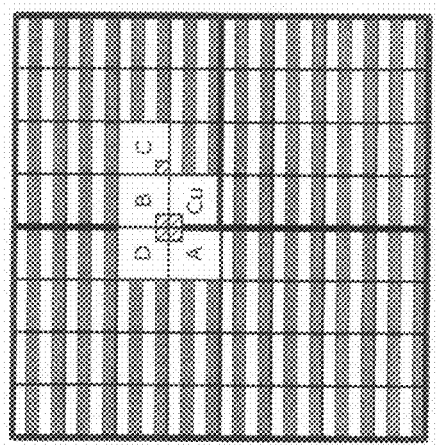

The adjacent macroblock locations of MB-A and MB-BCD shown in FIGS. 36A to 36D and 37A to 37D are similar to those in non-MBAFF. Referring to FIG. 36B, for example, the MVP calculator 212 determines MVP for a sub-macroblock Cu based on the foregoing formula (1) by substituting into it the motion vectors of adjacent sub-macroblocks including AT5 and AT7 in an adjacent macroblock MB-A and ET0 and ET1 in the current macroblock Cu. Then using formula (3), the motion vector calculator 214 produces a motion vector MV8 from the calculated MVP and decoded MVD. In the case shown in FIG. 36A, the actual vector locations of MB-B and MB-C (not shown) depend on the frame/field pattern of the current macroblock and a macroblock located above the reference macroblock, as will be described in detail later.

FIGS. 38A to 38D and FIGS. 39A to 39D show adjacent macroblock locations to be referenced in the case where the current macroblock and its left adjacent macroblock are both field coded. The pictures 600 of FIGS. 38A to 38D are each formed from upper and lower halves. The upper half is a top field, and the lower half (indicated by hatching) is a bottom field.

Figure 36A:
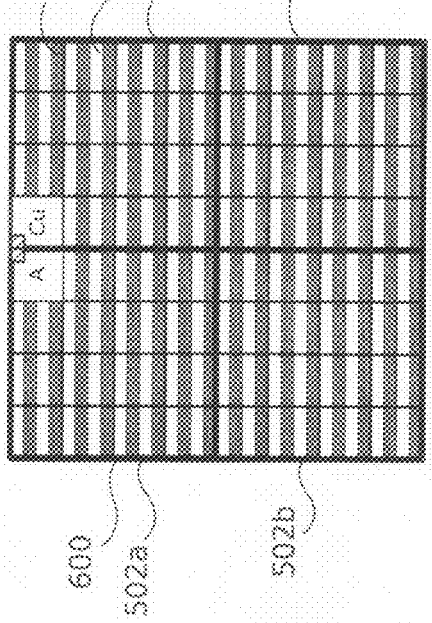
Figure 36C:
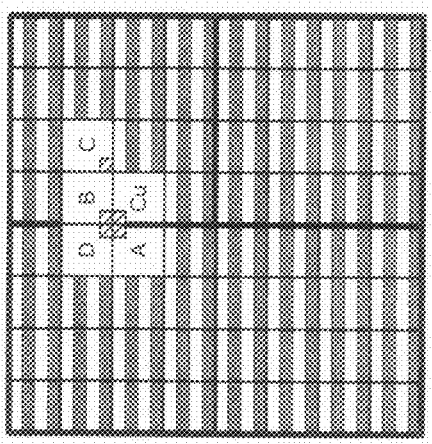
Figure 37B:
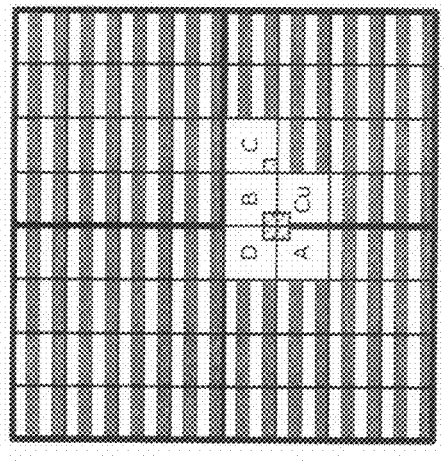
Figure 37D:
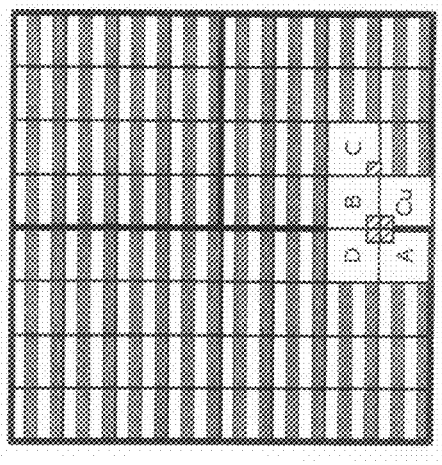
Figure 37A:
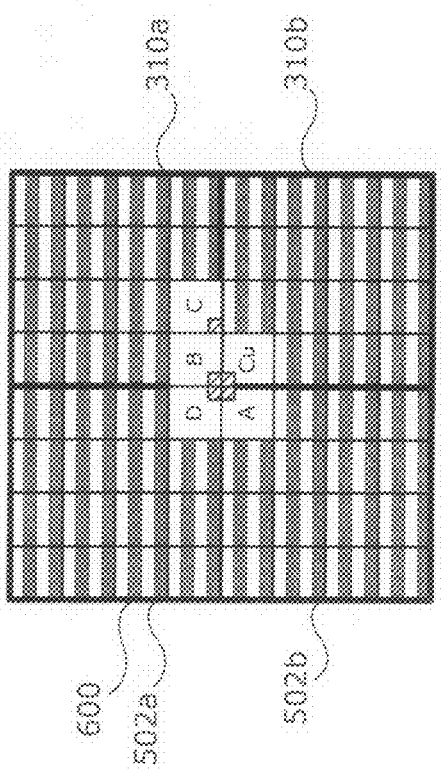
Figure 37C:
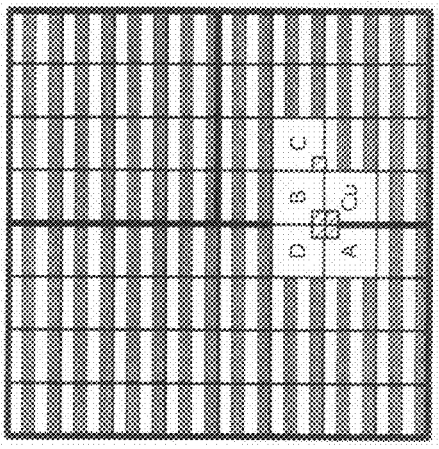
Figure 38B:
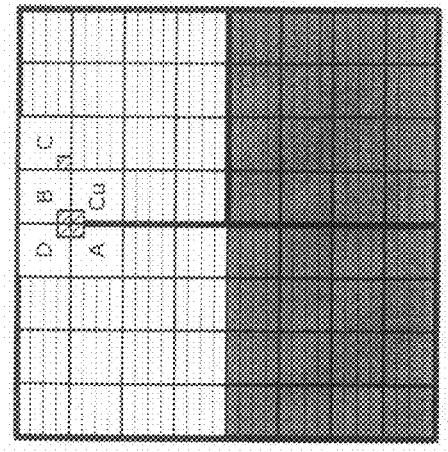
Figure 38D:
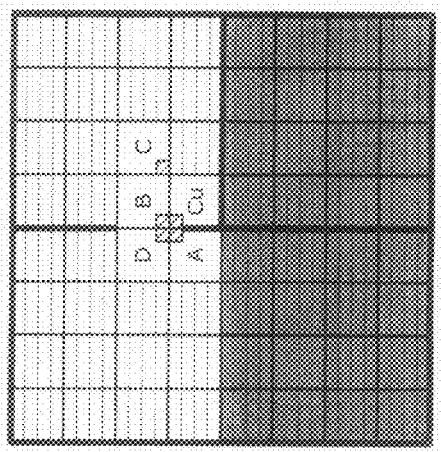
Figure 38A:
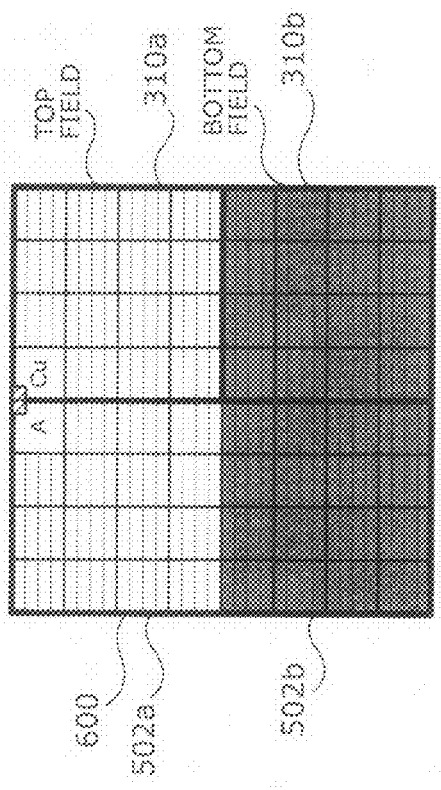
Figure 38C:
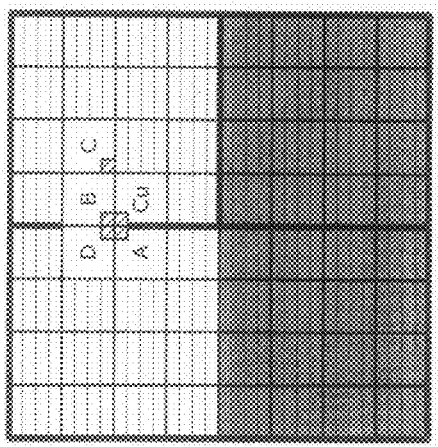
Figure 39B:
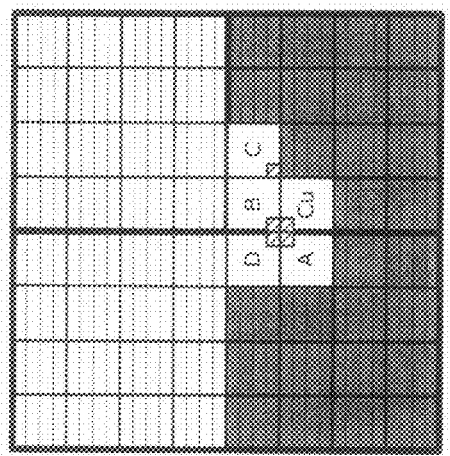
Figure 39D:
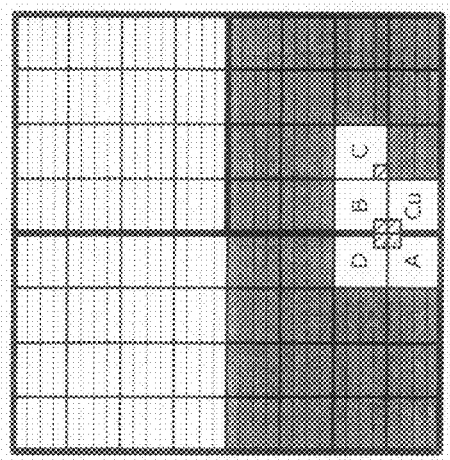
Figure 39A:
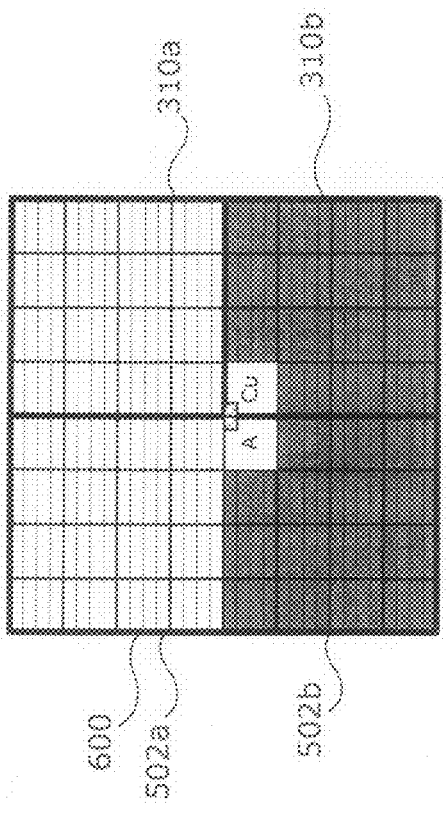
Figure 39C:
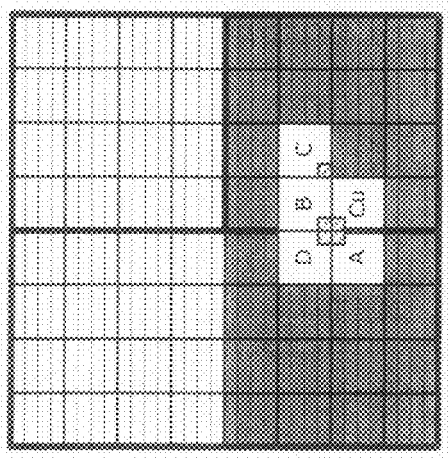
Figure 41A:
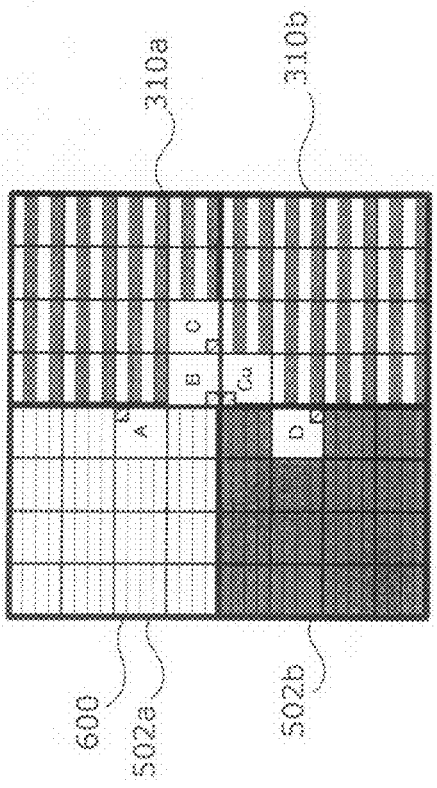
Figure 41B:
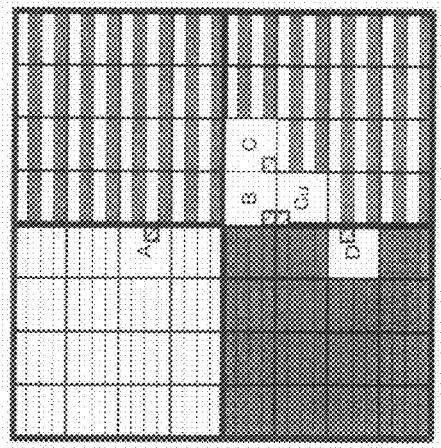
Figure 41C:
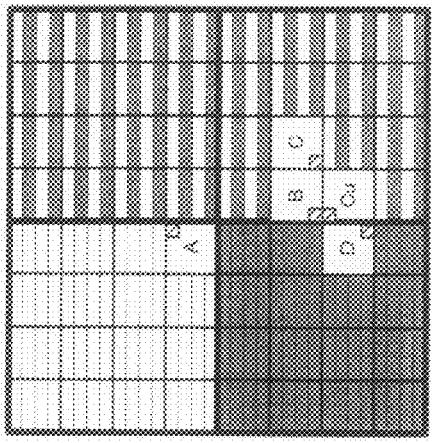
Figure 41D:
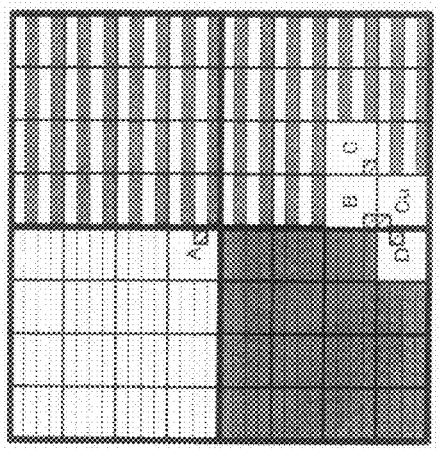
Figure 42B:
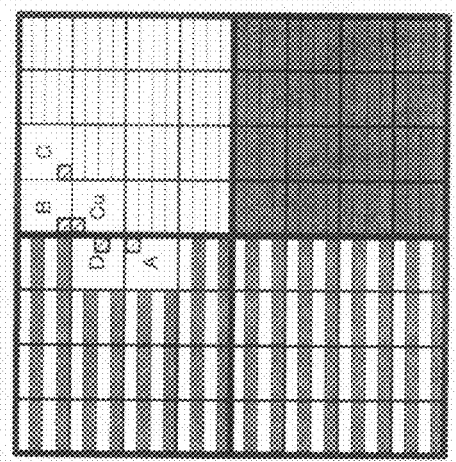
Figure 42D:
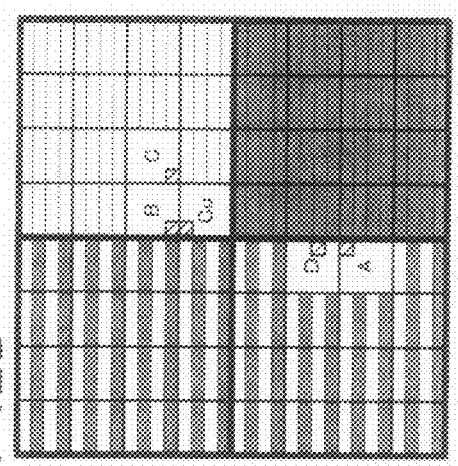
Figure 42A:
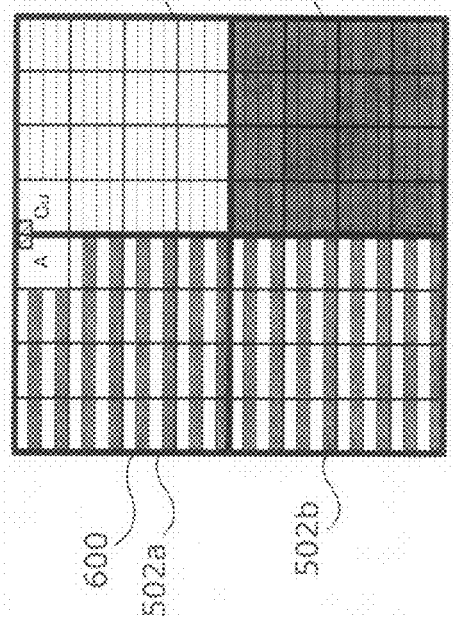
Figure 42C:
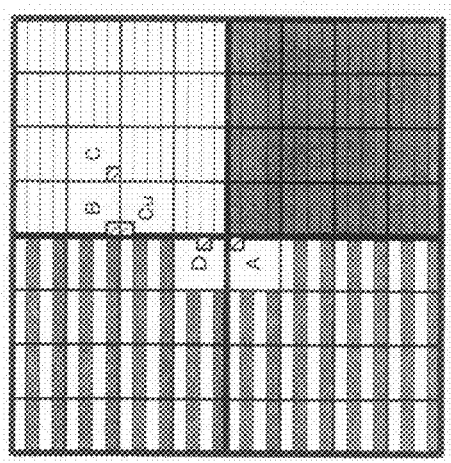
Figure 43A:
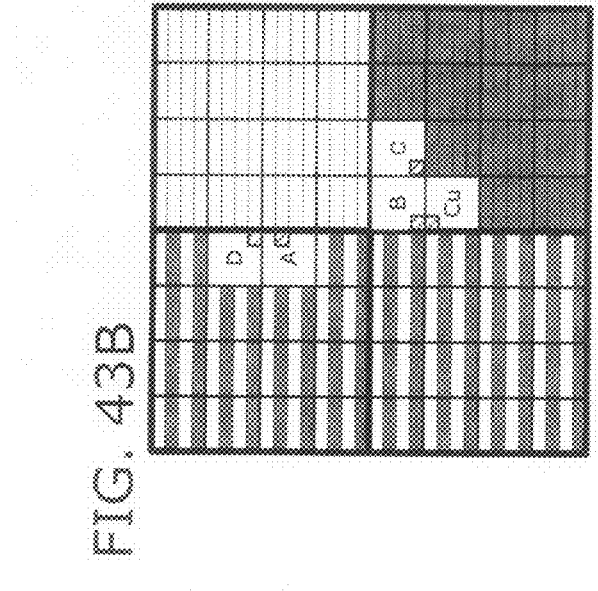
Figure 43B:
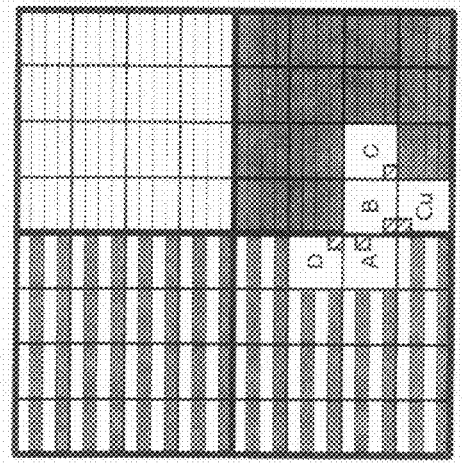
Figure 43C:
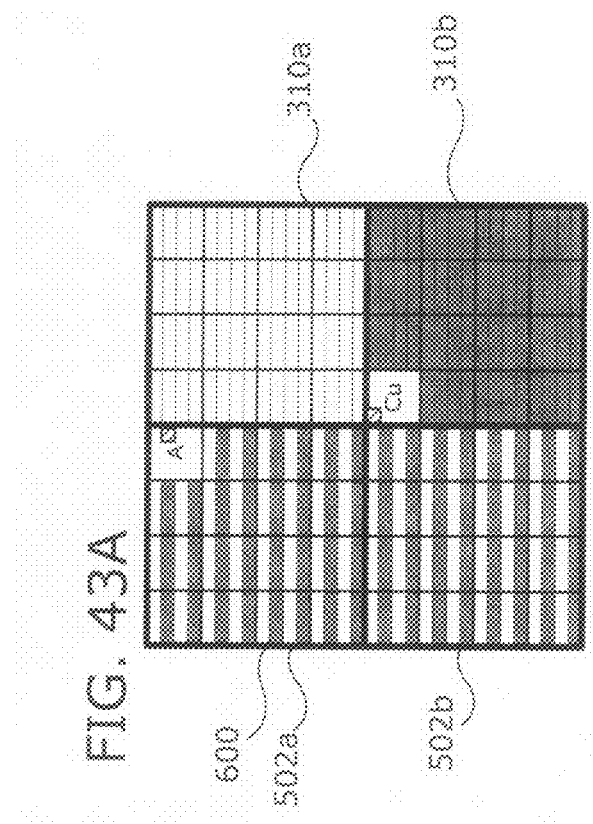
Figure 43D:
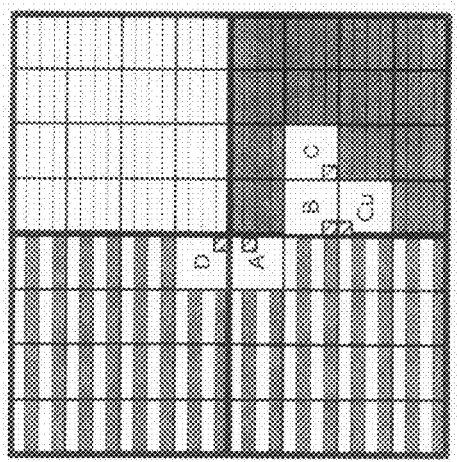

Notice that the pattern shown in FIG. 39A is distinct from its counterpart of FIGS. 36A and 37A. That is, the adjacent macroblock location(s) of MB-BCD may vary with the frame-field combination of the current macroblock and its adjacent macroblock located above it.

FIGS. 40A to 40D and FIGS. 41A to 41D show adjacent macroblock locations to be referenced in the case where the current macroblock is frame coded while its left adjacent macroblock is field coded. See the 4×4 sub-macroblock on the fifth line of the frame-coded current macroblock shown in FIG. 40B, for example. The left adjacent macroblock MB-A of this sub-macroblock is field coded, and the third line of this MB-A corresponds to the fifth line of the current macroblock. For this reason, the MVP calculator 212 makes reference to the motion vector of a 4×4 sub-macroblock AT5 located on the third line. Similarly, another left adjacent macroblock MB-D of the current macroblock is located on the second line. The MVP calculator 212 therefore makes reference to the motion vector of AB5 located on the second line, where AB5 belongs to the bottom field 502b. The same logic applies to FIGS. 41A to 41D as well.

FIGS. 42A to 42D and FIGS. 43A to 43D show adjacent macroblock locations to be referenced in the case where the current macroblock is field coded while its left adjacent macroblock is frame coded. The logic used in this case is similar to that explained in FIGS. 40A to 40D and FIGS. 41A to 41D. See the 4×4 sub-macroblock on the fifth odd-numbered line of the field-coded current macroblock shown in FIG. 42B, for example. The left adjacent macroblock MB-A of the current macroblock is frame coded, and the ninth interlaced line of this MB-A corresponds to the fifth line of the current macroblock. The MVP calculator 212 therefore makes reference to the motion vector of a 4×4 sub-macroblock AT13 located on the ninth line. Similarly, another left adjacent macroblock MB-D of the current macroblock is located on the fourth odd-numbered line. The MVP calculator 212 therefore makes reference to the motion vector of AT7 located on the seventh interlaced line. The same logic applies to FIGS. 43A to 43D as well.

The MBAFF coding also allows various combinations of coding types for a current macroblock and an upper adjacent macroblock pair. The following will describe various patterns of adjacent macroblock locations in MBAFF mode which are derived from combinations of frame coding and field coding.

Figures 44A, 44B:
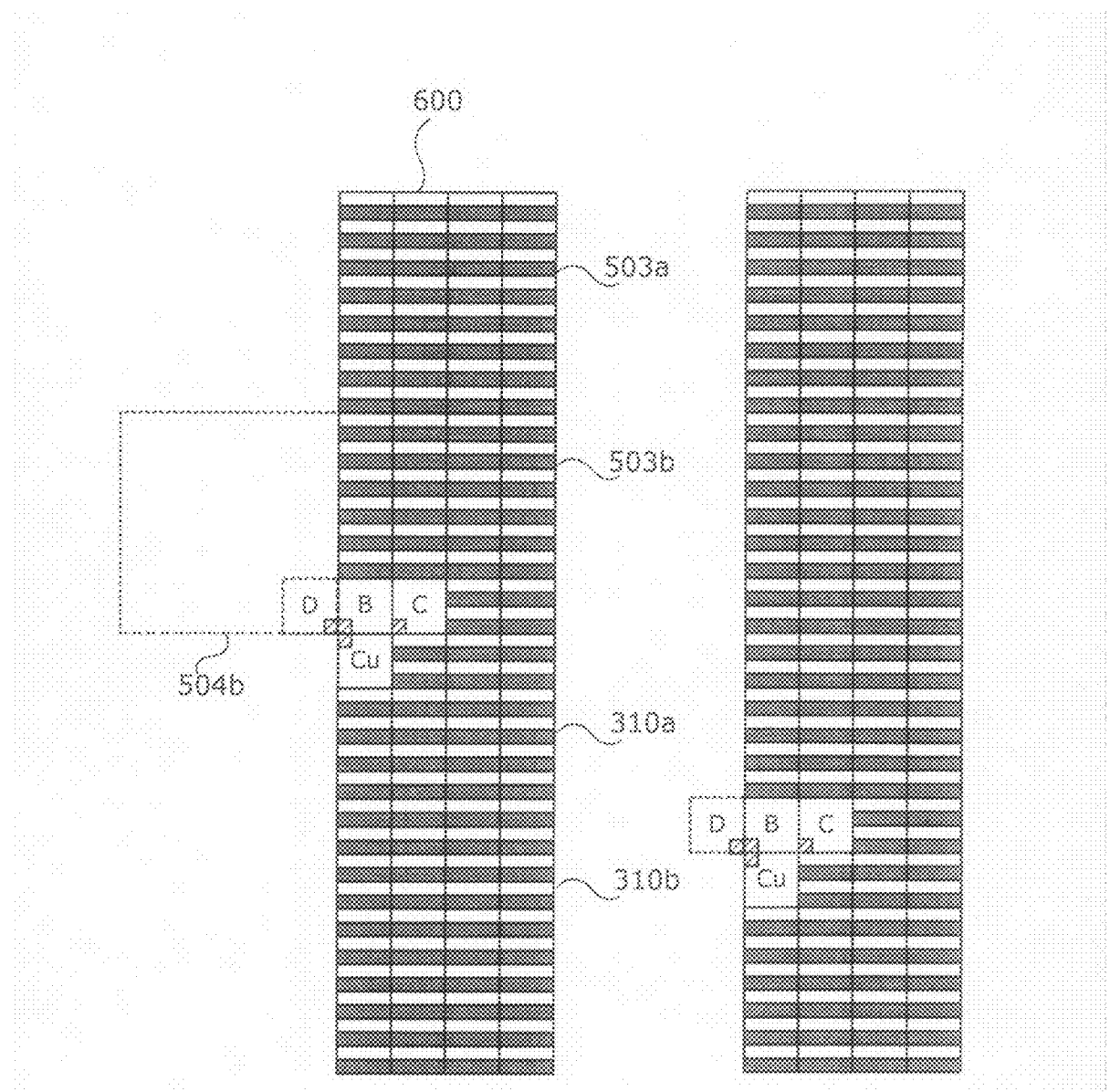

FIGS. 44A and 44B show adjacent macroblock locations to be referenced in the case where the current macroblock and its upper adjacent macroblock are both frame coded. Referring to FIG. 44A, for example, the MVP calculator 212 determines MVP for a sub-macroblock Cu based on formula (1) by substituting into it the motion vectors of sub-macroblocks including BB10 and BB11 in an adjacent macroblock MB-B 503b and DB15 in another adjacent macroblock MB-D 504b. Then using formula (3), the motion vector calculator 214 produces a motion vector from the calculated MVP and decoded MVD.

Figures 45A, 45B:
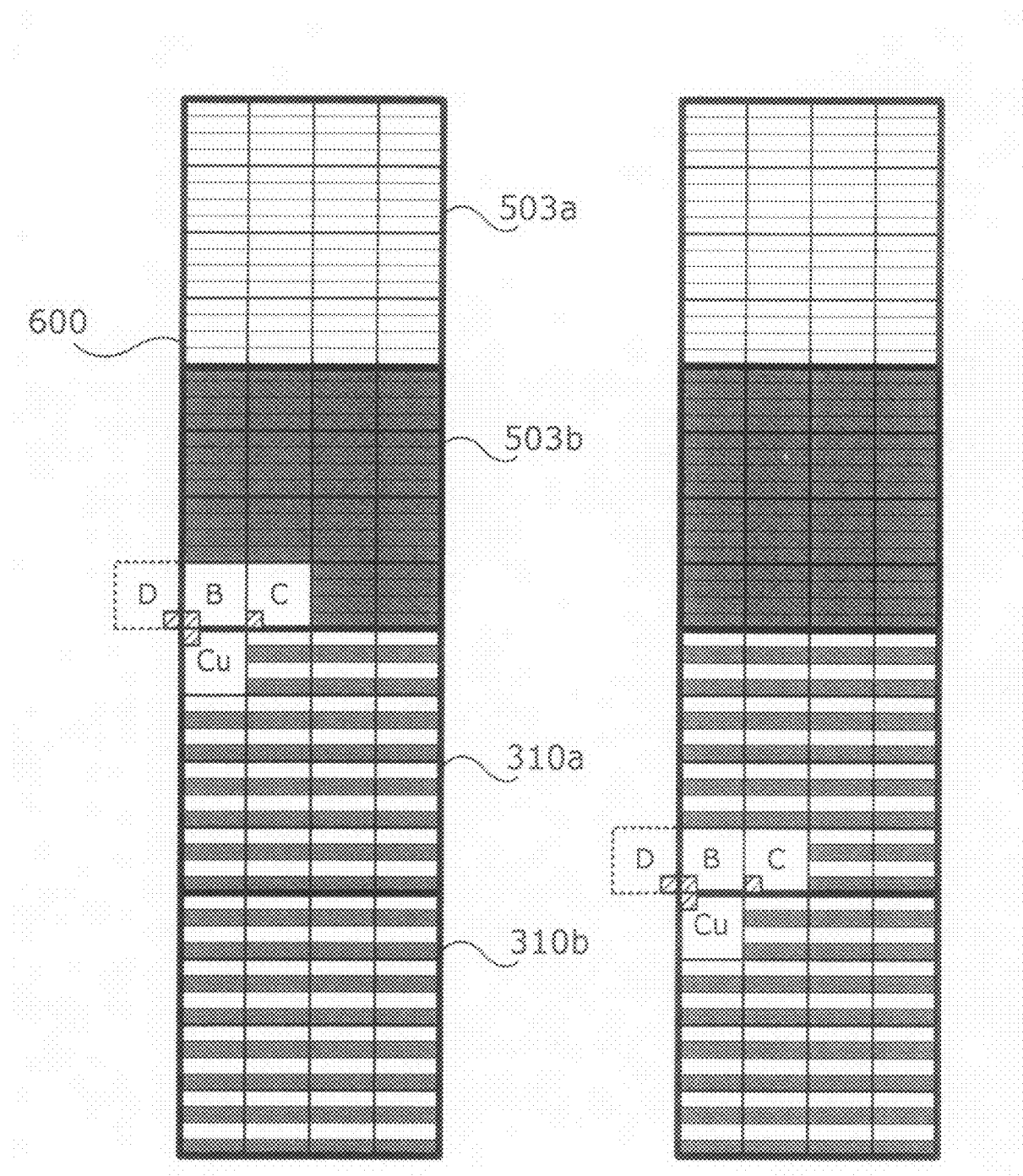

FIGS. 45A and 45B show adjacent macroblock locations to be referenced in the case where the current macroblock is frame coded while its upper adjacent macroblock is field coded. Reference motion vectors in this case are read out of the same locations as in the case of FIGS. 44A and 44B.

Figures 46A, 46B:
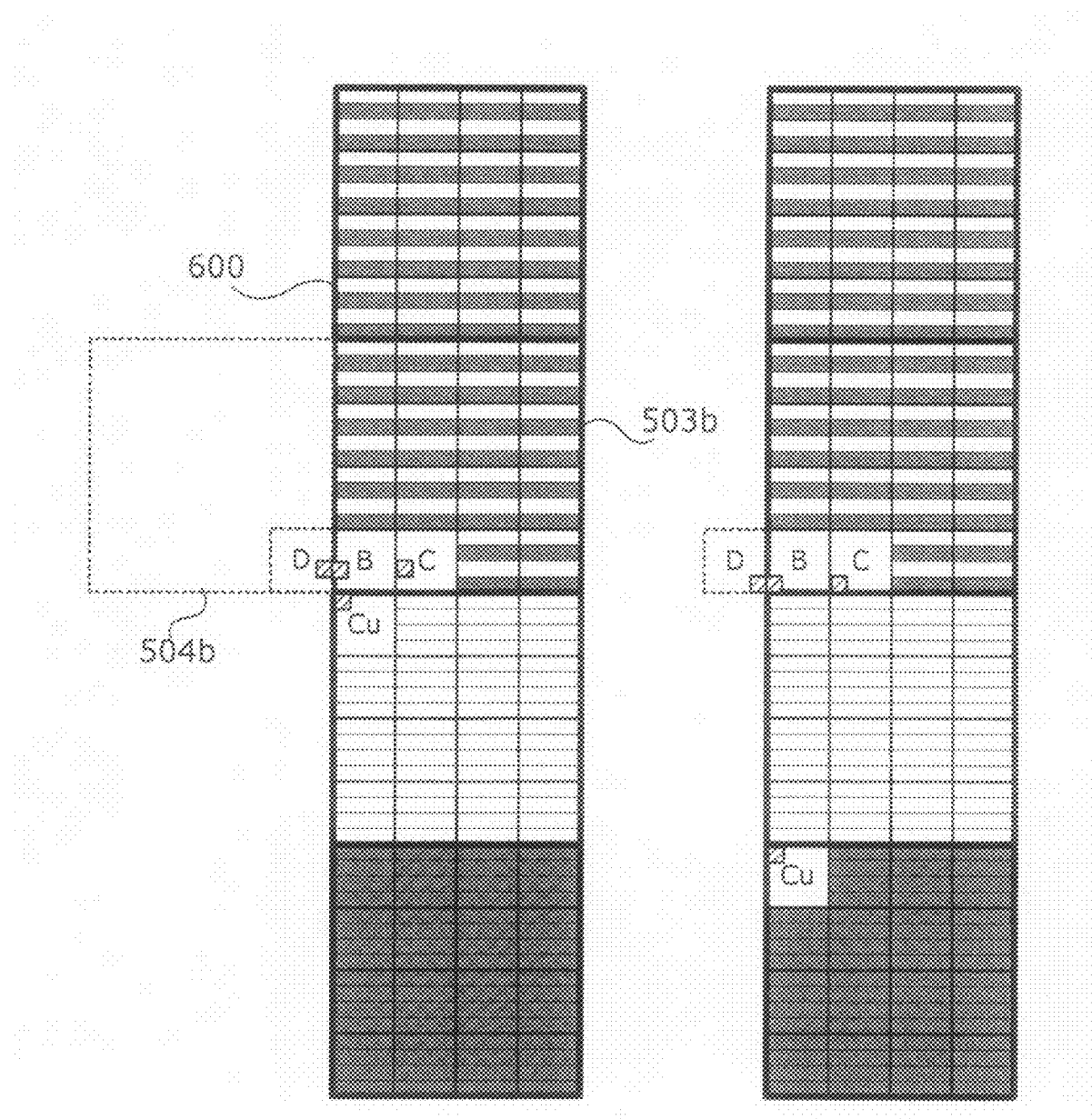

FIGS. 46A and 46B show adjacent macroblock locations to be referenced in the case where the current macroblock is field coded while its upper adjacent macroblock is frame coded. Referring to FIG. 46A, the current macroblock resides in a top field. In this case, the MVP calculator 212 reads out motion vectors of sub-macroblocks including BB10 and BB11 in an adjacent macroblock MB-B 503b and DB15 in another adjacent macroblock MB-D 504b. Referring to FIG. 46B, the current macroblock resides in a bottom field. In this case, the MVP calculator 212 reads out motion vectors of sub-macroblocks including BB10 and BB11 in an adjacent macroblock MB-B 503b and DB15 in another adjacent macroblock MB-D 504b.

Figures 47A, 47B:
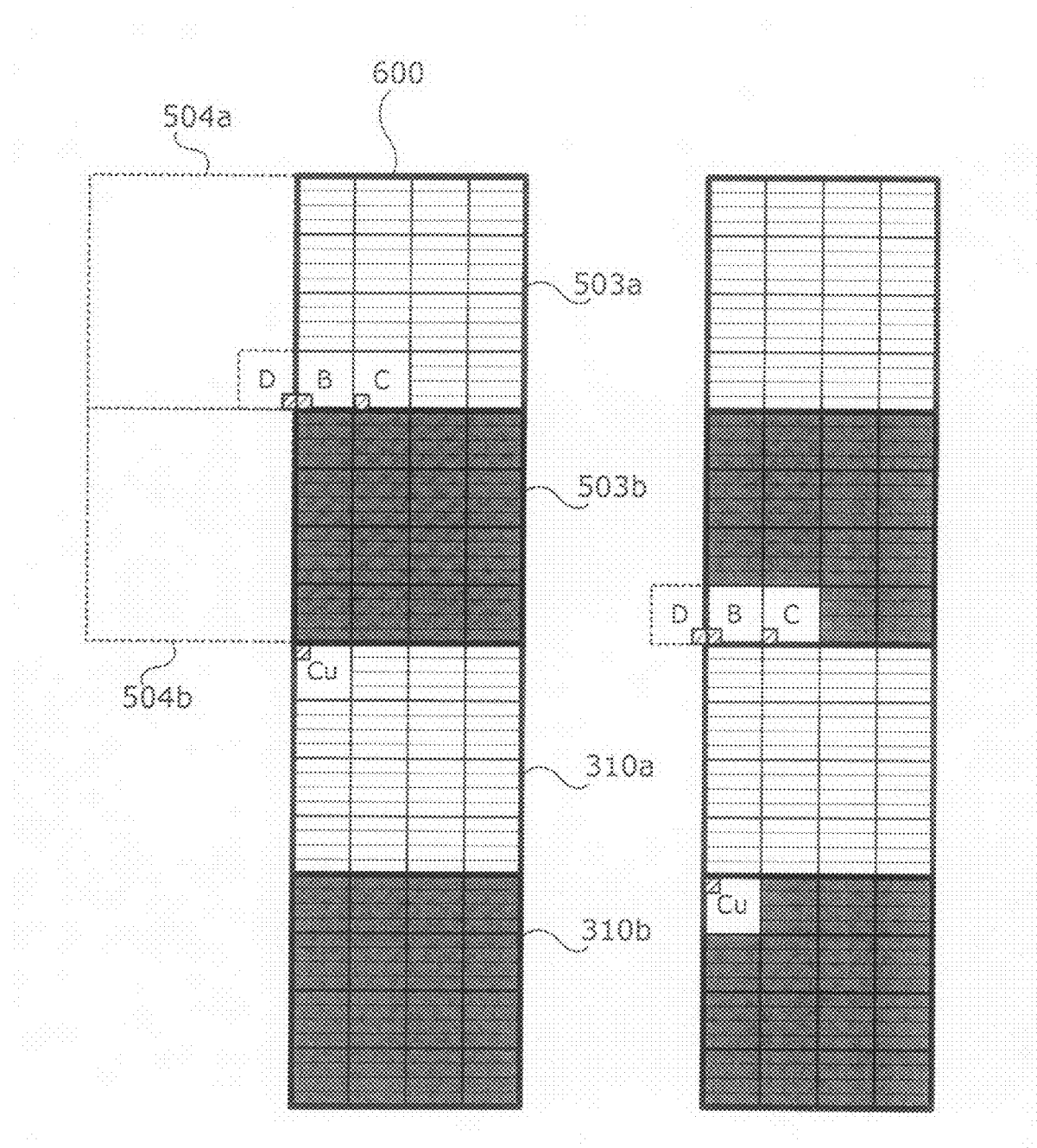

FIGS. 47A and 47B show adjacent macroblock locations to be referenced in the case where the current macroblock and its upper adjacent macroblock are both field coded. Referring to FIG. 47A, the current macroblock resides in a top field. In this case, the MVP calculator 212 reads out motion vectors of sub-macroblocks including BT10 and BT11 in an adjacent macroblock MB-B 503a and DT15 in an adjacent macroblock MB-D 504a. Referring to FIG. 47B, the current macroblock resides in a bottom field. In this case, the MVP calculator 212 reads out motion vectors of sub-macroblocks including BB10 and BB11 in an adjacent macroblock MB-B 503b and DB15 in another adjacent macroblock MB-D 504b.

Third Translation Table

Figure 48:
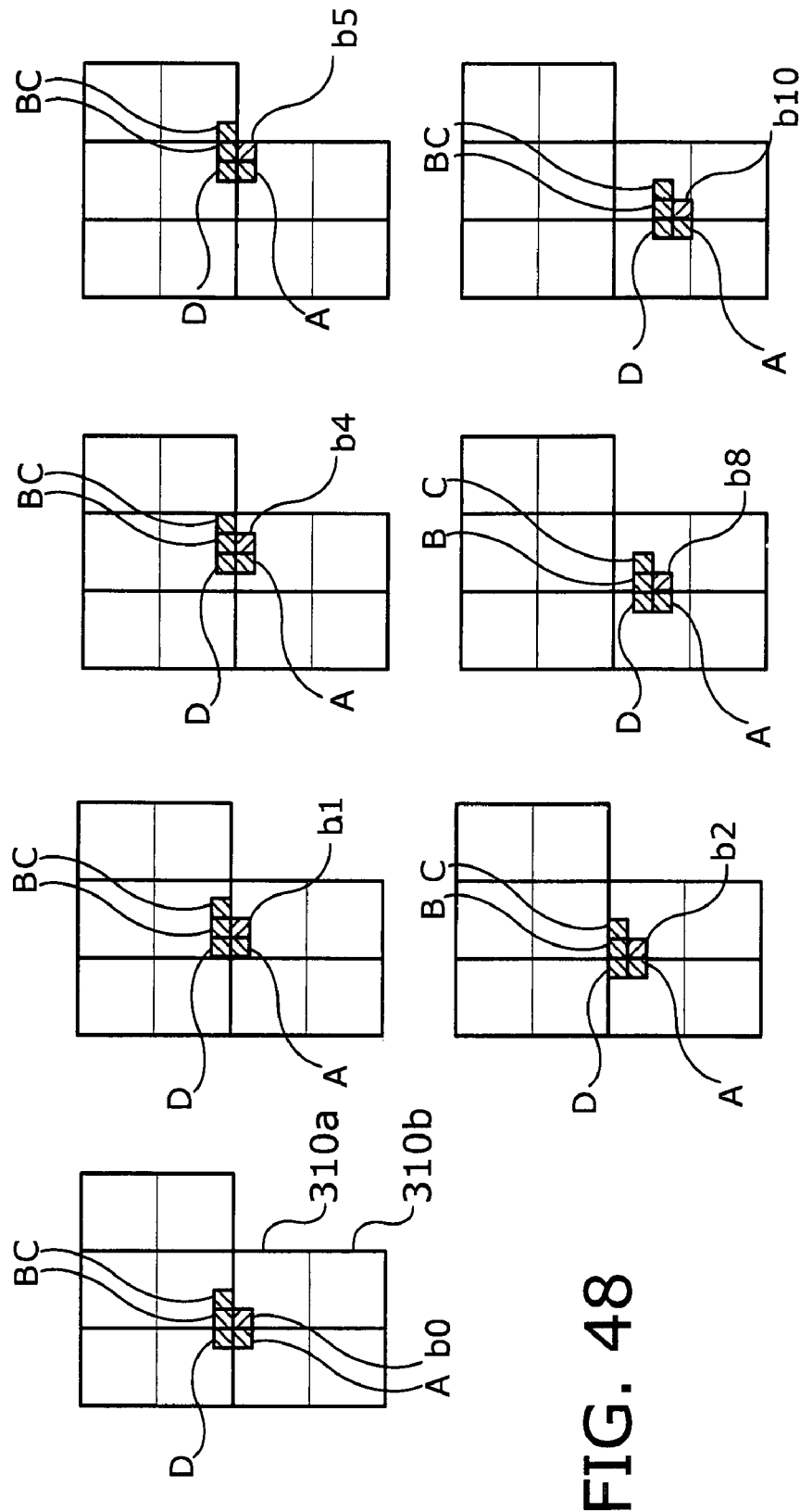
Figure 49:
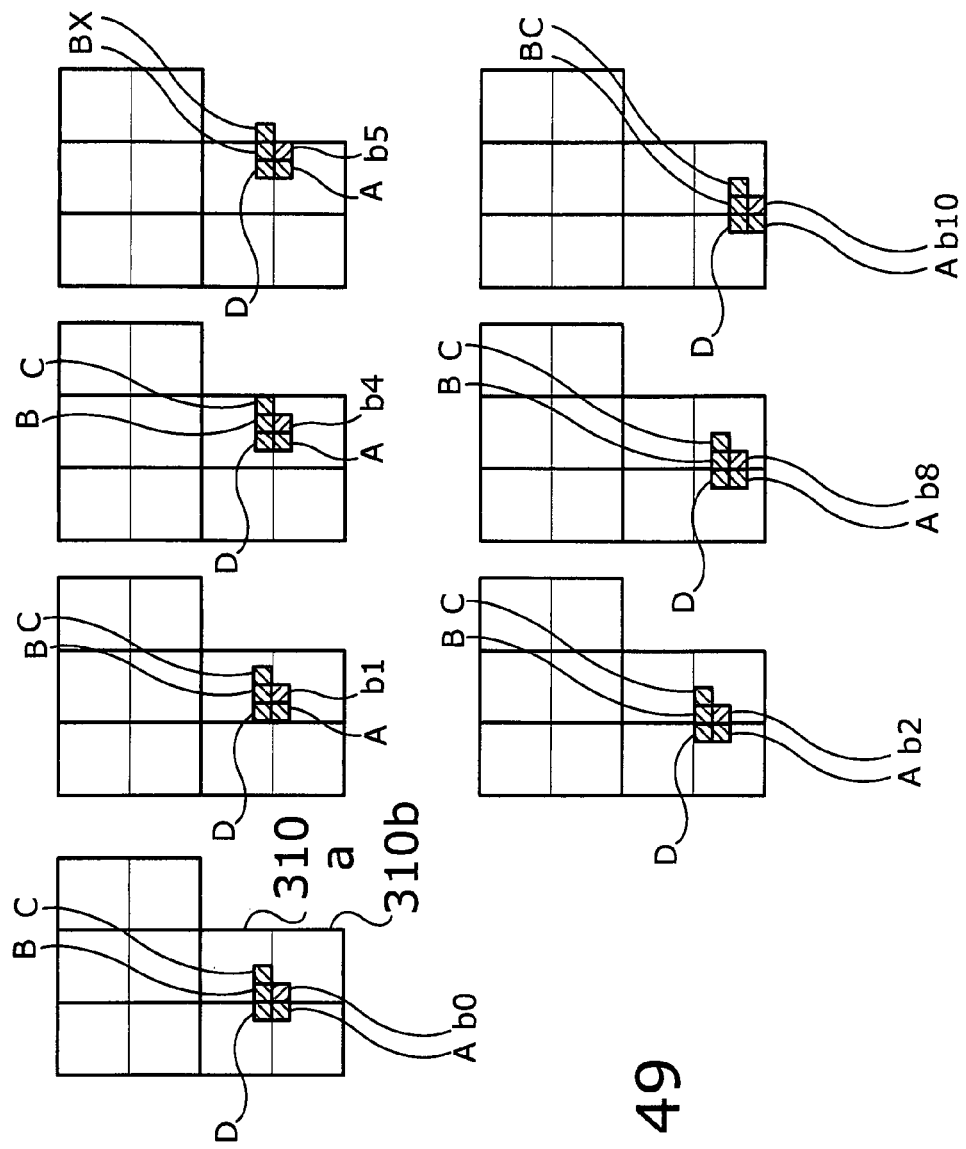
Figure 50:
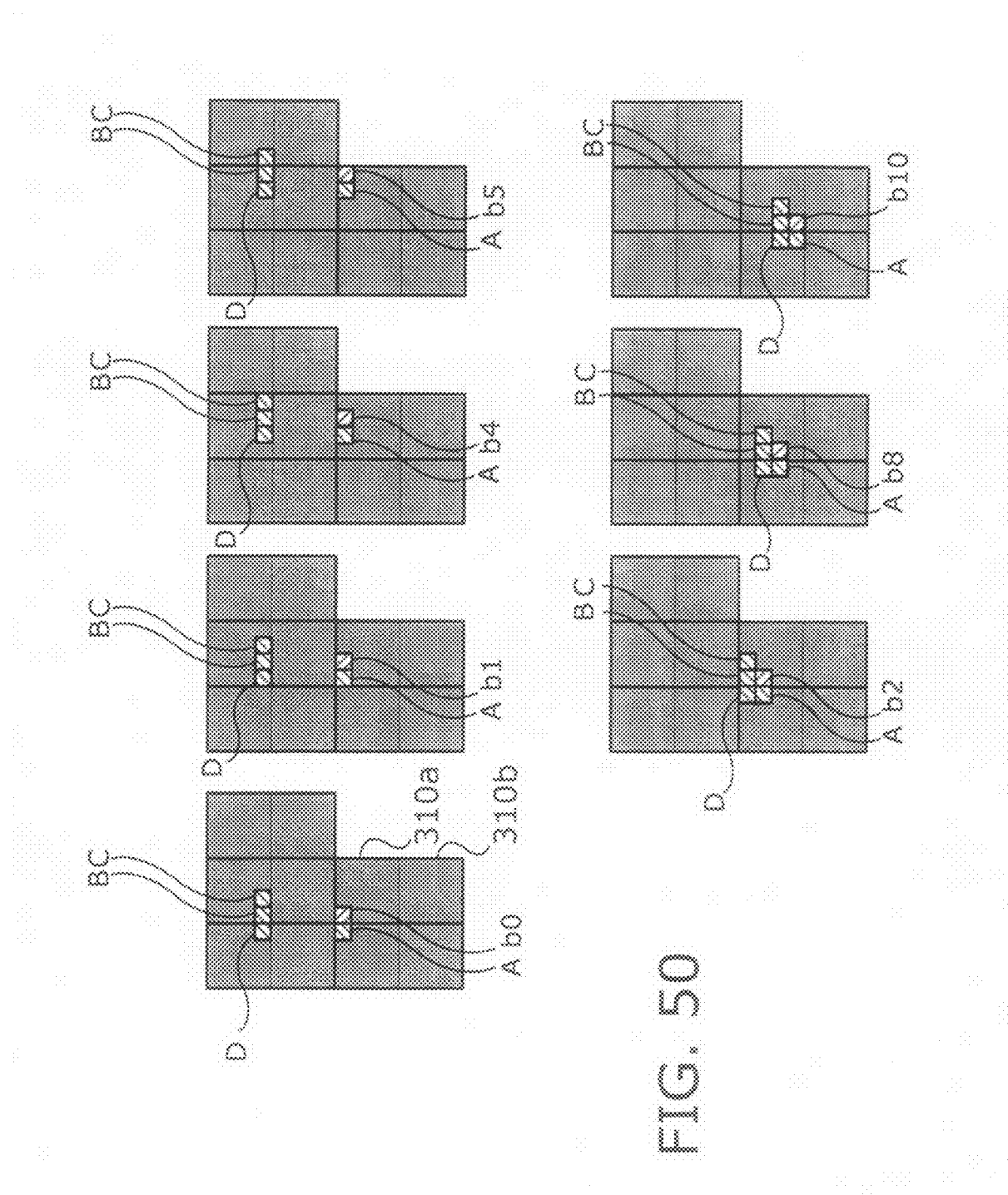
Figure 51:
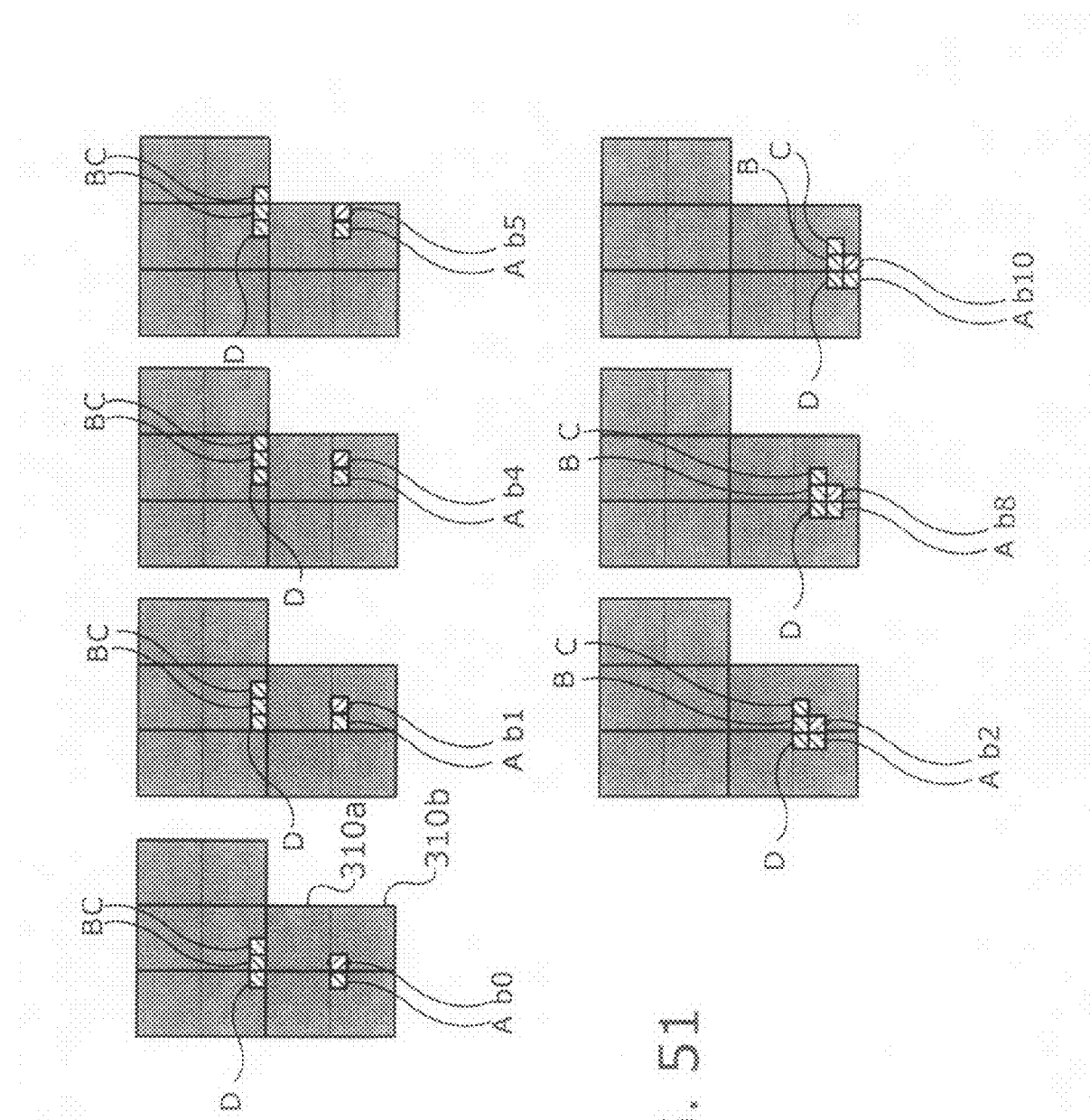
Figure 52:
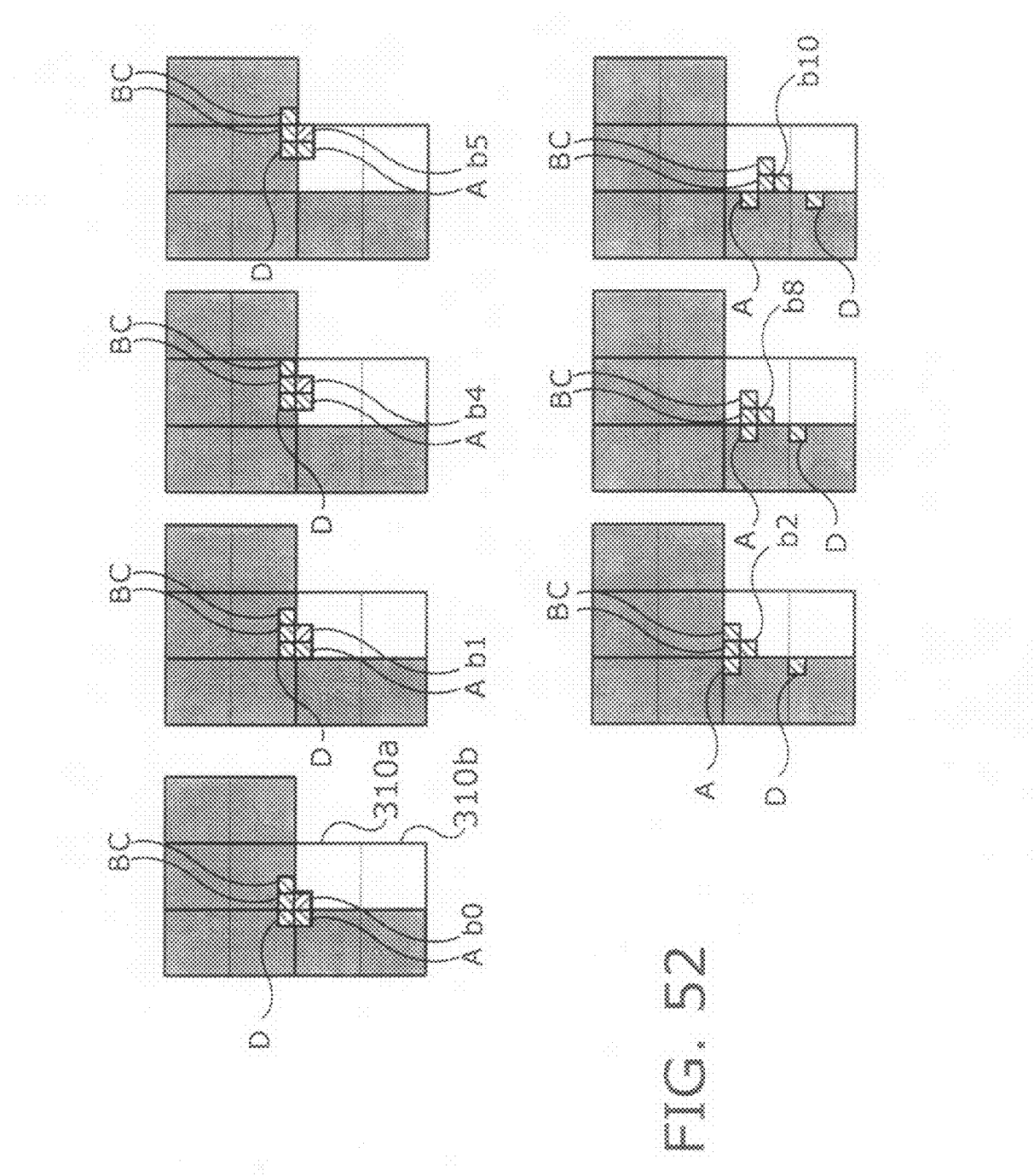
Figure 53:
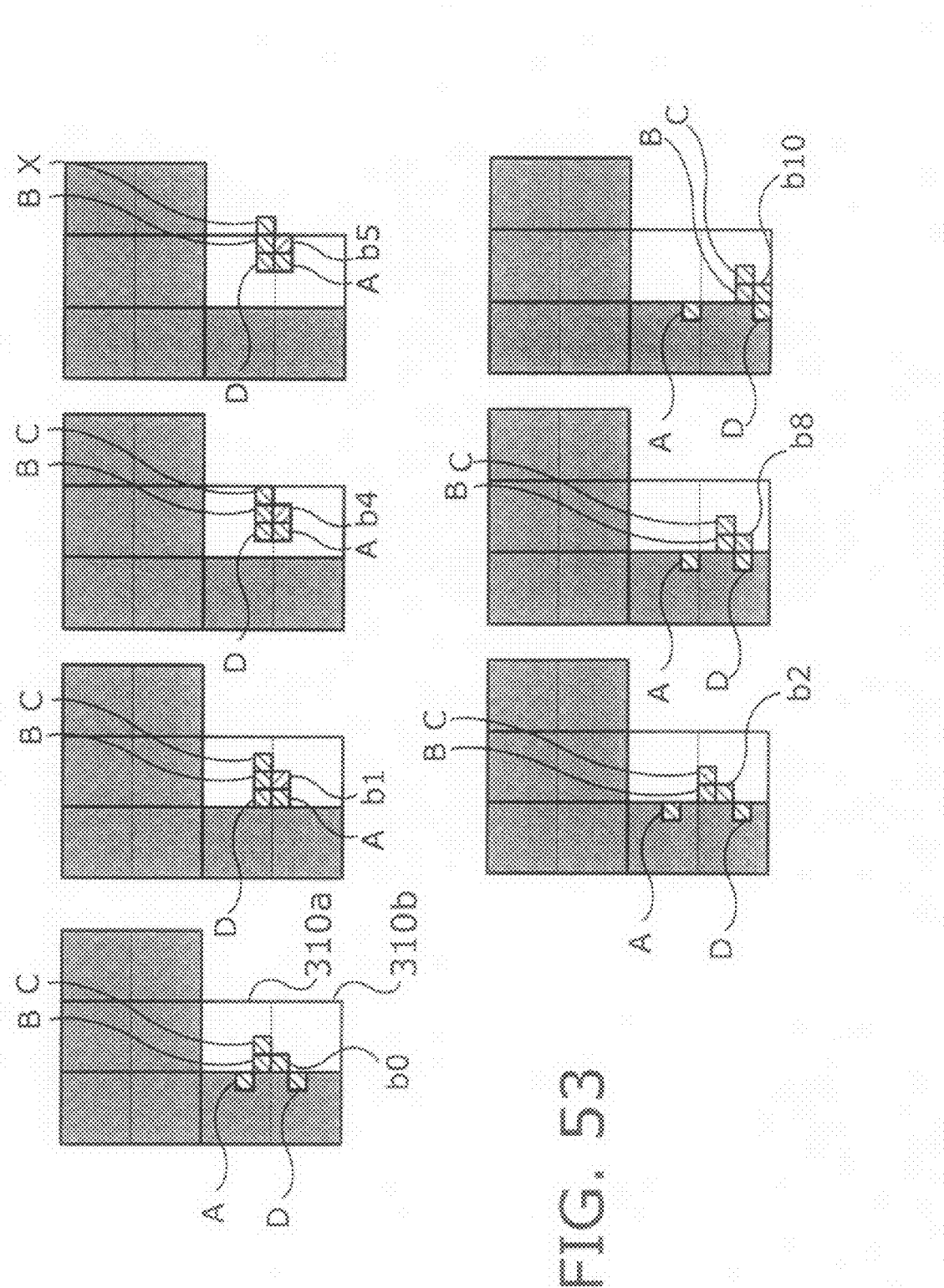
Figure 54:
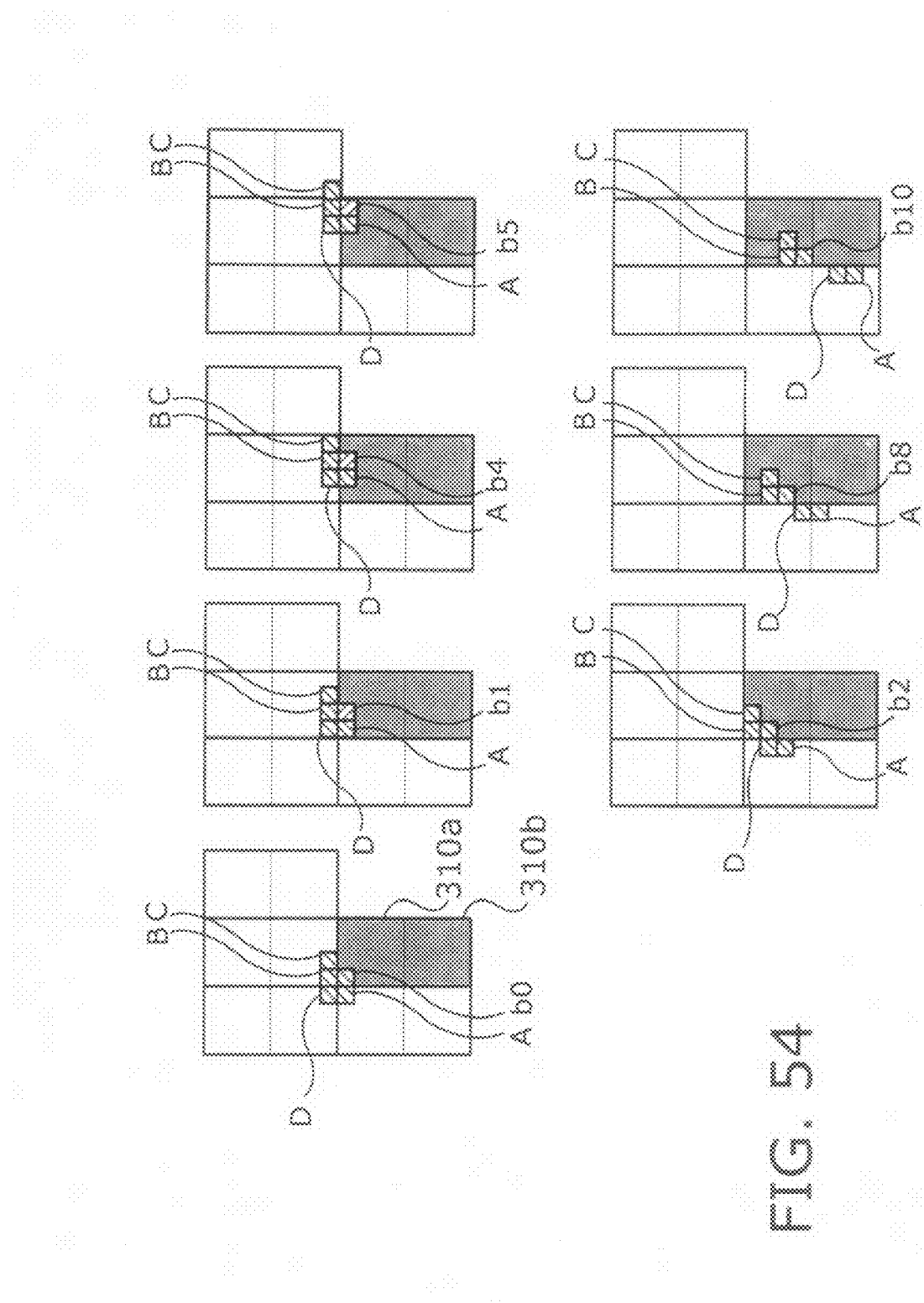
Figure 55:
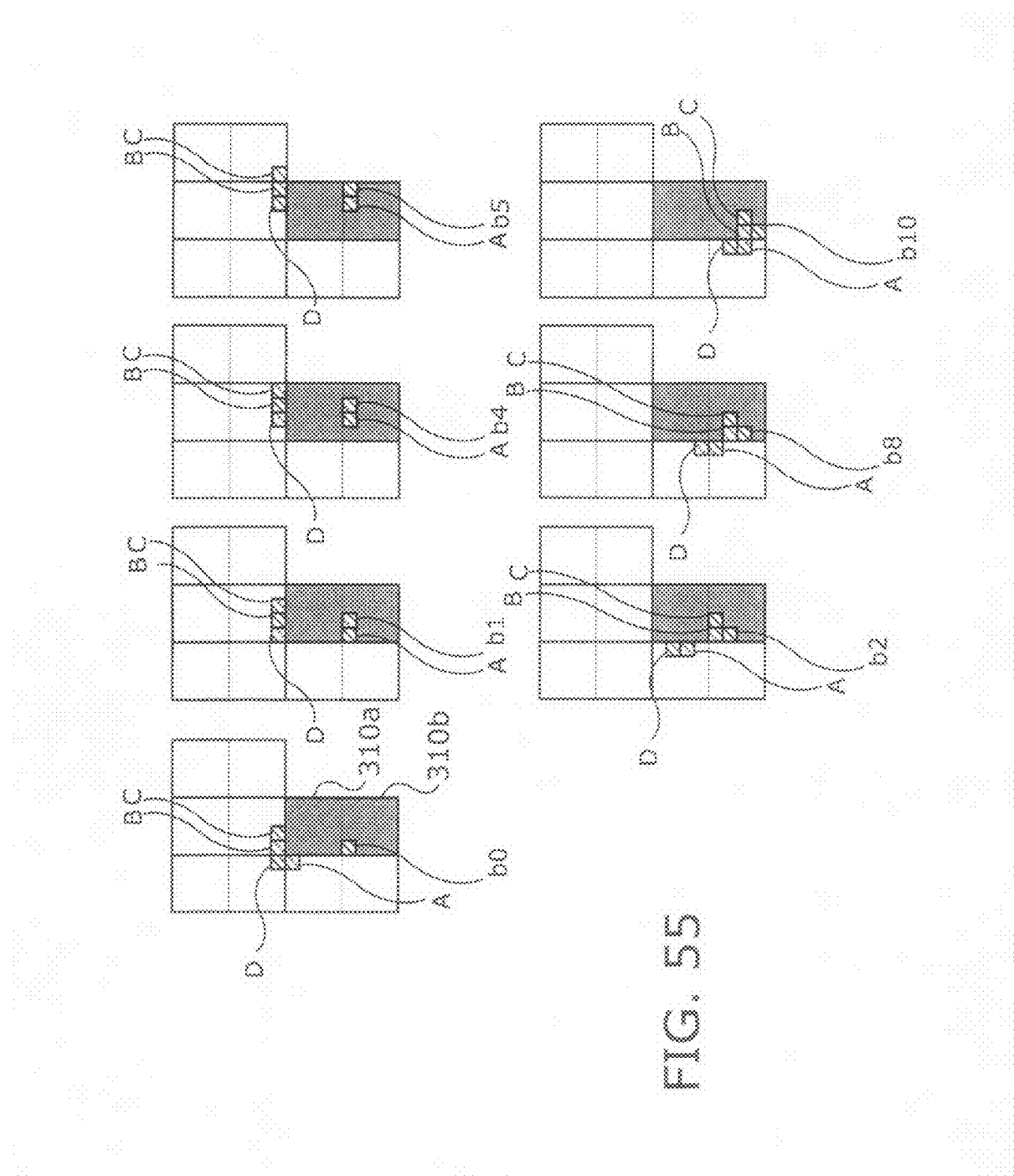
Figure 56:
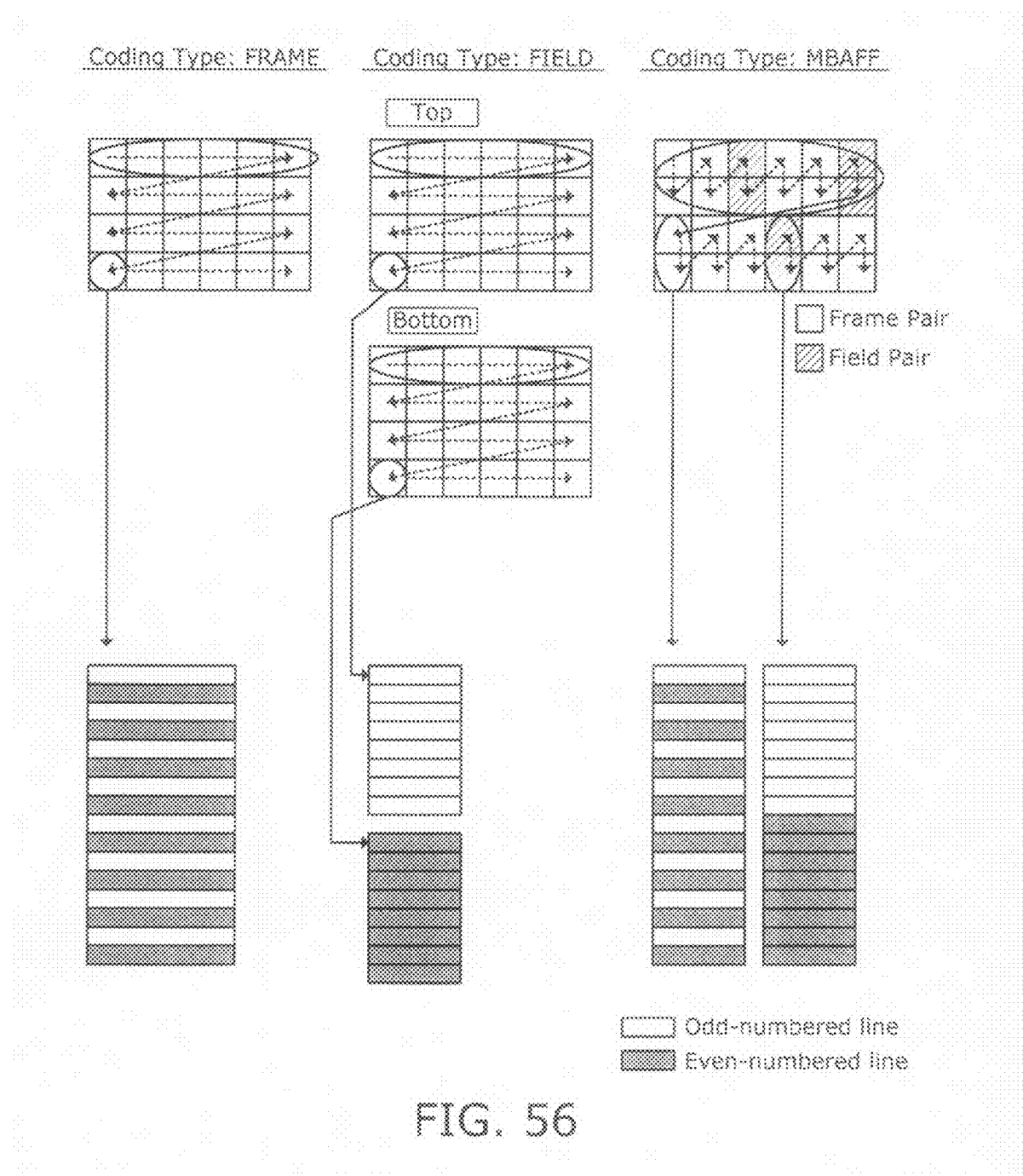
FIG. 56 explains the order of macroblocks to be processed for each different coding type.

This section gives details of the aforementioned third translation table Ta3. FIGS. 48 and 49 show adjacent macroblock locations to be referenced in the case where all the current macroblock pair, upper adjacent macroblock pair, and left adjacent macroblock pair are frame coded. FIGS. 50 and 51 show the case where all those macroblock pairs are field coded. FIGS. 52 and 53 show the case where the current macroblock pair is frame coded while the upper and left adjacent macroblock pairs are field coded. Finally, FIGS. 54 and 55 show the case where the current macroblock pair is field coded while the upper and left adjacent macroblock pairs are frame coded. All those cases assume that the current focus is on a 4×4 sub-macroblock within the current macroblock. Block numbers b0 to b15 are used to indicate representative vector locations of the current macroblock. Symbol "X" refers to an adjacent macroblock MB-C whose motion vector has not been calculated. While reference numerals 310a and 310b are placed only at the top-left pattern of each figure, the same numerals apply to other patterns.

As can be seen from FIGS. 48 to 55, the address translator 213a consults the first translation table Ta1 to locate reference motion vectors when they are supposed to be within the current macroblock pair. The address translator 213a uses the third translation table Ta3 when reference motion vectors are outside the current macroblock pair.

In addition to provide the same functionality as the first embodiment, the video decoding device 200 according to the second embodiment supports motion vector prediction in MBAFF mode. The second embodiment accomplishes this as quickly as in non-MBAFF mode by using a third translation table Ta3 designed to locate reference motion vectors (or adjacent macroblocks MB-A or MB-BCD) outside the current macroblock based on a given MBFIELD flag, surrounding macroblock type flag, and top/bottom flag.

Also the video decoding device 200 of the second embodiment uses a first translation table Ta1, not only to support non-MBAFF coding, but also to locate reference motion vectors (or adjacent macroblocks MB-A or MB-BCD) inside the current macroblock in MBAFF mode. This first translation table Ta1 eliminates the need for reserving nine vector storage locations (specifically, b0, b1, b2, b3, b4, b6, b8, b9, and b12 as indicated by hatching in FIG. 25B) in the memory 211. The present invention thus alleviates the hardware requirements for the memory 211.

The preferred embodiments of the proposed interframe prediction processor, video coding device, and video decoding device have been described. The present invention, however, should not be limited to those specific embodiments. The elements of each embodiment may be replaced with some other functionally equivalent elements. The elements of the present invention may also operate together with other elements or steps. Further, two or more features of the above-described embodiments may be combined in various ways.

Computer-Readable Medium

The above-described processing mechanisms of the proposed interframe prediction processor are actually implemented on a computer system, the instructions being encoded and provided in the form of computer programs. A computer system executes such programs to provide the intended functions of the present invention. For the purpose of storage and distribution, those programs may be stored in a computer-readable storage medium, which include: magnetic storage devices, optical discs, magneto-optical storage media, and semiconductor memory devices. Magnetic storage devices include hard disk drives (HDD), floppy disks (FD), and magnetic tapes. Optical disc media include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for the distribution of program products. Network-based distribution of software programs may also be possible, in which case several master program files are made available on a server computer for downloading to other computers via a network.

A user computer stores necessary software components for interframe prediction in its local storage unit, which have previously been installed from a portable storage media or downloaded from a server computer. The computer executes the programs read out of the local storage unit, thereby performing the programmed functions. As an alternative way of program execution, the computer may execute programs, reading out program codes directly from a portable storage medium. Another alternative method is that the user computer dynamically downloads programs from a server computer when they are demanded and executes them upon delivery.

CONCLUSION

As can be seen from the above sections, the present invention determines memory addresses of reference motion vectors according to given coding type information about a current block pair and its adjacent block pairs, when performing motion vector prediction with reference to blocks outside the current block pair. The present invention accomplishes this in MBAFF mode as quickly as in non-MBAFF mode, thus reducing the time required to predict motion vectors.

The proposed interframe prediction processor may be used together with a reference picture memory and a reference picture storage manager. If this is the case, the addresses of reference motion vectors can be read out of memory addresses that are calculated automatically. This feature eliminates the need for duplicating a calculated motion vector in multiple storage locations in the memory to allow for the use of the minimum block size. The proposed interframe prediction processor thus reduces the processing time of motion vector calculation.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An interframe prediction processor that performs interframe prediction of video frames on a block basis, comprising:
   a reference picture memory that provides vector storage locations corresponding to minimum size blocks to store reference motion vectors calculated for blocks of variable sizes;
   a reference picture storage manager that writes calculated motion vectors in the vector storage locations reserved in the reference picture memory;
   an address selector that provides memory addresses of the reference motion vectors in the reference picture memory according to given coding type information about a current block pair and adjacent block pairs thereof, when performing motion vector prediction with reference to blocks outside the current block pair, and when given macroblock adaptive frame/field (MBAFF) identification type information indicates that a given picture is supposed to be processed in MBAFF mode allowing selection between frame prediction and field prediction for each individual block pair, wherein the coding type information indicates whether each block pair is organized in frame form or in field form; and
   a predictor calculator that determines a motion vector predictor for each constituent block of the current block pair based on reference motion vectors read out of the provided memory addresses,
   wherein:
   the predictor calculator requests the address selector to provide memory addresses of reference motion vectors calculated for specific adjacent blocks,
   the address selector comprises a translation table that associates each combination of block size and block location with a specific address of the reference picture memory, and the address selector determines the requested memory addresses of reference motion vectors stored in the reference picture memory, by looking up the translation table with information given by the predictor calculator.

2. The interframe prediction processor according to claim 1, wherein the address selector determines the memory addresses of reference motion vectors according to field type information indicating whether the current block belongs to a top field or a bottom field, when the current block pair is organized in field form.

3. The interframe prediction processor according to claim 1, wherein the address selector provides the memory addresses of reference motion vectors outside the current block also when the given MBAFF type information indicates that the given picture is supposed to be processed in non-MBAFF mode.

4. The interframe prediction processor according to claim 1,
wherein the predictor calculator receives the determined memory addresses from the address selector, reads out the reference motion vectors from the received memory addresses of the reference picture memory, and determines a motion vector predictor of the current block based on the reference motion vectors read out of the reference picture memory,
and wherein the reference picture storage manager writes the reference motion vectors of the adjacent blocks in the vector storage locations corresponding to the adjacent blocks.

5. The interframe prediction processor according to claim 1, wherein the reference picture memory provides vector storage locations corresponding to the current block pair.

6. The interframe prediction processor according to claim 1, wherein:
the reference picture memory comprises current-block vector storage locations storing motion vectors calculated for the current block and adjacent-block vector storage locations storing motion vectors calculated for blocks adjacent to the current block; and
the reference picture storage manager writes the motion vectors of the current block to the adjacent-block vector storage locations before a block located next to the current block is selected as a new current block.

7. The interframe prediction processor according to claim 6, wherein the address selector comprises:
a first translation table associating each combination of block size and block location with an address of one of the current-block vector storage locations;
a second translation table associating each combination of block size and block location with an address of one of the adjacent-block vector storage locations for use in non-MBAFF mode; and
a third translation table associating each combination of block size and block location with an address of one of the adjacent-block vector storage locations for use in MBAFF mode;
wherein the address selector looks up the first, second, and third translation tables with information given by the predictor calculator to determine the memory addresses of reference motion vectors.

8. A video coding device that encodes video signals into compressed video data by performing motion-compensated prediction between a source picture and a reference picture on a block basis, the device comprising:
a reference picture memory that provides vector storage locations corresponding to minimum size blocks to store reference motion vectors calculated for blocks of variable sizes;
a reference picture storage manager that writes calculated motion vectors in the vector storage locations reserved in the reference picture memory;
an address selector that provides memory addresses of the reference motion vectors in the reference picture memory according to given coding type information about a current block pair and adjacent block pairs thereof, when performing motion vector prediction with reference to blocks outside the current block pair, and when given macroblock adaptive frame/field (MBAFF) identification type information indicates that a given picture is supposed to be processed in MBAFF mode allowing selection between frame prediction and field prediction for each individual block pair, wherein the coding type information indicates whether each block pair is organized in frame form or in field form; and
an interframe prediction processor that determines a motion vector predictor for each constituent block of the current block pair based on reference motion vectors read out of the provided memory addresses, and calculates a difference between the calculated motion vector of the current block and the determined motion vector predictor, so that the calculated difference will be encoded,
wherein:
the interframe prediction processor requests the address selector to provide memory addresses of reference motion vectors calculated for specific adjacent blocks,
the address selector comprises a translation table that associates each combination of block size and block location with a specific address of the reference picture memory, and
the address selector determines the requested memory addresses of reference motion vectors stored in the reference picture memory, by looking up the translation table with information given by the interframe prediction processor.

9. A video decoding device that reconstructs original video pictures from a compressed video signal that has been produced by performing motion-compensated interframe prediction on a block basis, the device comprising:
a reference picture memory that provides vector storage locations corresponding to minimum size blocks to store reference motion vectors decoded for blocks of variable sizes;
a reference picture storage manager that writes decoded motion vectors in the vector storage locations reserved in the reference picture memory;
an address selector that provides memory addresses of the reference motion vectors in the reference picture memory according to given coding type information about a current block pair and adjacent block pairs thereof, when performing motion vector prediction with reference to blocks outside the current block pair, and when given macroblock adaptive frame/field (MBAFF) identification type information indicates that a given picture is supposed to be processed in MBAFF mode allowing selection between frame prediction and field prediction for each individual block pair, wherein the coding type information indicates whether each block pair is organized in frame form or in field form; and
an interframe prediction processor that determines a motion vector predictor for each constituent block of the current block pair based on reference motion vectors read out of the provided memory addresses, and reconstructs a motion vector of the current block from the determined motion vector predictor and a decoded motion vector difference, wherein:
the interframe prediction processor requests the address selector to provide memory addresses of reference motion vectors decoded for specific adjacent blocks,
the address selector comprises a translation table that associates each combination of block size and block location with a specific address of the reference picture memory, and
the address selector determines the requested memory addresses of reference motion vectors stored in the reference picture memory, by looking up the translation table with information given by the interframe prediction processor.

* * * * *